United States Patent
Ko et al.

(10) Patent No.: US 10,028,146 B2
(45) Date of Patent: *Jul. 17, 2018

(54) MANAGEMENT SERVER AND METHOD FOR CONTROLLING DEVICE, USER TERMINAL APPARATUS AND METHOD FOR CONTROLLING DEVICE, AND USER TERMINAL APPARATUS AND CONTROL METHOD THEREOF

(71) Applicant: SAMSUNG ELECTRONICS CO., LTD., Suwon-si (KR)

(72) Inventors: Jae-woo Ko, Uiwang-si (KR);
Tae-hwan Wi, Suwon-si (KR);
Hee-won Jung, Suwon-si (KR);
Hyun-young Kim, Seoul (KR);
Bo-seok Moon, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,013

(22) Filed: Aug. 21, 2017

(65) Prior Publication Data

US 2017/0347267 A1 Nov. 30, 2017

Related U.S. Application Data

(63) Continuation of application No. 13/858,345, filed on Apr. 8, 2013, now Pat. No. 9,775,038.

(30) Foreign Application Priority Data

Apr. 8, 2012 (KR) ........................ 10-2012-0036464
Jan. 15, 2013 (KR) ........................ 10-2013-0004540

(51) Int. Cl.
*H04W 12/08* (2009.01)
*H04L 29/06* (2006.01)
(Continued)

(52) U.S. Cl.
CPC ......... *H04W 12/08* (2013.01); *H04L 63/0876* (2013.01); *H04W 4/80* (2018.02); *H04W 12/06* (2013.01)

(58) Field of Classification Search
CPC ..... H04W 12/08; H04W 4/008; H04W 12/06; H04W 4/80; H04L 63/0876
See application file for complete search history.

(56) References Cited

U.S. PATENT DOCUMENTS

| 6,098,890 A | 8/2000 | Kreft et al. |
| 7,360,238 B2 | 4/2008 | Owlett |

(Continued)

FOREIGN PATENT DOCUMENTS

| CN | 101674109 A | 3/2010 |
| EP | 1798867 | 6/2007 |

(Continued)

OTHER PUBLICATIONS

International Search Report (PCT/ISA/210), dated Aug. 28, 2013, issued by the International Searching Authority in counterpart International Patent Application No. PCT/KR2013/002931.

(Continued)

*Primary Examiner* — William S Powers
*Assistant Examiner* — Tongoc Tran
(74) *Attorney, Agent, or Firm* — Sughrue Mion, PLLC

(57) ABSTRACT

A universal access method performed by a mobile device includes receiving a signal from a security access point that requests authentication information from the mobile device through near field communication (NFC), selecting one of first authentication information and second authentication information corresponding to the security access point, and transferring the selected authentication information to the security access point through NFC.

20 Claims, 53 Drawing Sheets

(51) Int. Cl.
  *H04W 12/06* (2009.01)
  *H04W 4/80* (2018.01)

(56) References Cited

U.S. PATENT DOCUMENTS

| | | | |
|---|---|---|---|
| 7,549,590 | B2 | 6/2009 | Matsushita et al. |
| 7,797,537 | B2 | 9/2010 | Kurita et al. |
| 7,886,970 | B2 | 2/2011 | Kurita |
| 8,215,547 | B2 | 7/2012 | Kurita |
| 8,532,572 | B2 | 9/2013 | Renard et al. |
| 2003/0140228 | A1 | 7/2003 | Binder |
| 2004/0215964 | A1* | 10/2004 | Barlow ............ G06Q 20/105 713/172 |
| 2005/0005128 | A1 | 1/2005 | Lambert et al. |
| 2006/0056634 | A1 | 3/2006 | Lee et al. |
| 2006/0109931 | A1 | 5/2006 | Asai et al. |
| 2006/0290496 | A1 | 12/2006 | Peeters |
| 2007/0118891 | A1 | 5/2007 | Buer |
| 2007/0131759 | A1 | 7/2007 | Cox et al. |
| 2007/0152068 | A1 | 7/2007 | Kurita |
| 2007/0263596 | A1 | 11/2007 | Charrat |
| 2008/0011833 | A1 | 1/2008 | Saarisalo |
| 2008/0042807 | A1 | 2/2008 | Park et al. |
| 2009/0191812 | A1 | 7/2009 | Teruyama et al. |
| 2009/0247077 | A1 | 10/2009 | Sklovsky |
| 2009/0247078 | A1 | 10/2009 | Sklovsky et al. |
| 2009/0325566 | A1 | 12/2009 | Bell et al. |
| 2010/0222000 | A1 | 9/2010 | Sauer et al. |
| 2010/0275249 | A1 | 10/2010 | McCann et al. |
| 2011/0029777 | A1* | 2/2011 | Murakami ............ G06F 9/4401 713/171 |
| 2011/0105086 | A1 | 5/2011 | Kurita |
| 2011/0143663 | A1 | 6/2011 | Renard et al. |
| 2012/0003990 | A1 | 1/2012 | Lee |
| 2012/0011572 | A1 | 1/2012 | Chew et al. |
| 2012/0099566 | A1 | 4/2012 | Laine et al. |
| 2012/0100803 | A1 | 4/2012 | Suumaki et al. |
| 2012/0144193 | A1 | 6/2012 | Le Saint et al. |
| 2012/0265952 | A1 | 10/2012 | Kurita |
| 2014/0257877 | A1 | 9/2014 | L'Heureux et al. |

FOREIGN PATENT DOCUMENTS

| | | |
|---|---|---|
| JP | 200496294 A | 3/2004 |
| JP | 2005196411 A | 7/2005 |
| JP | 200659127 A | 3/2006 |
| JP | 2010510609 A | 4/2010 |
| TW | 201121257 A1 | 6/2011 |
| TW | 201204151 A1 | 1/2012 |
| WO | 01/71685 A1 | 9/2001 |
| WO | 2004003801 | 1/2004 |
| WO | 2008147457 A1 | 12/2008 |
| WO | 2009/120481 A2 | 10/2009 |
| WO | 2010108235 A1 | 9/2010 |

OTHER PUBLICATIONS

Written Opinion (PCT/ISA/237), dated Aug. 28, 2013, issued by the International Searching Authority in counterpart International Patent Application No. PCT/KR2013/002931.
Laukkanen, Mikko, et al., "Towards Operating Identity-based NFC Services," IEEE, Helsinki, Finland, 2007, pp. 92-95.
Communication from the European Patent Office dated Jun. 24, 2013 in counterpart European Application No. 13162623.6.
Communication dated May 28, 2014, issued by the Australian Patent Office in counterpart Australian Application No. 2013203013.
Communication dated Jan. 12, 2015 by the Australian Patent Office in counterpart Australian Patent Application No. 2013203013.
Communication dated Jun. 17, 2016 issued by the Taiwanese Patent Office in counterpart Taiwanese Patent Application No. 102112343.
Communication dated Apr. 24, 2017, issued by the Japanese Patent Office in counterpart Japanese Application No. 2013-080358.
Communication dated Jun. 1, 2017, issued by the European Patent Office in counterpart European Application No. 13162623.6.
Communication dated Jul. 31, 2017, issued by the State Intellectual Property Office of P.R. China in counterpart Chinese Application No. 201380017384.1.
Communication dated Jun. 5, 2018, issued by the European Patent Office in counterpart European Application No. 13162623.6.

* cited by examiner

FIG. 23
(a)
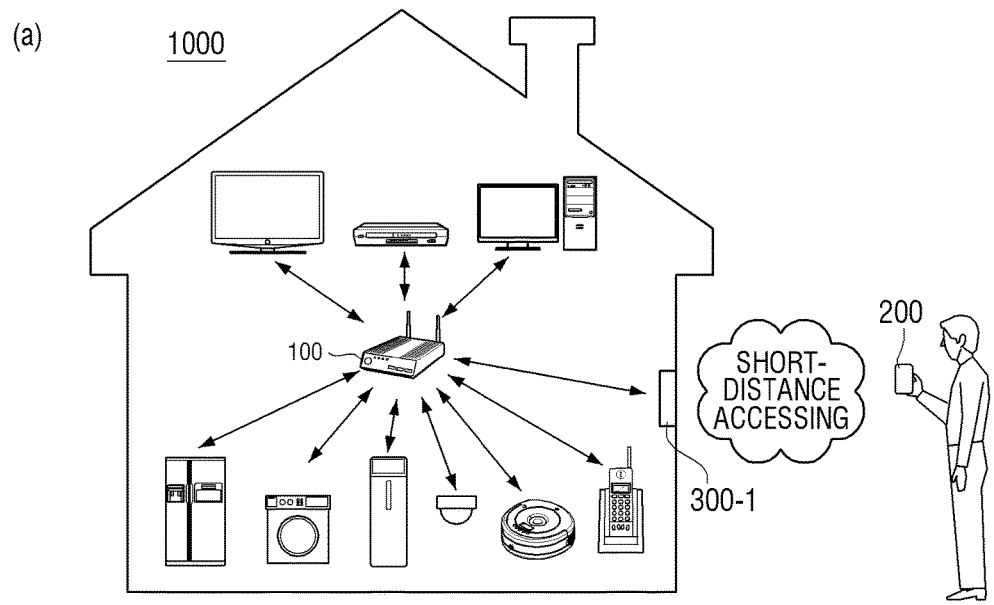
(b)
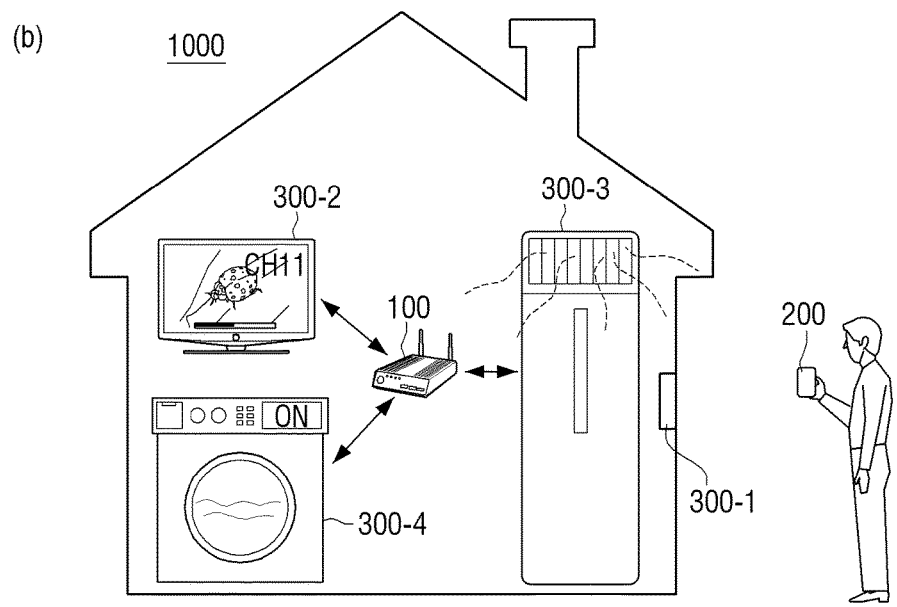

FIG. 24
(a)
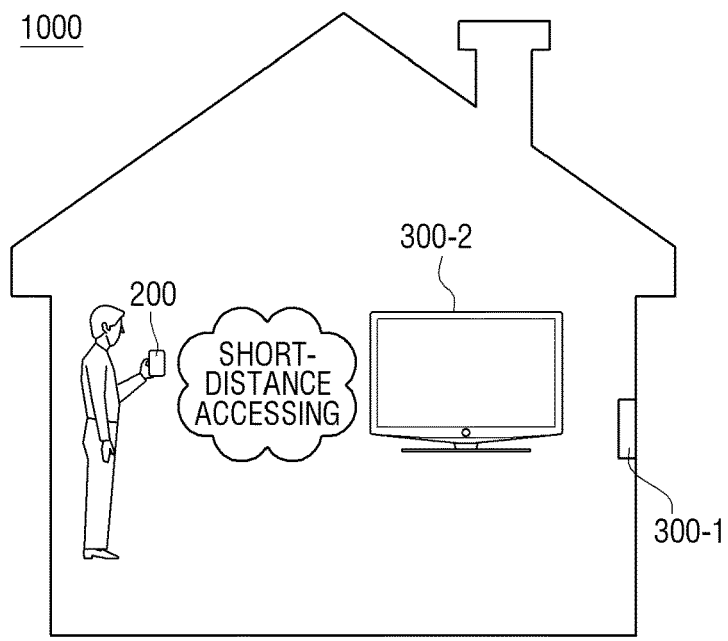
(b)
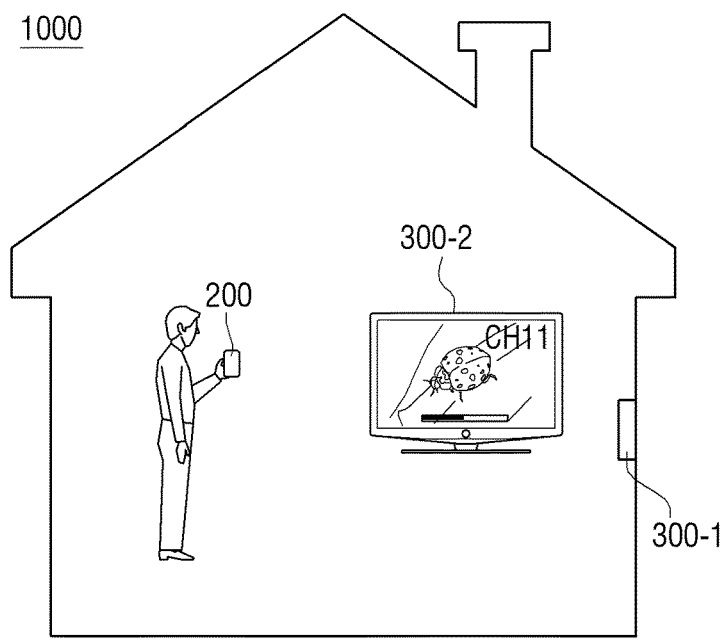

FIG. 25
(a)
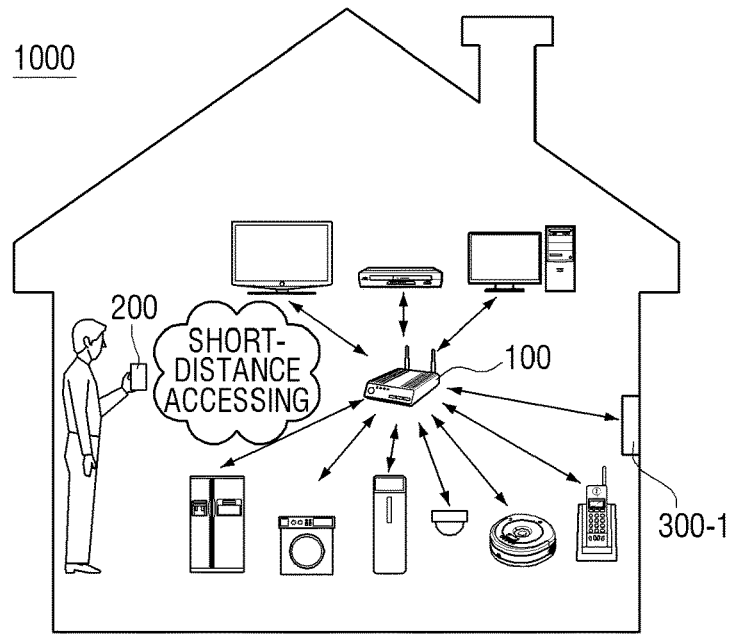
(b)
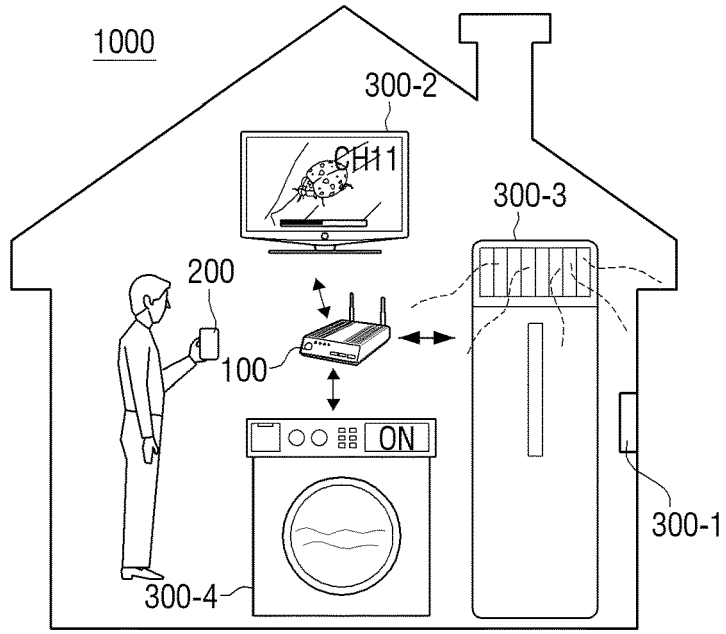

FIG. 26
(a)
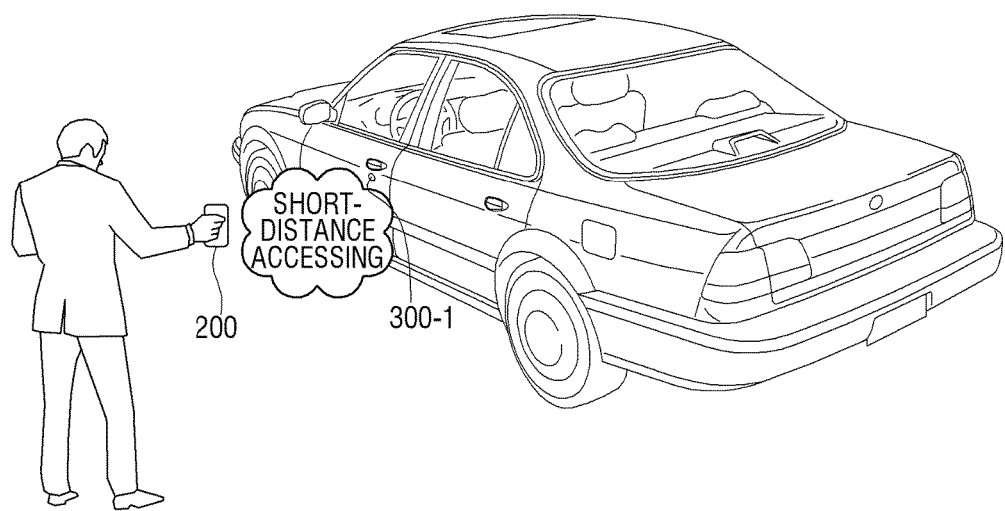
(b)
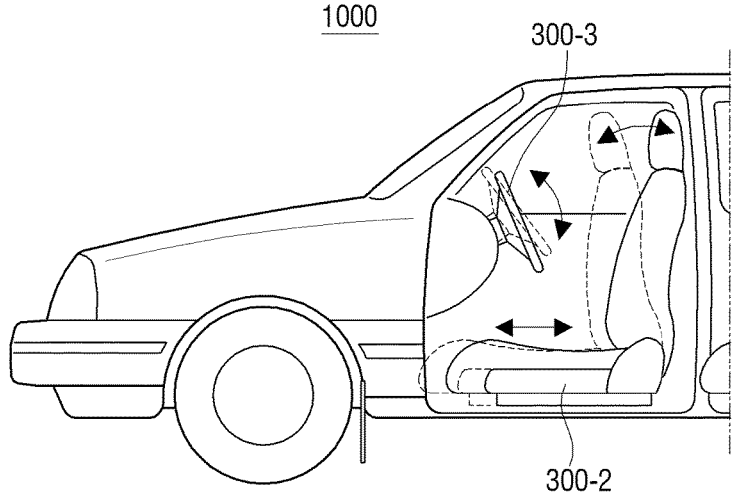

FIG. 27
(a)
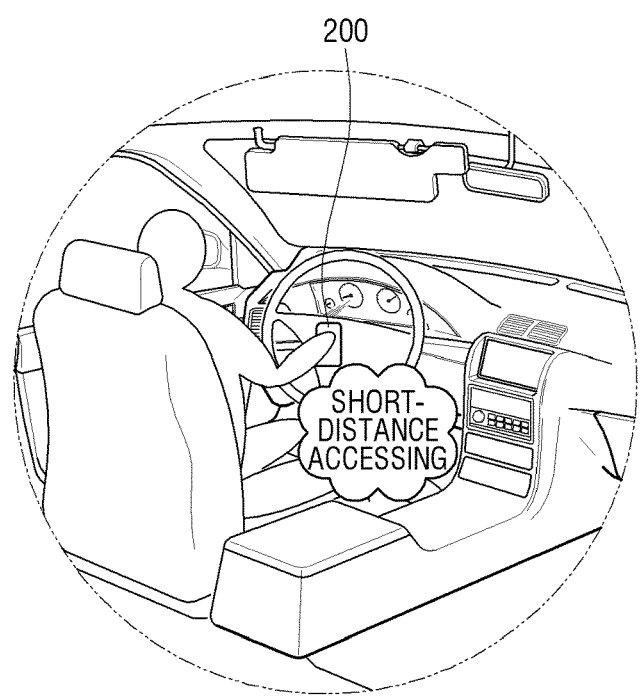
(b)
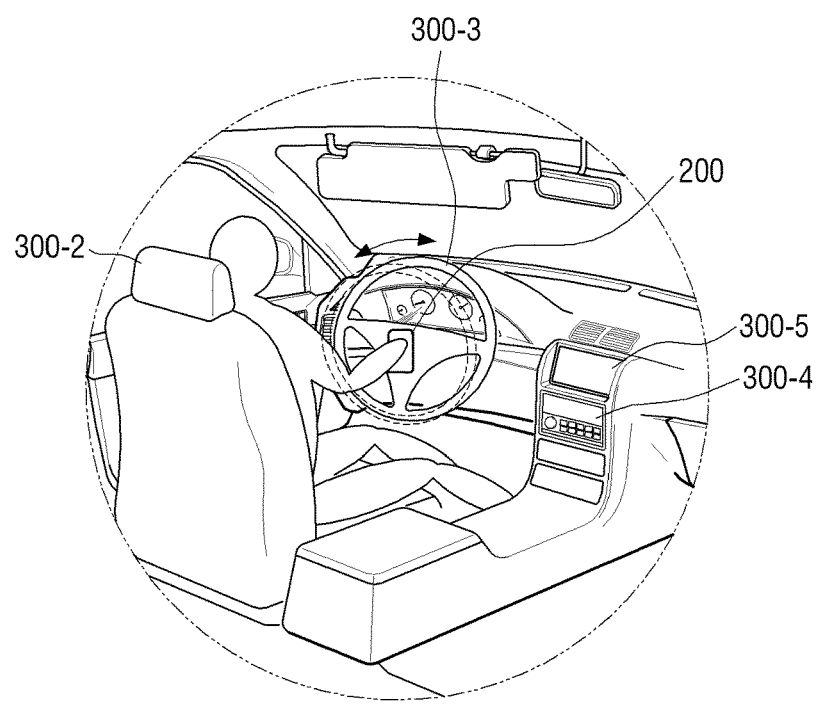

FIG. 28
(a)
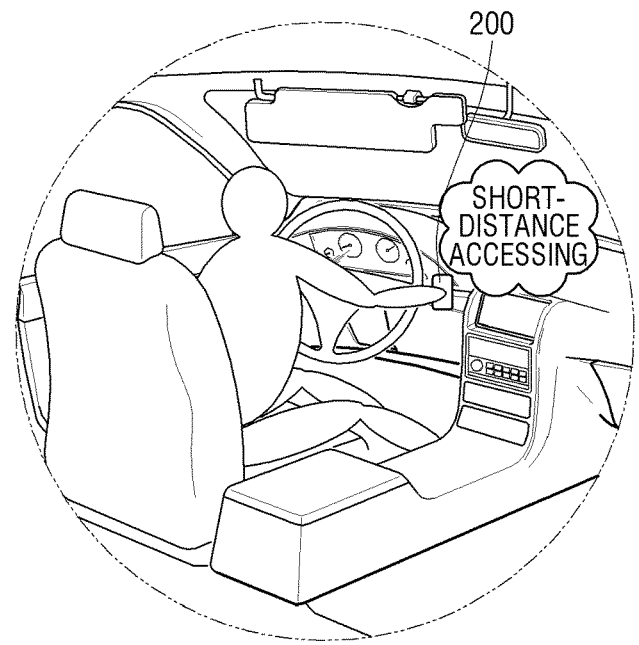
(b)
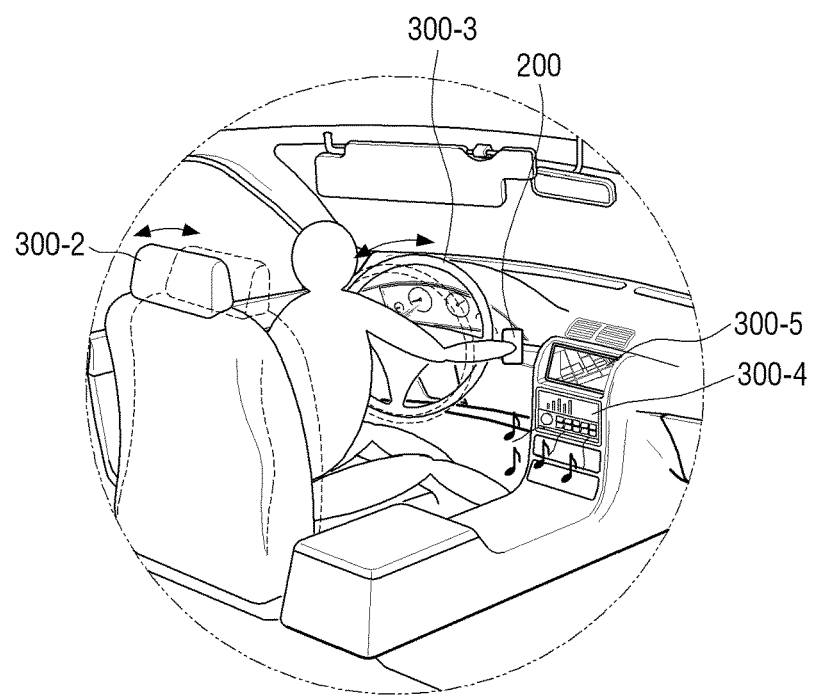

FIG. 29
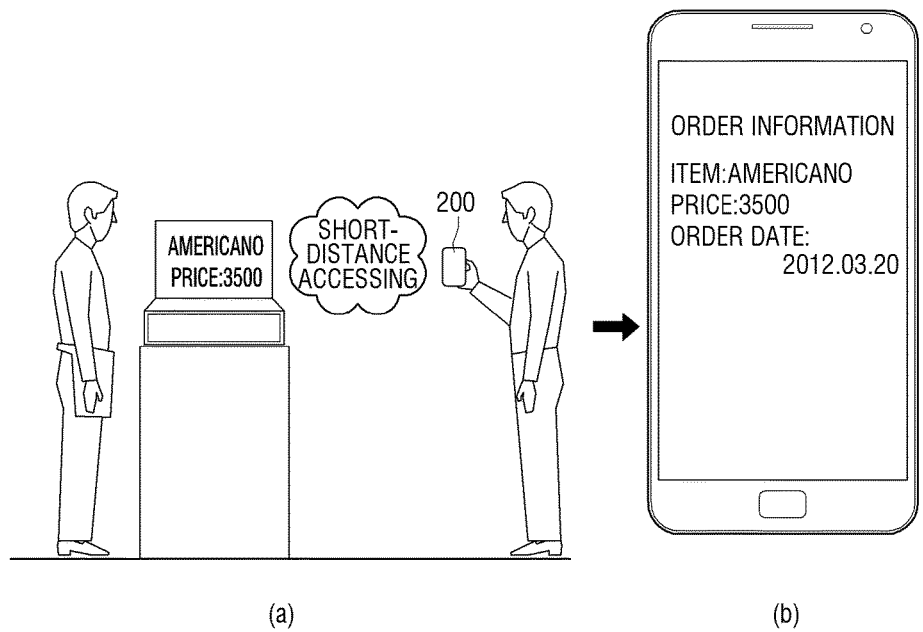
(a)       (b)
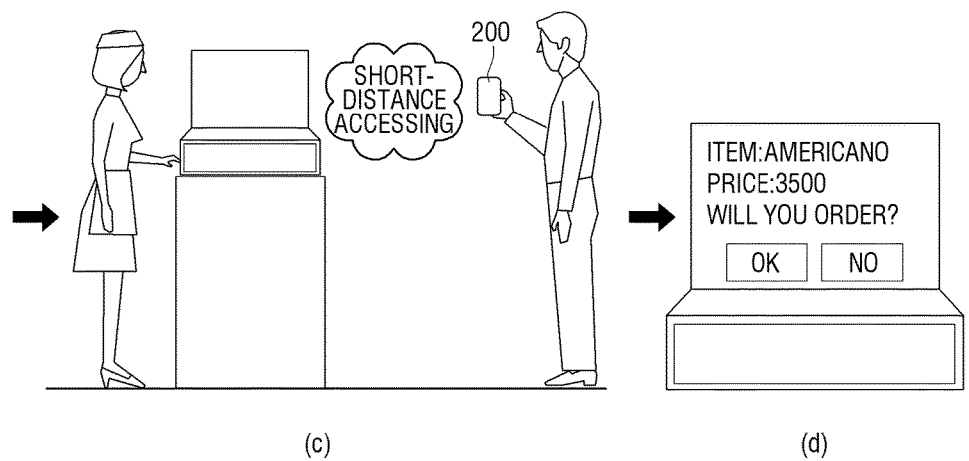
(c)       (d)

MANAGEMENT SERVER AND METHOD FOR CONTROLLING DEVICE, USER TERMINAL APPARATUS AND METHOD FOR CONTROLLING DEVICE, AND USER TERMINAL APPARATUS AND CONTROL METHOD THEREOF

CROSS-REFERENCE TO RELATED APPLICATIONS

This application is a continuation of U.S. patent application Ser. No. 13/858,345, filed Apr. 8, 2013, in the U.S. Patent and Trademark Office, which claims priority from Korean Patent Application No. 10-2012-0036464, filed on Apr. 8, 2012 in the Korean Intellectual Property Office and Korean Patent Application No. 10-2013-0004540, filed on Jan. 15, 2013 in the Korean Intellectual Property Office, the disclosures of which are incorporated herein by reference in their entireties.

BACKGROUND

1. Field

Apparatuses and methods consistent with exemplary embodiments relate to a management server and universal access method, and more particularly, to a management server and universal access method for controlling a domain device.

2. Description of the Related Art

Advancement in telecommunication technology has enabled devices in a home, an automobile, or an office to be connected via one network.

For example, information appliances, e.g., a personal computer (PC), which are used in a home, are connected via a wired/wireless network to enable accessing the Internet, data sharing, and interactive control of peripheral devices, e.g., a scanner and a printer. The home network can be linked to an external network via the Internet or a portable information terminal and is thus remote control of other devices is possible, such as a television (TV), a refrigerator, an air conditioner, a digital versatile disk (DVD) player, and a digital camera.

As digital technology has advanced and the Internet has come into widespread use, devices installed in a home, an automobile, or an office can be connected via a network. Thus, there is a growing need to develop a method of easily performing environment settings for devices included in each of network systems.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a universal access method performed by a mobile device that stores first authentication information corresponding to a first domain and second authentication information corresponding to a second domain, the method including receiving a signal from a security access point that requests authentication information from the mobile device through near field communication (NFC), selecting one of the first authentication information and the second authentication information corresponding to the security access point, and transferring the selected authentication information to the security access point through NFC.

The security access point may include one of a first security access point that is associated with a first domain including a first plurality of controlled devices and a second security access point that is associated with a second domain including a second plurality of controlled devices, and the selecting may include determining whether the security access point corresponds to the first security access point associated with the first domain or the second security access point associated with the second domain and selecting the first authentication information if it is determined the security access point corresponds to the first security access point associated with the first domain and selecting the second authentication information if it is determined the security access point corresponds to the second security access point that is associated with the second domain.

The method may further include selecting first device setting information of the first plurality of controlled devices if the security access point corresponds to the first security access point associated with the first domain and selecting second device setting information of the second plurality of controlled devices if the security access point corresponds to the second security access point that is associated with the second domain, and displaying a graphical user interface for controlling the first plurality of controlled devices based on the first device setting information if the security access point corresponds to the first security access point associated with the first domain and for controlling the second plurality of controlled devices based on the second device setting information if the security access point corresponds to the second security access point that is associated with the second domain.

The device setting information may include first configurations of operational settings of the first plurality of controlled devices, and the second device setting information comprises second configurations of operational settings of the second plurality of controlled devices.

The method may further include controlling the first plurality of controlled devices if the security access point corresponds to the first security access point associated with the first domain and controlling the second plurality of controlled devices if the security access point corresponds to the second security access point that is associated with the second domain.

The method may further include receiving updated first device setting information of updated configurations of operational settings of the first plurality of controlled devices if the security access point corresponds to the first security access point associated with the first domain and receiving updated second device setting information of updated configurations of operational settings of the second plurality of controlled devices if the security access point corresponds to the second security access point associated with the second domain, and updating the first device setting information if the security access point corresponds to the first security access point associated with the first domain and updating the second device setting information if the security access point corresponds to the second security access point associated with the second domain.

The first authentication information may include a first security key associated with the first domain and, the second authentication information may include a second security key associated with the second domain.

The first authentication information may include a first user identification associated with the first domain, and the second authentication information may include a second user identification associated with the second domain.

The first domain may be located at a first location, and the second domain may be located at a second location.

The first domain may be a first network including the first plurality of controlled devices, and the second domain may be a second network including the second plurality of controlled devices.

According to an aspect of another exemplary embodiment, there is provide a mobile device including a memory that stores first authentication information corresponding to a first domain and second authentication information corresponding to a second domain, a communication unit that receives a signal from a security access point that requests authentication information from the mobile device through near field communication (NFC), and a processor that selects one of the first authentication information and the second authentication information corresponding to the security access point and controls the communication unit to transfer the selected authentication information to the security access point through NFC.

According to an aspect of another exemplary embodiment, there is provided a server including a memory that stores (i) first authentication information associated with a first domain and first device setting information of first controlled devices in the first domain and (ii) second authentication information associated with a second domain and second device setting information of second controlled devices in the second domain, a communication unit that receives an authentication request including authentication data from a mobile device, and a controller configured to authenticate the user in response to the authentication request by comparing the received authentication data to the first authentication information and the second authentication information, and transmit a result of the authentication to the mobile device such that the mobile device can control the first controlled devices based on the first device setting information if the authentication data corresponds to the first authentication information and control the second controlled devices based on the second device setting information if the authentication data corresponds to the second authentication information.

Additional and other aspects and advantages of the will be set forth in the description which follows and will be apparent from the description.

BRIEF DESCRIPTION OF THE DRAWING FIGURES

The above and other aspects will be more apparent by describing certain exemplary embodiments with reference to the accompanying drawings, in which:

FIGS. 23 to 25 are diagrams illustrating methods of controlling a home domain management system consistent with exemplary embodiments;

FIGS. 26 to 28 are diagrams illustrating automobile domain management systems consistent with exemplary embodiments;

FIG. 29 is a diagram illustrating a method of ordering a product consistent with an exemplary embodiment;

DETAILED DESCRIPTION OF EXEMPLARY EMBODIMENTS

Figure 1:
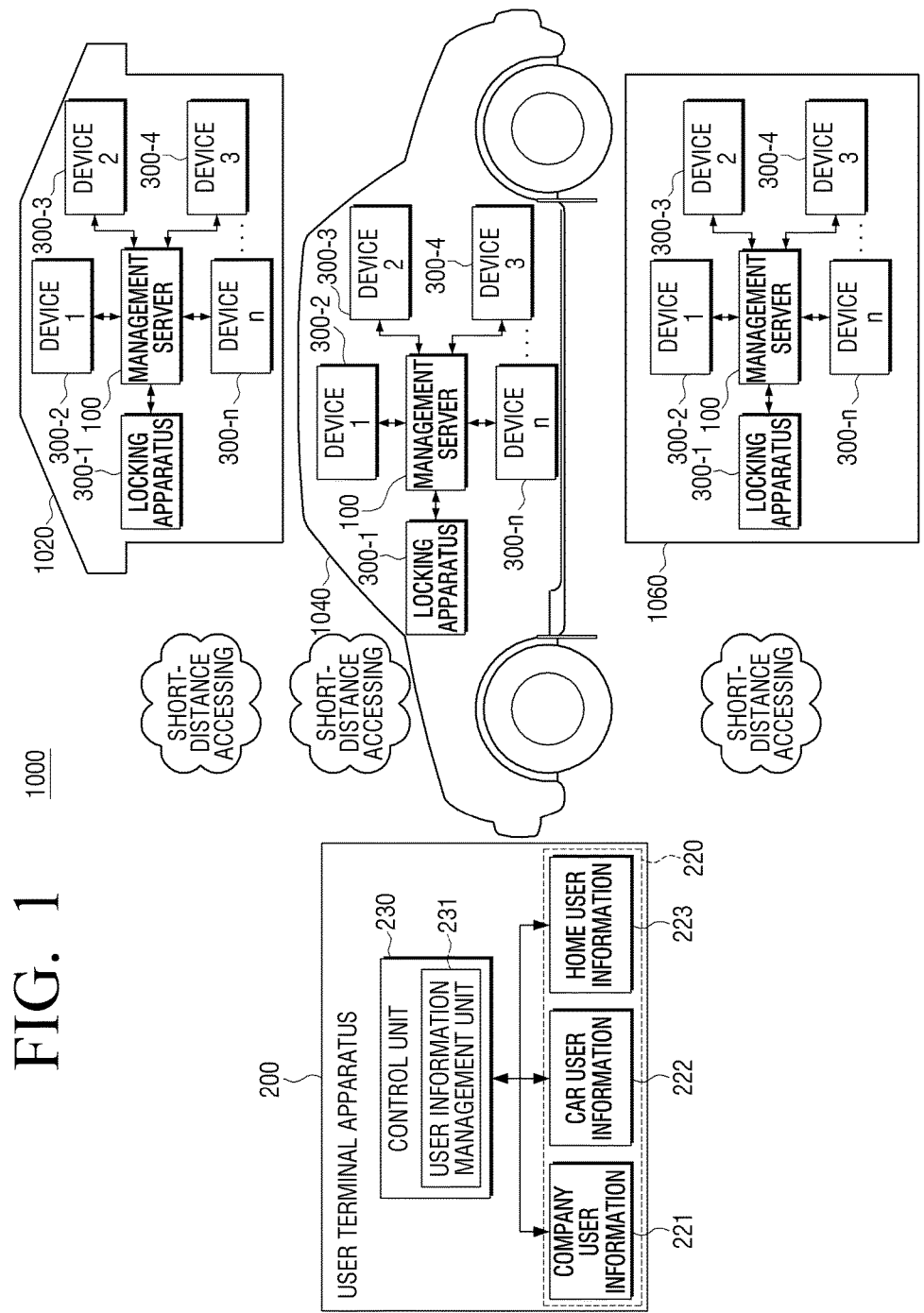
FIG. 1 is a diagram illustrating a management system consistent with an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 is a diagram illustrating a management system 1000 consistent with an exemplary embodiment. Referring to FIG. 1, the management system 1000 includes a management server 100, a user terminal apparatus 200, at least one device, e.g., devices 300-2, 300-3, 300-4, . . . , 300-n, and a locking apparatus 300-1.

Here, the types of the devices 300-2, 300-3, 300-4, . . . , 300-n may vary according to a domain in which the devices 300-2, 300-3, 300-4, . . . , 300-n are located. For example, if the domain is a home domain 1020, the devices 300-2, 300-3, 300-4, . . . , 300-n may be devices used in a home, e.g., a TV, a washing machine, an air conditioner, a terminal apparatus (e.g., a smart phone, a tablet computer, a notebook computer, a personal digital assistant (PDA), a portable multimedia player (PMP), a desktop computer, etc.), a refrigerator, a robot cleaner, and an illumination. If the domain is an automobile domain 1040, the devices 300-2, 300-3, 300-4, . . . , 300-n may be devices used in an automobile, e.g., a handle, a chair, a navigation system, an audio system, an air conditioner, etc. If the domain is an office domain 1060, the devices 300-2, 300-3, 300-4, . . . , 300-n may be devices used in an office, e.g., a TV, an air conditioner, a terminal apparatus (e.g., a smart phone, a tablet computer, a notebook computer, a PDA, a PMP, a desktop computer, etc.), a refrigerator, an illumination system, a project, etc.

In FIG. 1, 'short-distance accessing' means that a first device is within a predetermined distance from a second device capable of establishing short-distance wireless communication. Here, the 'short-distance accessing' may be based on near-field communication (NFC) performed between a first or second device including a short-distance wireless communication reader and the other device including a short-distance wireless communication tag.

The locking apparatus 300-1 may be an apparatus installed at the entrance of the home domain 1020, the automobile domain 1040, or the office domain 1060 to permit or prohibit a user from entering these domains. In this case, the locking apparatus 300-1 may release or set locking based on authority information received by short-distance accessing the user terminal apparatus 200. The locking apparatus 300-1 may be embodied as a door lock installed at an entrance, and the door lock may include a short-distance wireless communication module, e.g., an NFC module. However, the locking apparatus 300-1 is not limited to the above embodiment. The locking apparatus 300-1 may be embodied as a terminal apparatus (e.g., a smart phone, a tablet computer, a notebook computer, a PDA, a PMP, or a desktop computer) installed in the entrances or insides of the home domain 1020, the automobile domain 1040, and the office domain 1060 and includes software supporting a locking function to provide a user interface (UI) screen. In this case, the locking apparatus 300-1 may release or set a locked state thereof by short-distance accessing the user terminal apparatus 200 or based on authority information, e.g., a password and/or user identification (ID), received according to a user input to a locking UI screen.

Although FIG. 1 illustrates a case in which the locking apparatus 300-1 is embodied as an additional apparatus, the locking apparatus 300-1 may be included in the management server 100. In this case, the locking apparatus 300-1 may perform a function of the management server 100 as will be described below.

The management server 100 controls the devices 300-2, 300-3, 300-4, . . . , 300-n included in the domains 1020, 1040, and 1060. Specifically, when the locking apparatus 300-1 releases a lock by performing short-distance accessing between the user terminal apparatus 200 that stores authority information and the locking apparatus 300-1, the management server 100 may receive either user ID information or setting information stored in user terminal apparatus 200 from the locking apparatus 300-1. In other words, a storage unit 220 of the user terminal apparatus may store user information corresponding to each of the domains 1020, 1040, and 1060. Here, the user information may include at least one among the authority information, the user ID information, and the setting information. A user information management unit 231 included in a control unit 230 may detect the user information corresponding to each of the domains 1020, 1040, and 1060 from the storage unit 220. Thus, the user terminal apparatus 200 may transmit the user information corresponding to each of the domains 1020, 1040, and 1060 to the locking apparatus 300-1. The locking apparatus 300-1 may release or set locking thereof based on the authority information included in the received user information, and may transmit the user ID information or the setting information included in the user information received from the user terminal apparatus 200 to the management server 100.

When the management server 100 receives the user ID information, the management server 100 may extract the setting information corresponding to the received user ID information. Then, the management server 100 may control the devices 300-2, 300-3, 300-4, . . . , 300-n in the domain, based on the extracted setting information.

Otherwise, when the management server 100 receives the setting information from the locking apparatus 300-1, the management server 100 may control the devices 300-2, 300-3, 300-4, . . . , 300-n in the domain, based on the received setting information.

Although a case in which the management server 100 receives either the user ID information of the user terminal apparatus 200 or the setting information stored in the user terminal apparatus 200 from the locking apparatus 300-1 as described above, the operation is not limited thereto. For example, when a user of the user terminal apparatus 200 is located in the domain, the user may perform short-distance accessing between the user terminal apparatus 200 and the management server 100. In this case, the management server 100 may directly receive either the user ID information of the user terminal apparatus 200 or the setting information stored in the user terminal apparatus 200 from the user terminal apparatus 200. Otherwise, when the user performs short-distance accessing between the user terminal apparatus 200 and the devices 300-2, 300-3, 300-4, . . . , 300-n, the management server 100 may receive either the user ID information of the user terminal apparatus 200 or the setting information stored in the user terminal apparatus 200, via the devices 300-2, 300-3, 300-4, . . . , 300-n.

The locking apparatus 300-1 has been described above as a door lock installed in each of the entrances of the domains 1020, 1040, and 1060. However, when the locking apparatus 300-1 is embodied as a terminal apparatus that includes software supporting a locking function and thus provides a locking UI screen, the locking apparatus 300-1 may perform the above operation by short-distance accessing the user terminal apparatus 200 or based on authority information, e.g., a password and/or user ID, which is received according to a user input related to the locking UI screen.

Here, in the case of the home domain 1020, the authority information may be home key information for releasing or setting locking of the locking apparatus 300-1 which is a home locking apparatus. In the case of the automobile domain 1040, the authority information may be automobile key information for releasing or setting locking of the locking apparatus 300-1 which is an automobile locking apparatus. In the case of the office domain 1060, the office locking apparatus 300-1 may be office key information for releasing or setting locking of the locking apparatus 300-1 which is an office locking apparatus.

When the locking apparatus 300-1 is embodied as a terminal apparatus, such as a PC, which stores software supporting a locking function and thus provides a locking UI screen, the authority information may be a password and/or user ID.

However, the authority information is not limited thereto, and the authority information may be any of other various authority information for accessing the domain managed by the management server 100.

Thus, the user terminal apparatus 200 accessing the domain managed by the management server 100 based on the authority information may mean that the locking of the locking apparatus 300-1 is released based on the authority information and the management server 100 is accessed.

Here, the domain means a range or network managed by the management server 100. The range may include not only the devices 300-2, 300-3, 300-4, . . . , 300-n, but also the user terminal apparatus 200 accessing the management server 100. That is, the user terminal apparatus 200 may be controlled by the management server 100 based the on setting information.

Here, the user ID information means information for identifying a plurality of users, e.g., user IDs, telephone numbers, or serial numbers of users of the user terminal apparatus 200. In this case, the user ID information may include individual user ID information that is set for each of the plurality of users, and group user ID information that is set for a group including a plurality of users.

The user ID information may be set differently for each domain. For example, user ID information for the home domain 1020, user ID information for the automobile domain 1040, and user ID information for the office domain 1060 that are assigned to the same user may be different from one another. In this case, the user terminal apparatus 200 may transmit may user ID information corresponding to an appropriate domain. For example, if the user terminal apparatus 200 recognizes the home domain 1020 by short-distance accessing the locking apparatus 300-1, the management server 100, and the devices 300-2, 300-3, 300-4, . . . , 300-n that are included in the home domain 1020, then the user terminal apparatus 200 may extract user ID information corresponding to the home domain 1020 from the storage unit 220, and transmit the user ID information to the locking apparatus 300-1, the management server 100, and the devices 300-2, 300-3, 300-4, . . . , 300-n in the home domain 1020. Also, the setting information may include environment information related to the devices 300-2, 300-3, 300-4, . . . , 300-n that is set by a user corresponding to the user ID information. Here, the setting information may include device information, modification time information, modification place information, device setting information, and so on. The device information may be information about an object, e.g., a TV, or an air conditioner. The modification time information may be a time when the device setting information is modified. The modification place information may be information about a place in which the device setting information is modified. For example, in the case of a TV, the device setting information may be ON/OFF information, channel information, volume information, image quality information, information about a list of TV programs that have been recently viewed, etc. In the case of an air conditioner, the device setting information may be ON/OFF information, temperature information, airflow information, etc. In the case of a washing machine, the device setting information may be water temperature information, washing information, etc. In the case of a closed circuit TV (CCTV), the device setting information may be ON/OFF information. In the case of a robot cleaner, the device setting information may be ON/OFF information. In the case of a boiler, the device setting information may be ON/OFF information, temperature information, etc. In the case of a light, the device setting information may be brightness information, ON/OFF information, etc. In the case of a PC, the device setting information may be ON/OFF information, screen brightness information, volume information, mouse sensitivity information, user ID information, password information, etc. In the case of a projector, the device setting information may be ON/OFF information.

In one implementation, based on an operation of the management system 1000, a conference may be prepared as described below. Specifically, when a user performs short-distance accessing between the locking apparatus 300-1 installed at the entrance of a conference room and the user terminal apparatus 200, PCs installed in the conference room may be turned on and user IDs and passwords may be automatically input to the PCs to run operating systems (OSs) of the PCs. Also, a projector installed in the conference room may be turned on, thereby completing the preparation of the conference.

The setting information may be shared among the user terminal apparatus 200, the management server 100, and the devices 300-2, 300-3, 300-4, . . . , 300-n.

Also, the authority information, the user ID information, and the setting information may be assigned different protocols in units of networks. For example, a protocol used in a home network and a protocol used in an automobile network may be different from each other. In this case, the user terminal apparatus 200, the management server 100, or the devices 300-2, 300-3, 300-4, . . . , 300-n may use the authority information, the user ID information, and the setting information by selecting a protocol corresponding to a network.

Figure 2:
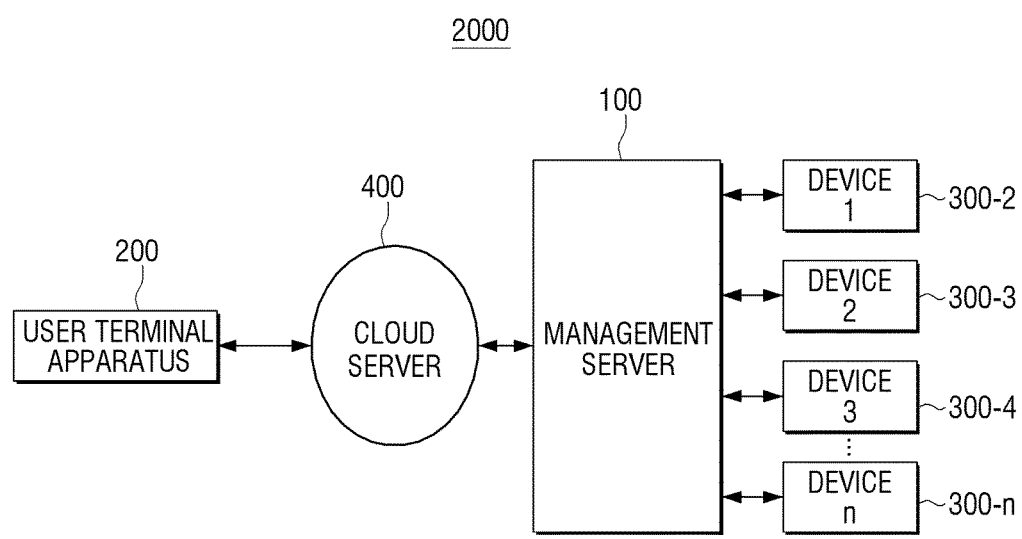
FIG. 2 is a diagram illustrating a management system consistent with another exemplary embodiment.

FIG. 2 is a diagram illustrating a management system 2000 according to another exemplary embodiment. Referring to FIG. 2, the management system 2000 includes at least some of a management server 100, a user terminal apparatus 200, at least one device (e.g., devices 300-2, 300-3, 300-4, . . . , 300-n), and a cloud server 400.

The cloud server 400 may store setting information corresponding to user ID information. Specifically, the cloud server 400 may store the setting information to be mapped to the user ID information. The setting information may be mapped to the user ID information and then be transmitted from the user terminal apparatus 200, the management server 100, and the devices 300-2, 300-3, 300-4, . . . , 300-n that are linked to the cloud server 400. In this case, when setting information about each of the devices 300-2, 300-3, 300-4, . . . , 300-n is changed or when a user command instructing to collect setting information is input, the setting information may be collected from the user terminal apparatus 200, the management server 100, and the devices 300-2, 300-3, 300-4, . . . , 300-n. Then, the collected setting information may be mapped to user ID information and then be transmitted.

Also, the cloud server 400 may store setting information corresponding to individual user ID information and setting information corresponding to group user ID information such that they are differentiated from each other.

The user terminal apparatus 200 may transmit user ID information to the cloud server 400. However, the user ID transmission is not limited thereto, and the user ID information may be transmitted to the cloud server 400 from the management server 100 or the devices 300-2, 300-3, 300-4, . . . , 300-n.

In this case, the cloud server 400 extracts setting information corresponding to the received user ID information, and then transmits the extracted setting information to the management server 100.

In this case, the devices 300-2, 300-3, 300-4, . . . , 300-n may be operated based on the setting information.

Also, the cloud server 400 may provide setting information corresponding to user ID information to the user terminal apparatus 200.

The management systems 1000 and 2000 described above with reference to FIGS. 1 and 2 may each perform integrated authentication or sequential authentication related to an authentication method.

In the case of the integrated authentication, when short-distance accessing is performed between the user terminal apparatus 200 and the locking apparatus 300-1, the user terminal apparatus 200 may transmit both authority information and user ID information to the locking apparatus 300-1. In this case, the locking apparatus 300-1 may release or set a locked state thereof based on the received authority information, and may transmit the received user ID information to the management server 100 or the cloud server 400. In this case, the management server 100 or the cloud server 400 may transmit a result of authenticating to the user terminal apparatus 200, based on whether the user ID information is registered.

In the case of the sequential authentication, when short-distance accessing is performed between the user terminal apparatus 200 and the locking apparatus 300-1, the user terminal apparatus 200 may transmit authority information to the locking apparatus 300-1. In this case, the locking apparatus 300-1 may release or set a locked state thereof, based on the received authority information, and a result of authenticating the authority information to the user terminal apparatus 200. When the authority information is authenticated, the user terminal apparatus 200 may transmit user ID information to the locking apparatus 300-1. In this case, the locking apparatus 300-1 may transmit the received user ID information to the management server 100 or the cloud server 400. Then, the management server 100 or the cloud server 400 may transmit a result of authenticating to the user terminal apparatus 200, based on whether the user ID information is registered or not.

Here, the results of authenticating may be transmitted in the form of a message, e.g., a short message service (SMS) or a multi-media message service (MMS).

The storage unit 220 of the user terminal apparatus 200 may store user information corresponding to each of domains. In this case, the user information may include at least one among authority information, user ID information, and setting information. The user information management unit 231 of the control unit 230 may detect the user information corresponding to each of the domains from the storage unit 220. Thus, the user terminal apparatus 200 may transmit the user information corresponding to each of domains to the locking apparatus 300-1. The locking apparatus 300-1 may release or set a locked state thereof, based on the authority information included in the received user information, and user terminal apparatus 200 may transmit the user ID information or the setting information included in the received user information to the management server 100.

When the management server 100 receives the user ID information, the management server 100 may extract setting information corresponding to the received user ID information. Then, the management server 100 may control the devices 300-2, 300-3, 300-4, . . . , 300-n included in the domain, based on the extracted setting information.

Otherwise, when the management server 100 receives setting information from the locking apparatus 300-1, the management server 100 may control the devices 300-2, 300-3, 300-4, . . . , 300-n in the domain, based on the received setting information.

Figure 3:
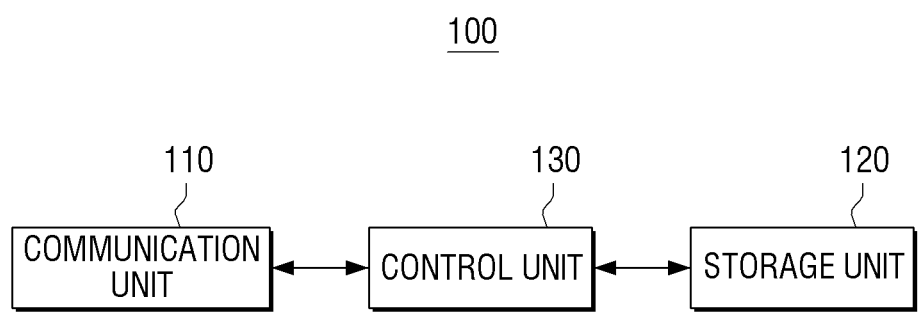
FIG. 3 is a block diagram of a management server consistent with an exemplary embodiment.

FIG. 3 is a block diagram of a management server 100 according to an exemplary embodiment. Referring to FIG. 3, the management server 100 includes a communication unit 110, a storage unit 120, and a control unit 130.

The communication unit 110 connects the management server 100 with an external device. In particular, when the user terminal apparatus 200 that stores authority information accesses a domain managed by the management server 100, based on the authority information, the communication unit 110 may receive user ID information from the user terminal apparatus 200.

Otherwise, when the user terminal apparatus 200 storing authority information accesses a domain managed by the management server 100, based on the authority information, the communication unit 110 may receive setting information stored in the user terminal apparatus 200.

Here, the communication unit 110 may receive either the user ID information or the setting information stored in the user terminal apparatus 200 by short-distance accessing the user terminal apparatus 200. For example, when a user performs short-distance accessing between the user terminal apparatus 200 and an external server, the communication unit 110 may receive either the user ID information or the setting information stored in the user terminal apparatus 200 from the user terminal apparatus 200 through short-distance accessing, as will be described below with reference to FIGS. 6 and 9.

Also, when the user terminal apparatus 200 transmits either authority information and user ID information or authority information and setting information stored in the user terminal apparatus 200 to the locking apparatus 300-1 by short-distance wireless communication, the communication unit 110 may receive the user ID information or the setting information stored in the user terminal apparatus 200 from the locking apparatus 300-1. For example, when a user performs short-distance accessing between the user terminal apparatus 200 and the locking apparatus 300-1, the locking apparatus 300-1 may determine whether the domain managed by the management server 100 is accessible to the user, based on the authority information, and then determine whether to release a locked state thereof according to a result of the determining whether the domain is accessible to the user. In this case, when the locked state of the locking apparatus 300-1 is released, the communication unit 110 may receive the user ID information or the setting information stored in the user terminal apparatus 200 from the locking apparatus 300-1, as will be described below with reference to FIGS. 5 and 8.

Also, when the user terminal apparatus 200 provides user ID information to at least one device other than the locking apparatus 300-1 by short-distance wireless communication, the communication unit 110 may receive the user ID information or setting information stored in the user terminal apparatus 200 from the at least one device. For example, when a user performs short-distance accessing between the user terminal apparatus 200 and at least one device other than the locking apparatus 300-1, the communication unit 110 may receive the user ID information or the setting information stored in the user terminal apparatus 200 from the at least one device, as will be described below with reference to FIGS. 7 and 10.

Also, when the user terminal apparatus 200 provides authority information and user ID information to the locking apparatus 300-1 according to the short-distance wireless communication, the communication unit 110 may receive either the authority information and the user ID information or the authority information and setting information stored in the user terminal apparatus 200 from the locking apparatus 300-1. For example, when a user performs short-distance accessing between the user terminal apparatus 200 and the locking apparatus 300-1, the communication unit 110 may receive either the authority information and the user ID information or the authority information and setting information stored in the user terminal apparatus 200 from the locking apparatus 300-1. In this case, the control unit 120 may control a locked state of the locking device 300-1 to be released or set, based on whether the received authority information is authority information that enables the user terminal apparatus 200 to access a domain managed by the management server, as will be described below with reference to FIGS. 5 and 8.

Here, the short-distance wireless communication may be performed between the user terminal apparatus 200 and one of the management server 100, the locking apparatus 300-1, and the devices 300-2, 300-3, 300-4, . . . , 300-n. Specifically, in the case of the short-distance wireless communication, the user terminal apparatus 200 includes a short-distance wireless communication tag, and the management server 100, the locking apparatus 300-1, and the devices 300-2, 300-3, 300-4, . . . , 300-n each include a short-distance wireless communication reader. In this case, when the user terminal apparatus 200 is within a short-distance communication range of the management server 100, the locking apparatus 300-1, or the devices 300-2, 300-3, 300-4, . . . , 300-n, the short-distance wireless communication reader included in the management server 100, the locking apparatus 300-1, or the devices 300-2, 300-3, 300-4, . . . , 300-n reads information recorded in the short-distance wireless communication tag included in the user terminal apparatus 200.

Here, 'short-distance accessing' means that at least one among the user terminal apparatus 200, the management server 100, the locking apparatus 300-1, and the devices 300-2, 300-3, 300-4, . . . , 300-n is within a communication range in which a short-distance wireless communication may be established. When at least one among the user terminal apparatus 200, the management server 100, the locking apparatus 300-1, and the devices 300-2, 300-3, 300-4, . . . , 300-n is moved within such a region, the short-distance wireless communication reader included in the management server 100, the locking apparatus 300-1, or the devices 300-2, 300-3, 300-4, . . . , 300-n may read information recorded in a short-distance wireless communication tag included in an external device. An example of the short-distance wireless communication may be near-field communication (NFC). NFC is a non-contact short-distance wireless communication technique using a frequency of 13.56 MHz. If NFC technology is used, data may be exchanged when a plurality of terminals access each other within a short distance of about 10 cm or less. When short-distance accessing is provided, the short-distance wireless communication reader may receive user ID information, authority information, or setting information stored in the user terminal apparatus 200 from the short-distance wireless communication tag included in the external device.

Other examples of the short-distance wireless communication may include a barcode-based method, a quick response (QR) code-based method, Wi-Fi, ZigBee, Bluetooth, etc.

An NFC tag may include an integrated circuit (IC) and antenna coil. When short-distance accessing is performed on an apparatus including an NFC reader, an NFC module is driven by electromagnetic waves emitted from the NFC reader, and transmits a radio-frequency (RF) signal containing information recorded in the NFC tag. Current is induced by the antenna coil in the NFC tag due to the electromagnetic waves emitted from the NFC reader. The induced current is charged in a capacitor included in the NFC tag. The IC is driven by the current charged in the capacitor, and modulates or codes stored information to generate the RF signal.

The NFC module may generate an RF signal according to a predetermined modulating technology and coding technology among various modulating technologies and coding technologies. Here, the modulating technologies may be technologies of loading data by changing, for example, an amplitude, frequency, and phase of an RF carrier signal exchanged between the NFC tag and the NFC reader. The modulating technologies include amplitude shift keying (ASK), frequency shift keying (FSK), phase shift keying (PSK), etc. In the ASK, the amplitude of a carrier signal is shifted according to whether a digital information signal is '0' or '1'. For example, the amplitude of the carrier signal is reduced when the digital information signal is '0' and is increased when the digital information signal is '1', and then the carrier signal is transmitted. A 1-bit may be transmitted when a two-step signal amplitude is used, and 2-bits may be simultaneously transmitted when a four-step signal amplitude is used. In the FSK, bits of 0 and 1 that are digital signals are transmitted by allocating the bits of 0 and 1 to two different frequencies, e.g., a low frequency and a high frequency, respectively. For example, an information signal is transmitted by generating a frequency that is lower than a carrier frequency when the information signal is '0' and generating a frequency that is higher than the carrier frequency when the information signal is '1'. In the PSK, the phase of a carrier wave is changed according to data that is to be transmitted. The degree to which the phase of the carrier wave is to be changed is determined by data that is to be transmitted. The phase of the carrier wave is shifted by 180 degrees when the data that is to be transmitted is '0' and is shifted by 90 degrees when the data that is to be transmitted is '1', and each of pieces of information is transmitted at once on a basis of bits. In addition, examples of coding technologies may include the modified Miller coding method and the Manchester coding method.

A modulating technology and a coding technology may be appropriately selected according to a type of a device and an ambient environment. If a NFC tag is a passive type tag that does not include a battery and is driven by current induced by current due to electromagnetic waves emitted from a NFC reader, then the ASK and the Manchester coding method may be used. If the NFC tag is an active type tag capable of generating power and communicating with an external NFC reader, the ASK and the Modified Miller coding method may be used at a speed of 106 kbps and the ASK and the Manchester coding method may be used at speeds of 212 kbps and 424 kbps.

The user information that includes the at least one among the authority information, the user ID information, and the setting information may be transmitted and received according to an NFC Data Exchange Format (NDEF), as will be described with reference to FIG. 53 below.

Figure 53:
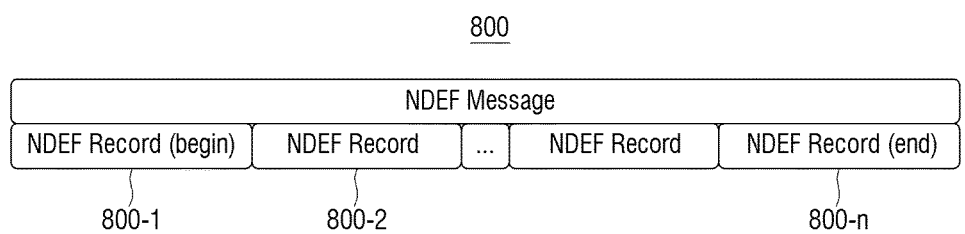
FIG. 53 is a diagram illustrating a near-field communication data exchange format (NDEF) consistent with an exemplary embodiment.

FIG. 53 is a diagram illustrating a near-field communication data exchange format (NDEF) consistent with an exemplary embodiment. Referring to FIG. 53, an NDEF message 800 is one basic message unit including a plurality of NDEF records 800-1, 800-2, and 800-n.

Here, each of the plurality of NDEF records 800-1, 800-2, and 800-n may include a record header field representing basic information regarding the record, a type length field representing the length of a data type, a payload length field representing the length of a payload, an ID length field representing ID length, a type field representing the type of a payload included in the record, a payload ID field representing the ID of a payload included in the record, and a payload field representing the payload included in the record.

Each of the plurality of NDEF records 800-1, 800-2, and 800-n may contain one piece of data that is a payload, and may be needed to transmit/receive the payload.

Thus, when the authority information and the user ID information are transmitted/received, the authority information and the user ID information may be transmitted/received via two NDEF records among the different NDEF records 800-1, 800-2, ..., 800-n of one NDEF message 800, respectively.

When the authority information and the setting information are transmitted/received, the authority information and the setting information may be transmitted/received via two NDEF records among the different NDEF records 800-1, 800-2, ..., 800-n of one NDEF message 800, respectively. In this case, the setting information may be divided in units of devices and then be transmitted/received via the different NDEF records 800-1, 800-2, ..., 800-n of one NDEF message 800, respectively. However, since the setting information includes various information, e.g., device information, modification time information, modification place information, and device setting information, as described above, all of the setting information may not be transmitted/received via one NDEF message 800 according to the features of the NFC. In this case, a plurality of NDEF messages 800 may be used to transmit/receive the authority information and the setting information.

Also, the communication unit 120 may receive various information in a wired/wireless manner according to short-distance wireless communication, a local area network (LAN), or the Internet, or may receive various information via a universal serial bus (USB) port.

The storage unit 120 stores various programs and data required to drive the management server 100. In particular, the storage unit 120 stores setting information regarding at least one device to be mapped to user ID information. Here, the storage unit 120 may store setting information corresponding to individual user ID information and setting information corresponding to group user ID information such that they are differentiated from each other. For example, the storage unit 120 may store setting information to be mapped as shown in Table 1 below.

TABLE 1

| User ID information | Device information | Modification time information | Modification place information | Device setting information |
|---|---|---|---|---|
| A | TV | 2012-03-20 11:50 | Living Room | Driving: on Channel: MBC Volume: 50% |
| | Air conditioner | 2012-03-21 12:00 | Living Room | Temperature: 23° C. Airflow: Strong wind |
| | Washing machine | 2012-03-21 1:00 | Restroom | Driving: ON Operate: Washing Machine |
| B | TV | 2012-03-22 1:00 | Room 1 | Driving: ON Channel: MBC Volume: 50% |
| | Air conditioner | 2013-03-22 12:00 | Room 1 | Temperature: 25° C. Airflow: Soft Wind |
| | Illumination System | 2012-03-22 12:00 | Living Room | Driving: ON Brightness: 30% |
| | Illumination System | 2012-03-21 12:00 | Room 1 | Driving: ON Brightness: 80% |

When a user uses the devices 300-2, 300-3, 300-4, ..., 300-n in the domain, the setting information regarding the devices 300-2, 300-3, 300-4, ..., 300-n may be updated. In this case, the storage unit 120 may store the updated setting information to be mapped to the user ID information.

In an initial state in which the setting information mapped to the user ID information is not set, the storage unit 120 may store the setting information to have a default value.

The storage unit 120 may be embodied as a built-in storage device, e.g., a random access memory (RAM), a flash memory, a read only memory (ROM), an erasable programmable ROM (EPROM), an electrically erasable programmable ROM (EEPROM), a register, a hard disc, a removable disc, and a memory card; or an attachable/detachable storage device, e.g., a USB memory and a compact disc (CD)-ROM.

The control unit 130 controls overall operations of the management server 100. That is, the control unit 130 may control at least one of the communication unit 110 and the storage unit 120. The control unit 130 may be a central processing unit (CPU), a microprocessor, etc.

In particular, the control unit 130 may control the communication unit 110 to provide the user terminal apparatus 200 or at least one device with notification information indicating whether received authority information is authentication information that enables the user terminal apparatus 200 or the at least one device to access a domain managed by the management server 100.

Also, the control unit 130 may extract setting information corresponding to user ID information and controls at least one device in a domain based on the extracted setting information.

Here, the control unit 130 may extract setting information corresponding to user ID information from the storage unit 120 included in the management server 100, and control at least one device in a domain based on the extracted setting information. For example, in the case of a TV in a first room, the storage unit 120 may store the received user ID information to be mapped to channel information, volume information, image quality information, and information about a list of TV programs that have recently been viewed. In the case of an air conditioner in a second room, the storage unit 120 may store the received user ID information to be mapped to temperature information and airflow information. In the case of a washing machine in a restroom, the storage unit 120 may store the received user ID information to be mapped to water temperature information and washing information. In this case, the control unit 130 may extract the setting information. Thus, the control unit 130 may generate a control signal for controlling the TV, the air conditioner, and the washing machine installed in the first and second rooms and the restroom in a home domain, based on extracted setting information. Then, the control unit 130 may provide the control signal to the TV, the air conditioner, and the washing machine. In this case, each of the TV, the air conditioner, and the washing machine may set setting information thereof and operate according to the received control signal.

Also, the control unit 130 may extract setting information stored in the user terminal apparatus 200, and control at least one device in a domain, based on the extracted setting information. For example, setting information regarding each of devices may be stored in the user terminal apparatus 200. In this case, the control unit 130 may receive the setting information stored in the user terminal apparatus 200. Then, the control unit 130 may generate a control signal for controlling at least one device in the domain, based on the received setting information. Also, the control unit 130 may provide the control signal to the at least one device. In this case, the at least one device may set setting information thereof and operate according to the control signal.

Also, the control unit 130 may extract setting information stored in the at least one device in the domain, and control the at least one device based on the extracted setting information. For example, setting information regarding the devices (e.g., devices 300-2, 300-3, 300-4, . . . , 300-n) may be stored in the devices 300-2, 300-3, 300-4, . . . , 300-n. In this case, the control unit 130 may transmit the user ID information to the devices 300-2, 300-3, 300-4, . . . , 300-n, and receive the setting information mapped to the user ID information from each of the devices 300-2, 300-3, 300-4, . . . , 300-n. Then, the control unit 130 may generate a control signal for controlling the devices 300-2, 300-3, 300-4, . . . , 300-n in the domain, based on the received setting information. Then, the control unit 130 may provide the control signal to the devices 300-2, 300-3, 300-4, . . . , 300-n. In this case, the devices 300-2, 300-3, 300-4, . . . , 300-n may set the setting information thereof and operate according to the control signal.

However, the exemplary embodiment is not limited thereto, and each of the devices 300-2, 300-3, 300-4, . . . , 300-n may extract setting information corresponding to received user ID information. In this case, the devices 300-2, 300-3, 300-4, . . . , 300-n may operate based on the extracted setting information, not under control of the management server 100.

Also, the control unit 130 may extract setting information stored in the cloud server 400 connected to the management server 100, and control at least one device in a domain based on the extracted setting information. For example, setting information regarding each of the at least one device may be stored in the cloud server 400. In this case, the control unit 130 may transmit received user ID information to the cloud server 400, and receive setting information mapped to the user ID information from the cloud server 400. Then, the control unit 130 may generate a control signal for the at least one device in the domain, based on the received setting information. Then, the control unit 130 may provide the control signal to the at least one device. In this case, the at least one device may set the setting information thereof and operate according to the control signal.

The control unit 130 may extract setting information corresponding to individual user ID information when received user ID information is the individual user ID information, and may extract setting information corresponding to group user ID information when the received user ID information is the group user ID information. For example, in the case of a home network, an individual user may use the home network alone, but the user's family may also the home network. In this case, setting information regarding at least one device belonging to the individual user and setting information regarding at least one device belonging to the family may be different. Thus, the control unit 130 may determine whether the received user ID information is the individual user ID information or the group user ID information for the family, and extract setting information corresponding to a result of determining whether the received user ID information is the individual user ID information or the group user ID information.

Also, the control unit 130 may determine that received individual user ID information of an individual user as group user ID information, based on history information regarding a result of authenticating authority information of a previous user other than the user corresponding to the received individual user ID information. For example, in the case of a home network, in general, a second user may access the home network after a first user accesses the home network. In this case, since the first user accessed the home network before the second user accesses the home network, the control unit 130 may determine that user ID information as group user ID information for both the first and second users. When setting information regarding at least one device is updated, the control unit 130 may store the updated setting information to be mapped to the group user ID information.

If setting information corresponding to received individual user ID information is updated after at least one device is controlled according to the setting information based on the received individual user ID information and the setting information is the same as setting information corresponding to group user ID information, then the control unit 130 may determine a current user environment as a group user environment. For example, in the case of a home network, in general, although the home network is accessed for use by a family, the home network may be accessed using authority information of only one user. In this case, although at least one device has been set based on setting information of the user who provides user ID information, the user's family members may update the setting information of the at least one device according to their needs. In this case, when updated setting information of the at least one device setting information is the same as setting information of a group corresponding to group user ID information, the control unit 130 may determine a current user environment as a group user environment. In this case, when the setting information of the at least one device is updated, the control unit 130 may store the updated setting information to be mapped to group user ID information.

Also, the control unit 130 may associate and store user setting information and user ID information corresponding to a domain. For example, in the case of a home network, when a TV, an air conditioner, a washing machine, and an illumination system are included in the home network, the control unit 130 may control user setting information regarding the TV, the air conditioner, the washing machine, and the illumination system included in a domain of the management server 200 in the home network to be stored such that the setting information is mapped to user ID information.

When user setting information regarding at least one device is updated, the control unit 130 may control the updated user setting information to be stored such that the updated user setting information is mapped to user ID information. Specifically, when the user's setting information regarding the at least one device is changed, the management server 100 may receive the changed setting information via the communication unit 110. In this case, the control unit 130 may control the changed setting information to be stored such that the changed setting information is mapped to the user ID information.

Also, when a user command to obtain user setting information regarding at least one device is received, the control unit 130 may receive the user setting information and store the user setting information to be mapped to user ID information.

Also, when short-distance accessing is performed between the user terminal apparatus 200 and the locking apparatus 300-1 and the locking apparatus 300-1 is locked, the control unit 130 may receive user setting information regarding at least one device and store the user setting information to be mapped to user ID information at a point of time when the locking apparatus 300-1 is locked.

Also, when received user ID information is individual user ID information, the control unit 130 may store user setting information to be mapped to the individual user ID information. When the received user ID information is group user ID information, the control unit 130 may store user setting information to be mapped to the group user ID information.

The control unit 130 may control user setting information and user ID information corresponding to a domain to be stored in the storage unit 120 included in the management server 100, as will be described below with reference to FIGS. 17 to 19.

The control unit 130 may also control user setting information and user ID information corresponding to a domain to be stored with respect to the devices 300-2, 300-3, 300-4, . . . , 300-n, as will be described below with reference to FIGS. 20 and 21.

The control unit 130 may also control user setting information and user ID information corresponding to a domain to be stored with respect to the user terminal apparatus 200, as will be described below with reference to FIG. 22.

The control unit 130 may include a central processing unit (CPU), a ROM storing a control program, and a RAM configured to memorize input data or to be used as a work-related memory region. The CPU, the ROM, and the RAM may be connected via an internal bus.

The management server 200 may further include a display unit (not shown). The display unit displays extracted setting information and user ID information. Specifically, in the case of a TV, the display unit may display channel information, volume information, image quality information, and information regarding a list of TV programs that have recently been viewed, together with user ID information. In the case of an air conditioner, the display unit may display temperature information, airflow information, and so on, together with user ID information.

The display unit may be embodied as at least one among a liquid crystal display, a thin film transistor (TFT)-LCD, an organic light-emitting diode (OLED), a flexible display, and a three-dimensional (3D) display.

The management server 100 according to the above exemplary embodiment may extract setting information corresponding to receive user ID information and may thus easily perform environment setting for at least one device in a domain thereof.

Figure 4:
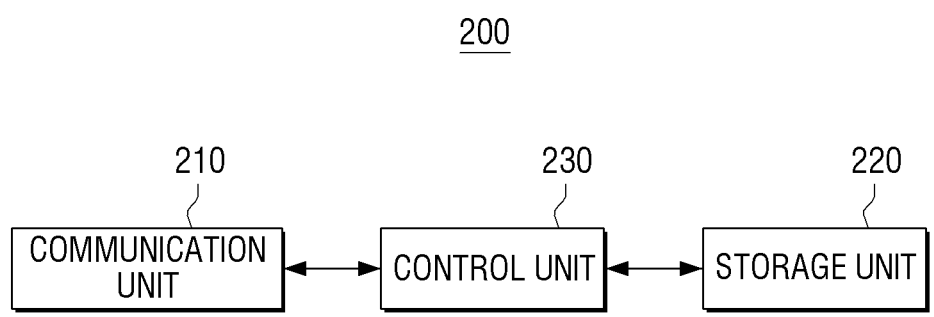
FIG. 4 is a block diagram of a user terminal apparatus consistent with an exemplary embodiment.

FIG. 4 is a block diagram of a user terminal apparatus 200 according to an exemplary embodiment. Referring to FIG. 4, the user terminal apparatus 200 includes a communication unit 210, the storage unit 220, and the control unit 230

The communication unit 210 connects the user terminal apparatus 200 to an external device. In particular, the communication unit 210 may transmit extracted setting information. Specifically, when the user terminal apparatus 200 accesses a domain managed by the management server 100 based on authority information enabling the user terminal apparatus 200 to access the domain, the communication unit 210 may transmit setting information extracted from setting information stored in the user terminal apparatus 200.

The extracted setting information may be transmitted by short-distance accessing between the user terminal apparatus 200 and the management server 100. Otherwise, the extracted setting information may be transmitted by short-distance accessing between the user terminal apparatus 200 and the locking apparatus 300-1. Otherwise, the extracted setting information be transmitted by short-distance accessing between the user terminal apparatus 200 and one of the devices 300-2, 300-3, 300-4, . . . , 300-n. This will be described below with reference to FIGS. 8 to 10.

In the case of a home network, the extracted setting information may include channel information, volume information, image quality information, and information regarding a list of TV programs that have recently been viewed (in the case of a TV in a first room), may include temperature information, airflow information (in the case of an air conditioner in a second room), and may include water temperature information and washing information (in the case of a washing machine in a restroom). Thus, when the management server 200 receives the extracted setting information, the management server 200 may generate a control signal for controlling the TV, the air conditioner, and the washing machine installed in the first room, the second room, and the restroom in a home domain, based on the extracted setting information. In this case, each of the TV, the air conditioner, and the washing machine may set setting information thereof and operate according to the control signal.

The storage unit 220 stores various programs and data required to drive the user terminal apparatus 200. In particular, the storage unit 220 may store user ID information, authority information, and setting information regarding at least one device. The control unit 230 controls overall operations of the user terminal apparatus 200. Specifically, the control unit 230 may control at least one of the communication unit 210 and the storage unit 220.

In particular, the control unit 230 may allow the management server 100 to control at least one device in a domain based on extracted setting information.

When updated setting information regarding the at least one device is received from the management server 100 via the communication unit 210, the control unit 230 may control the storage unit 220 to store the updated setting information.

When updated setting information regarding the at least one device is received from the at least one device via the communication unit 210, the control unit 230 may control the storage unit 220 to store the updated setting information.

The control unit 230 may control the user terminal apparatus 200 to withdraw or disconnect from the domain managed by the management server 100 or to receive and store setting information when a user command instructing to receive the setting information is received. As a case in which the user terminal apparatus 200 to withdraw from the domain managed by the management server 100, for example, the user terminal apparatus 100 may lock the locking apparatus 300-1 by performing short-distance accessing between the user terminal apparatus 100 and the locking apparatus 300-1. If the user terminal apparatus 200 withdraws from the domain managed by the management server 100, the management server 100 may provide the user terminal apparatus 200 with a notification signal notifying this face.

A user terminal apparatus according to the above exemplary embodiment may transmit extracted setting information and thus easily perform environment setting for at least one device included in a domain of a management server.

Figure 5:
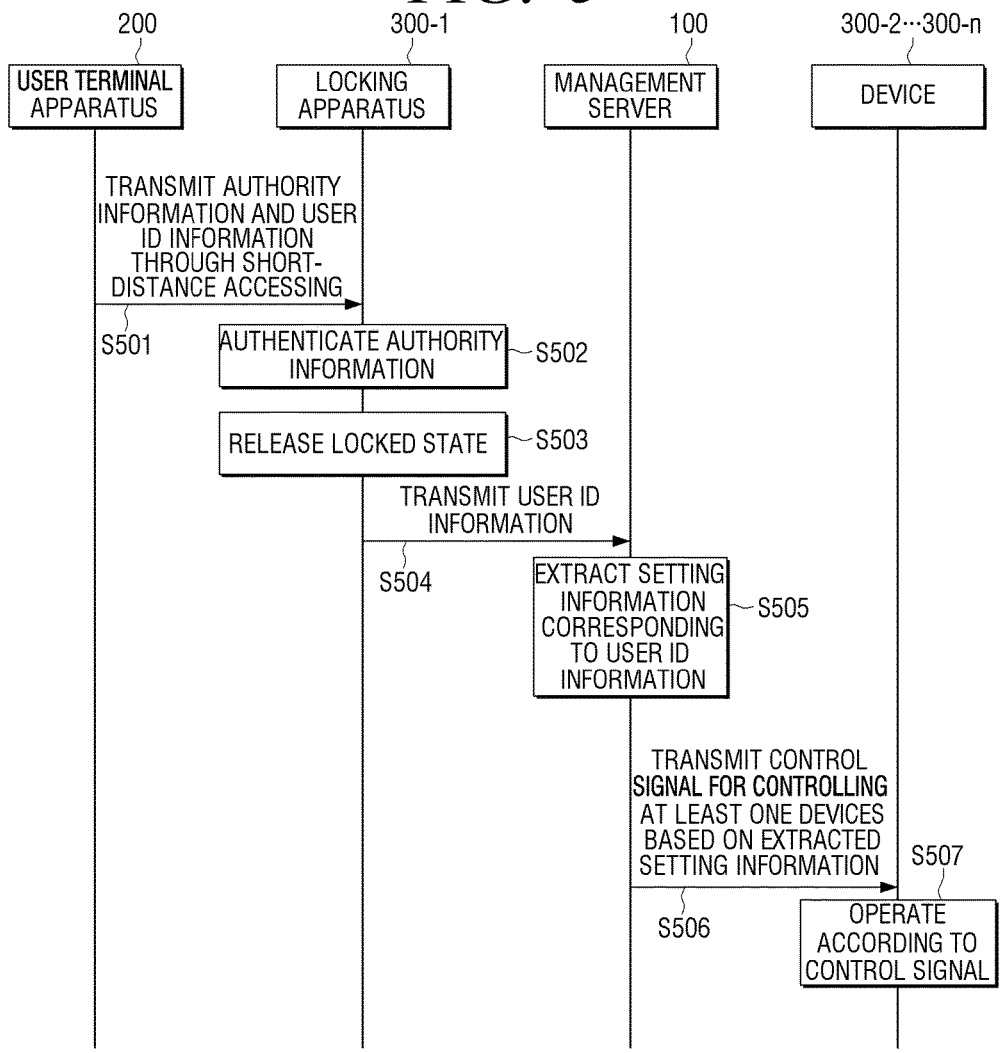
FIGS. 5 to 7 are timing diagrams illustrating methods of storing setting information and controlling at least one device based on the setting information, performed by a management server consistent with exemplary embodiments.
Figure 6:
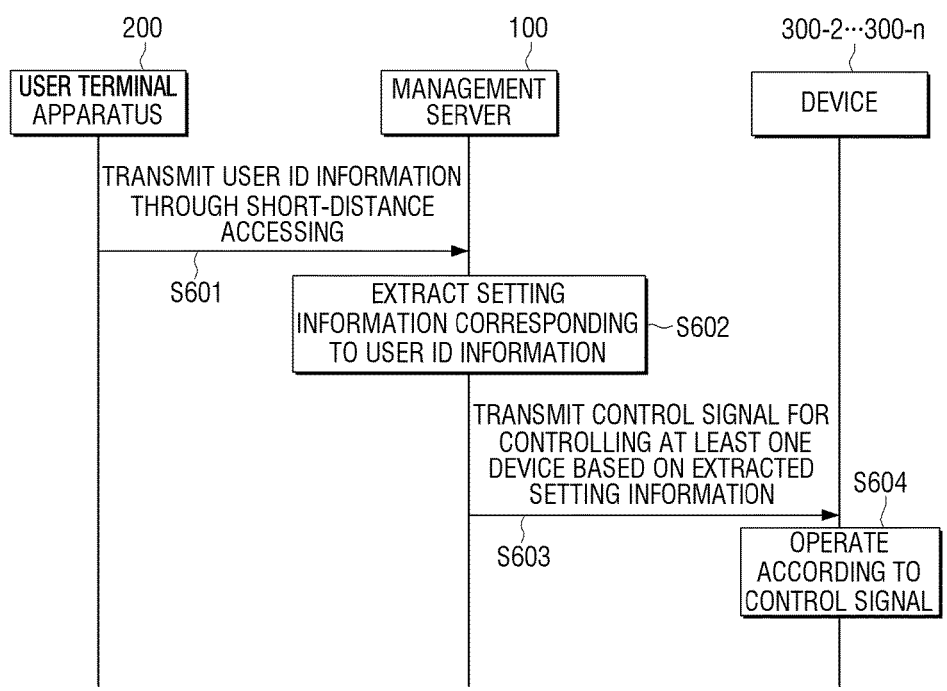
Figure 7:
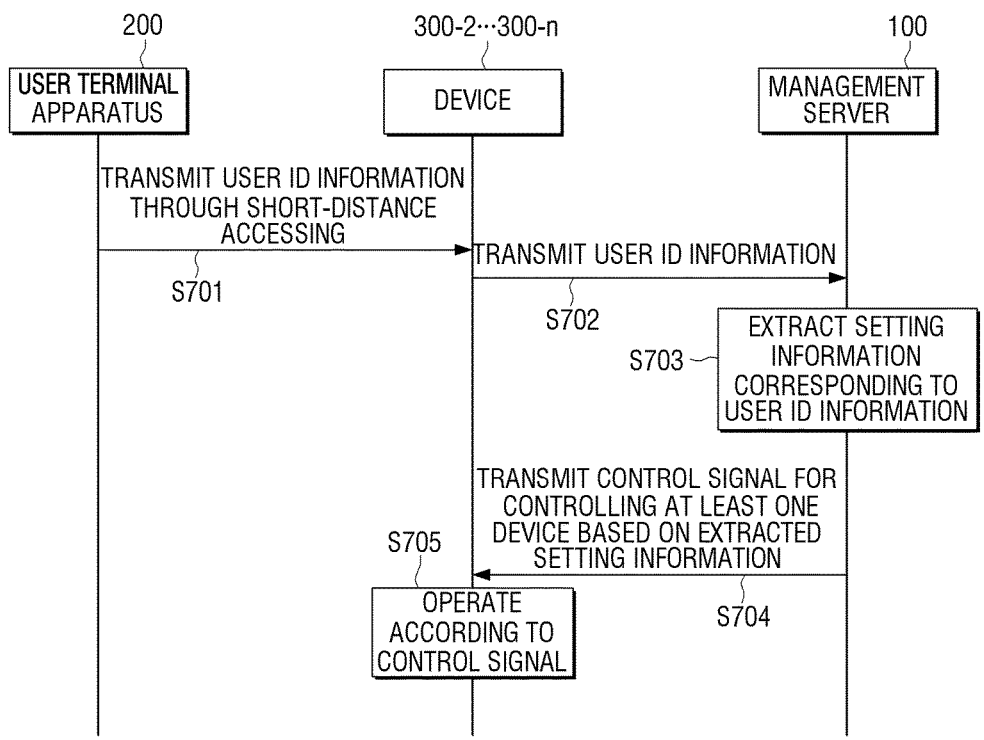

FIGS. 5 to 7 are timing diagrams illustrating methods of storing setting information and controlling at least one device (e.g., devices 300-2, 300-3, 300-4, ..., 300-n) based on the setting information, performed by a management server 100 according to exemplary embodiments.

Referring to FIG. 5, a user terminal apparatus 200 transmits authority information and user ID information to a locking apparatus 300-1 by short-distance accessing the locking apparatus 300-1 (operation S501).

In this case, the locking apparatus 300-1 authenticates whether authority information of the user terminal apparatus 200 received from the user terminal apparatus 200 is authority information that enables the user terminal apparatus 200 to access a domain managed by the management server 100 (operation S502).

Then, if the authority information is authenticated enabling the user terminal apparatus 200 to access the domain managed by the management server 100, then the locking apparatus 300-1 releases a locked state thereof (operation S503). Then, the locking apparatus 300-1 transmits the user ID information to the management server 100 (operation S504).

In this case, the management server 100 extracts setting information corresponding to the user ID information (operation S505). Then, the management server 100 transmits a control signal for controlling the devices 300-2, 300-3, 300-4, ..., 300-n to the devices 300-2, 300-3, 300-4, ..., 300-n, based on the extracted setting information (operation S506).

Then, the devices 300-2, 300-3, 300-4, ..., 300-n operate according to the control signal received from the management server 100 (operation S507).

Although the locking apparatus 300-1 is described above as authenticating the authority information with reference to FIG. 5, the locking apparatus 300-1 may be used only as a medium via which the authority information and the user ID information are transmitted to the management server 100 in some cases. In this case, the management server 100 may authenticate the authority information, and control the locking apparatus 300-1 to release the locked state thereof when the authority information is authenticated.

Referring to FIG. 6, a user terminal apparatus 200 transmits user ID information to the management server 100 by short-distance accessing the management server 100 (operation S601).

Then, the management server 100 extracts setting information corresponding to the user ID information (operation S602). The management server 100 transmits a control signal for controlling the devices 300-2, 300-3, 300-4, ..., 300-n to the devices 300-2, 300-3, 300-4, ..., 300-n, based on the extracted setting information (operation S603).

Then, the devices 300-2, 300-3, 300-4, ..., 300-n operate according to the control signal received from the management server 100 (operation S604).

Referring to FIG. 7, a user terminal apparatus 200 transmits user ID information to at least one device (e.g., devices 300-2, 300-3, 300-4, ..., 300-n) by short-distance accessing the devices 300-2, 300-3, 300-4, ..., 300-n (operation S701).

Then, the devices 300-2, 300-3, 300-4, ..., 300-n transmit the user ID information to the management server 100 (operation S702).

Then, the management server 100 extracts setting information corresponding to the user ID information (operation S703). The management server 100 transmits a control signal for controlling the devices 300-2, 300-3, 300-4, ..., 300-n to the devices 300-2, 300-3, 300-4, ..., 300-n, based on the extracted setting information (operation S704). Then, the devices 300-2, 300-3, 300-4, ..., 300-n operate according to the control signal received from the management server 100 (operation S705).

Figure 8:
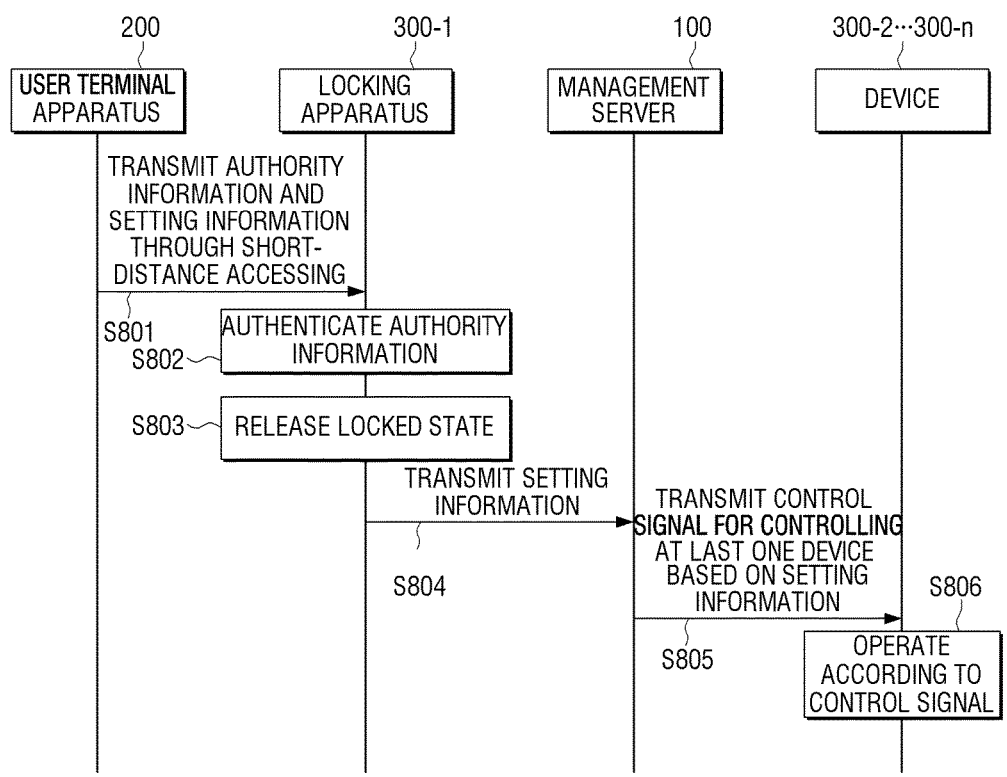
FIGS. 8 to 10 are timing diagrams illustrating methods of storing setting information and controlling at least one device based on the setting information, performed by a user terminal apparatus consistent with exemplary embodiments.
Figure 9:
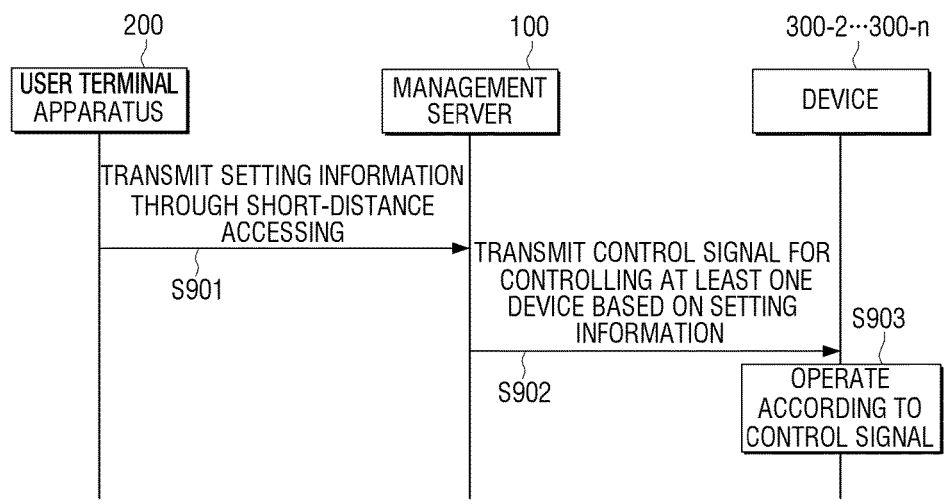
Figure 10:
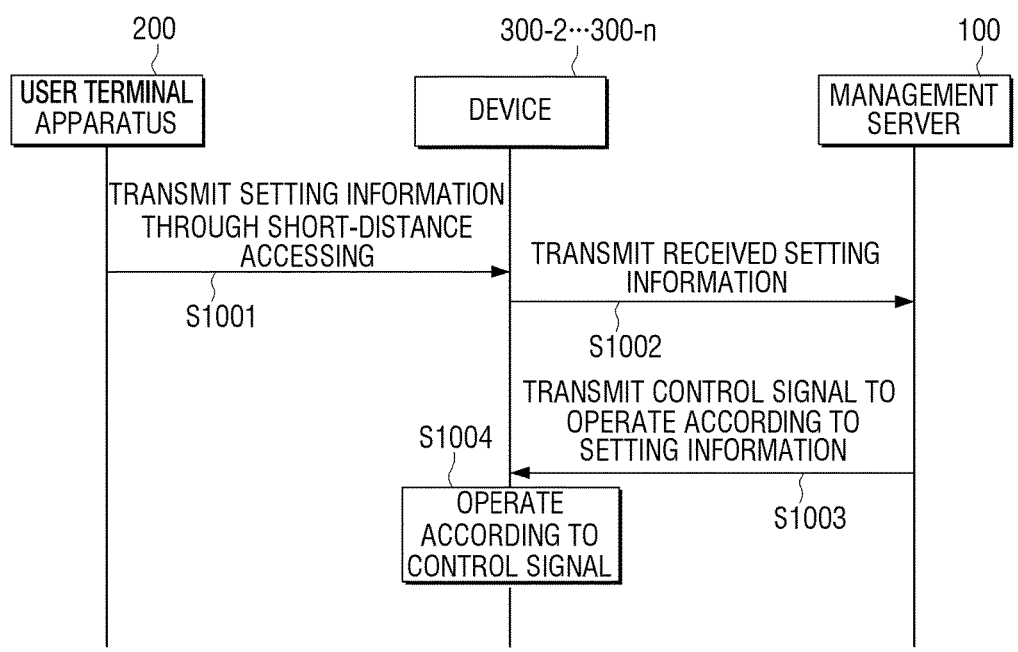

FIGS. 8 to 10 are timing diagrams illustrating methods of storing setting information and controlling at least one device (e.g., devices 300-2, 300-3, 300-4, ..., 300-n) based on the setting information, performed by a user terminal apparatus 200 according to exemplary embodiments.

Referring to FIG. 8, the user terminal apparatus 200 transmits authority information and setting information to a locking apparatus 300-1 by short-distance accessing the locking apparatus 300-1 (operation S801).

In this case, the locking apparatus 300-1 authenticates whether the authority information of the user terminal apparatus 200 received from the user terminal apparatus 200 is authority information that enables the user terminal apparatus 200 to access a domain managed by the management server 100 (operation S802).

If it is authenticated that the authority information enables the user terminal apparatus 200 to access the domain managed by the management server 100, the locking apparatus 300-1 releases a locked state (operation S803). Then, the locking apparatus 300-1 transmits the received setting information to the management server 100 (operation S804).

Then, the management server 100 transmits a control signal for controlling the devices 300-2, 300-3, 300-4, ..., 300-n to the devices 300-2, 300-3, 300-4, ..., 300-n, based on the setting information (operation S805).

Then, the devices 300-2, 300-3, 300-4, ..., 300-n operate according to the control signal received from the management server 100 (operation S806).

Although the locking apparatus 300-1 is described above as authenticating the authority information with reference to FIG. 8, the locking apparatus 300-1 may be used only as a medium via which the authority information and the user ID information are transmitted to the management server 100. In this case, the management server 100 may authenticate the authority information, and control the locking apparatus 300-1 to release the locked state thereof when the authority information is authenticated.

Referring to FIG. 9, the user terminal apparatus 200 transmits setting information to a management server 100 by short-distance accessing the management server 100 (operation S901).

Then, the management server 100 transmits a control signal for controlling at least one device (e.g., devices 300-2, 300-3, 300-4, . . . , 300-n) to the devices 300-2, 300-3, 300-4, . . . , 300-n, based on the setting information (operation S902).

Then, the devices 300-2, 300-3, 300-4, . . . , 300-n operate according to the control signal received from the management server 100 (operation S903).

Referring to FIG. 10, the user terminal apparatus 200 transmits setting information to at least one device (e.g., devices 300-2, 300-3, 300-4, . . . , 300-n) by directly short-distance accessing the devices 300-2, 300-3, 300-4, . . . , 300-n (operation S1001).

Then, the devices 300-2, 300-3, 300-4, . . . , 300-n transmit the setting information to the management server 100 (operation S1002).

Then, the management server 100 transmits a control signal for controlling the devices 300-2, 300-3, 300-4, . . . , 300-n to the devices 300-2, 300-3, 300-4, . . . , 300-n, based on the setting information (operation S1003). Then, the devices 300-2, 300-3, 300-4, . . . , 300-n operate according to the control signal received from the management server 100 (operation S1004).

Although the devices 300-2, 300-3, 300-4, . . . , 300-n are described above as operating under control of the management server 200 with reference to FIG. 10, the devices 300-2, 300-3, 300-4, . . . , 300-n may directly operate based on setting information received through short-distance accessing. For example, if the device 300-2, 300-3, 300-4, . . . , 300-n is a TV and receives TV channel information and TV volume information by short-distance accessing the user terminal apparatus 200, then the device 300-2, 300-3, 300-4, . . . , 300-n may be directly set based on the setting information.

Figure 11:
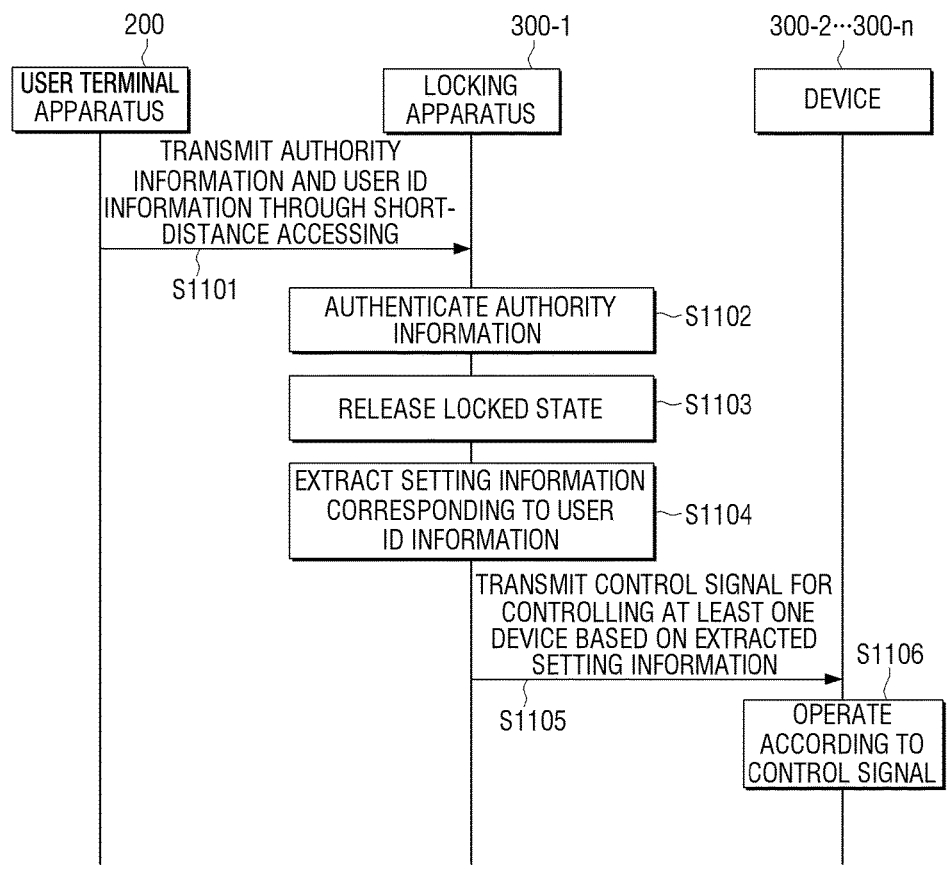
FIG. 11 is a timing diagram illustrating a method of storing setting information and controlling at least one device based on the setting information, performed by a locking apparatus consistent with another exemplary embodiment.

FIG. 11 is a timing diagram illustrating a method of storing setting information and controlling at least one device (e.g., devices 300-2, 300-3, 300-4, . . . , 300-n) based on the setting information, performed by a locking apparatus 300-1 according to an exemplary embodiment.

Referring to FIG. 11, a user terminal apparatus 200 transmits authority information and user ID information to the locking apparatus 300-1 by short-distance accessing the locking apparatus 300-1 (operation S1101).

Then, the locking apparatus 300-1 authenticates whether the authority information of the user terminal apparatus 200 received from the user terminal apparatus 200 is authority information that enables the user terminal apparatus 200 to access a domain managed by the management server 100 (operation S1102).

Then, if it is authenticated that the authority information enables the user terminal apparatus 200 to access the domain managed by the management server 100, the locking apparatus 300-1 releases a locked state thereof (operation S1103). Then, the locking apparatus 300-1 extracts setting information corresponding to the user ID information (operation S1104).

Then, the locking apparatus 300-1 transmits a control signal for controlling the devices 300-2, 300-3, 300-4, . . . , 300-n to the devices 300-2, 300-3, 300-4, . . . , 300-n, based on the extracted setting information (operation S1105).

Then, the devices 300-2, 300-3, 300-4, . . . , 300-n operate according to the control signal received from the management server 100 (operation S1106).

Although the locking apparatus 300-1 is described above as authenticating the authority information with reference to FIG. 11, the locking apparatus 300-1 may be used only as a medium via which the authority information and the user ID information are transmitted to the management server 100. In this case, the management server 100 may authenticate the authority information, and control the locking apparatus 300-1 to release the locked state thereof when the authority information is authenticated.

Figure 12:
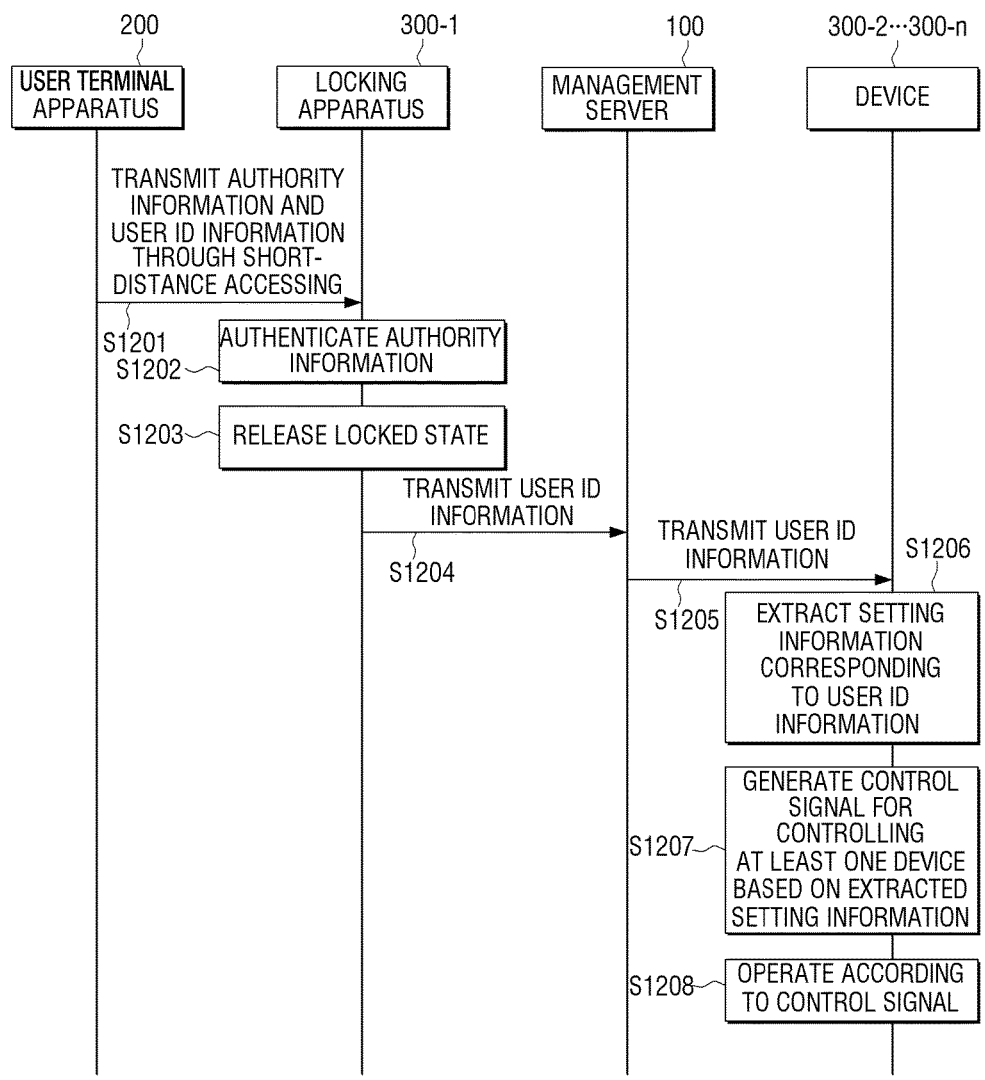
FIGS. 12 to 14 are timing diagrams illustrating methods of storing setting information and operating based on the setting information, performed by at least one device consistent with another exemplary embodiment.
Figure 13:
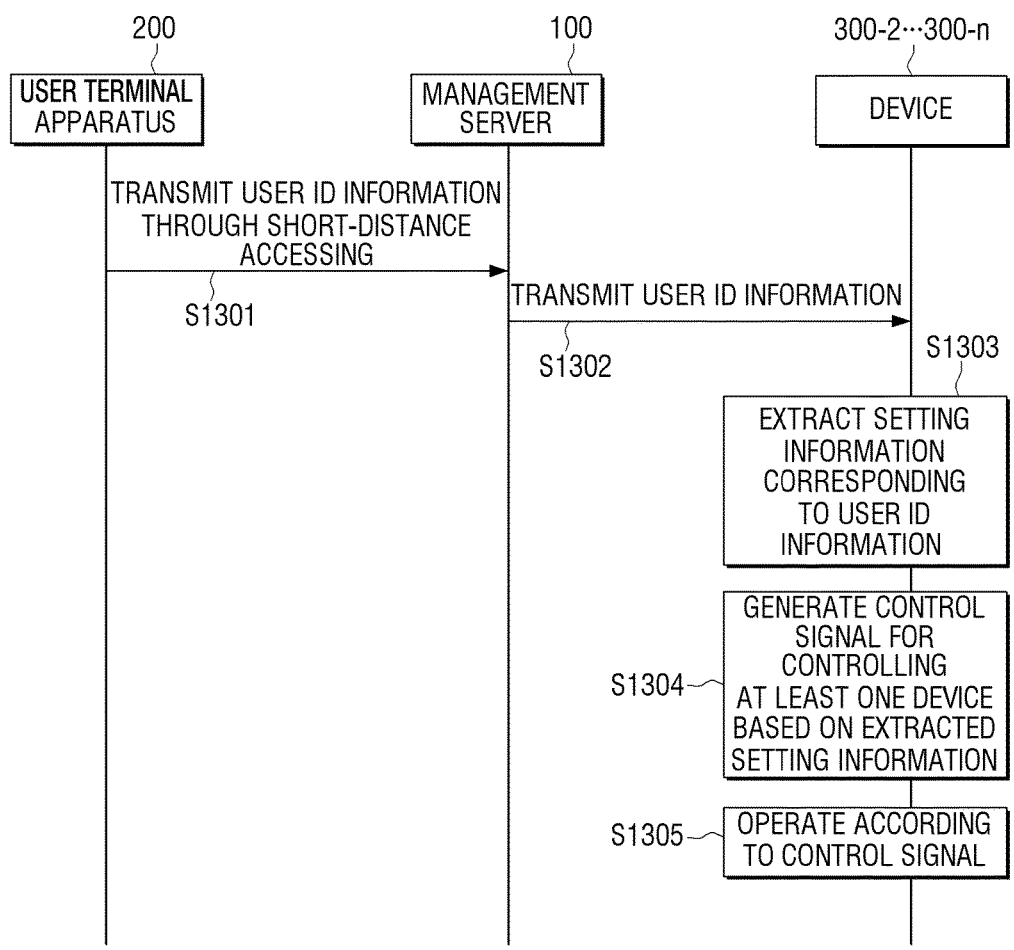
Figure 14:
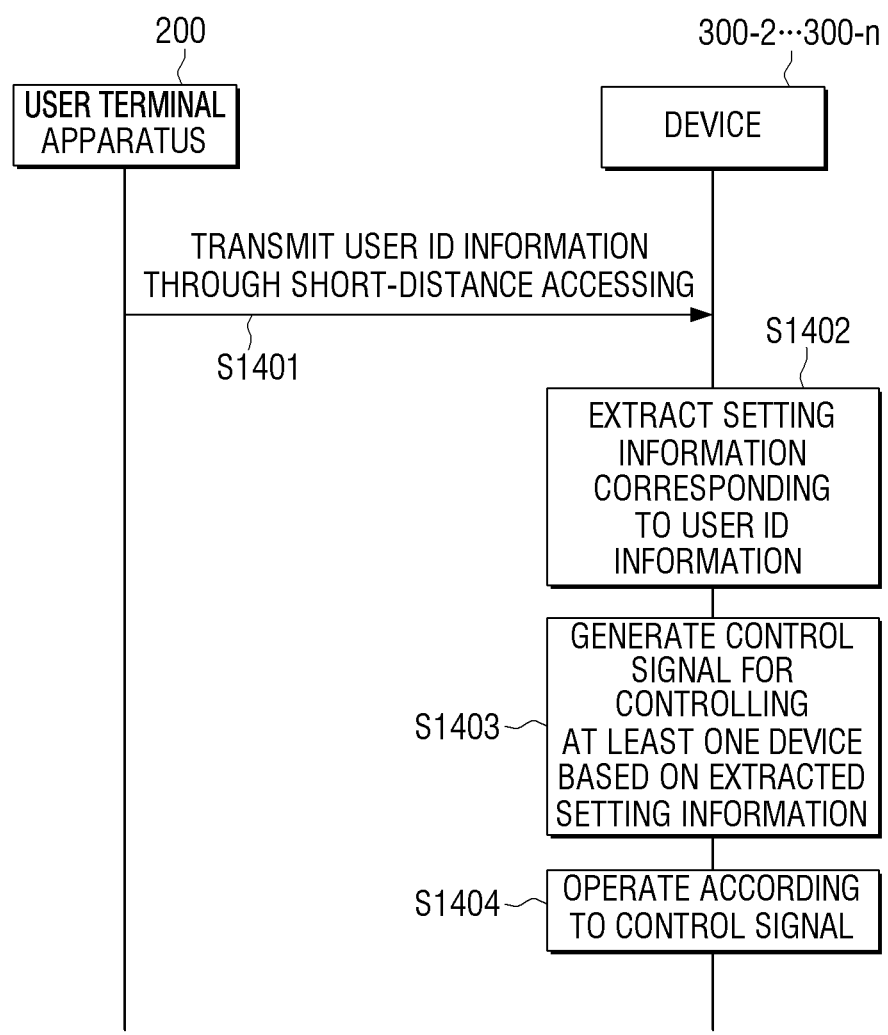

FIGS. 12 to 14 are timing diagrams illustrating methods of storing setting information and operating based on the setting information, performed by at least one device (e.g., devices 300-2, 300-3, 300-4, . . . , 300-n) according to another exemplary embodiment.

Referring to FIG. 12, a user terminal apparatus 200 transmits authority information and user ID information to a locking apparatus 300-1 by short-distance accessing the locking apparatus 300-1 (operation S1201.

In this case, the locking apparatus 300-1 authenticates whether the authority information of the user terminal apparatus 200 received from the user terminal apparatus 200 is authority information that enables the user terminal apparatus 200 to access a domain managed by the management server 100 (operation S1202).

If it is authenticated that the authority information enables the user terminal apparatus 200 to access the domain managed by the management server 100 the management server 100, the locking apparatus 300-1 releases a locked state thereof (operation S1203). Then, the locking apparatus 300-1 transmits the user ID information to the management server 100 (operation S1204). Then, the management server 100 transmits the user ID information to the devices 300-2, 300-3, 300-4, . . . , 300-n (operation S1205).

Then, each of the devices 300-2, 300-3, 300-4, . . . , 300-n extracts setting information corresponding to the user ID information (operation S1206). Then, each of the devices 300-2, 300-3, 300-4, . . . , 300-n generates a control signal for controlling each of the devices 300-2, 300-3, 300-4, . . . , 300-n, based on the extracted setting information (operation S1207). Then, each of the devices 300-2, 300-3, 300-4, . . . , 300-n operates according to the control signal (operation S1208).

Although the locking apparatus 300-1 is described above as authenticating the authority information with referring to FIG. 12, the locking apparatus 300-1 may be used only as a medium via which the authority information and the user ID information are transmitted to the management server 100. In this case, the management server 100 may authenticate the authority information, and control the locking apparatus 300-1 to release the locked state thereof when the authority information is authenticated. Also, when the locking apparatus 300-1 forms a network with the devices 300-2, 300-3, 300-4, . . . , 300-n or acts as a server, the locking apparatus 300-1 may directly transmit the user ID information to the devices 300-2, 300-3, 300-4, . . . , 300-n without the management server 100 as a medium.

Referring to FIG. 13, a user terminal apparatus 200 transmits user ID information to a management server 100 by short-distance accessing the management server 100 (operation S1301).

Then, the management server 100 transmits the user ID information to the devices 300-2, 300-3, 300-4, . . . , 300-n (operation S1302).

Then, each of the devices 300-2, 300-3, 300-4, . . . , 300-n extracts setting information corresponding to the user ID information (operation S1303). Then, each of the devices 300-2, 300-3, 300-4, . . . , 300-n generates a control signal for controlling each of the devices 300-2, 300-3, 300-4, ..., 300-n, based on the extracted setting information (operation S1304). Then, each of the devices 300-2, 300-3, 300-4, ..., 300-n operates according to the control signal (operation S1305).

Referring to FIG. 14, a user terminal apparatus 200 transmits user ID information to the devices 300-2, 300-3, 300-4, ..., 300-n by short-distance accessing the devices 300-2, 300-3, 300-4, ..., 300-n (operation S1401).

Then, each of the devices 300-2, 300-3, 300-4, ..., 300-n extracts setting information corresponding to the user ID information (operation S1402). Then, each of the devices 300-2, 300-3, 300-4, ..., 300-n generates a control signal for controlling each of the devices 300-2, 300-3, 300-4, ..., 300-n, based on the extracted setting information (operation S1403). Then, each of the devices 300-2, 300-3, 300-4, ..., 300-n operates according to the control signal (operation S1404).

Figure 15:
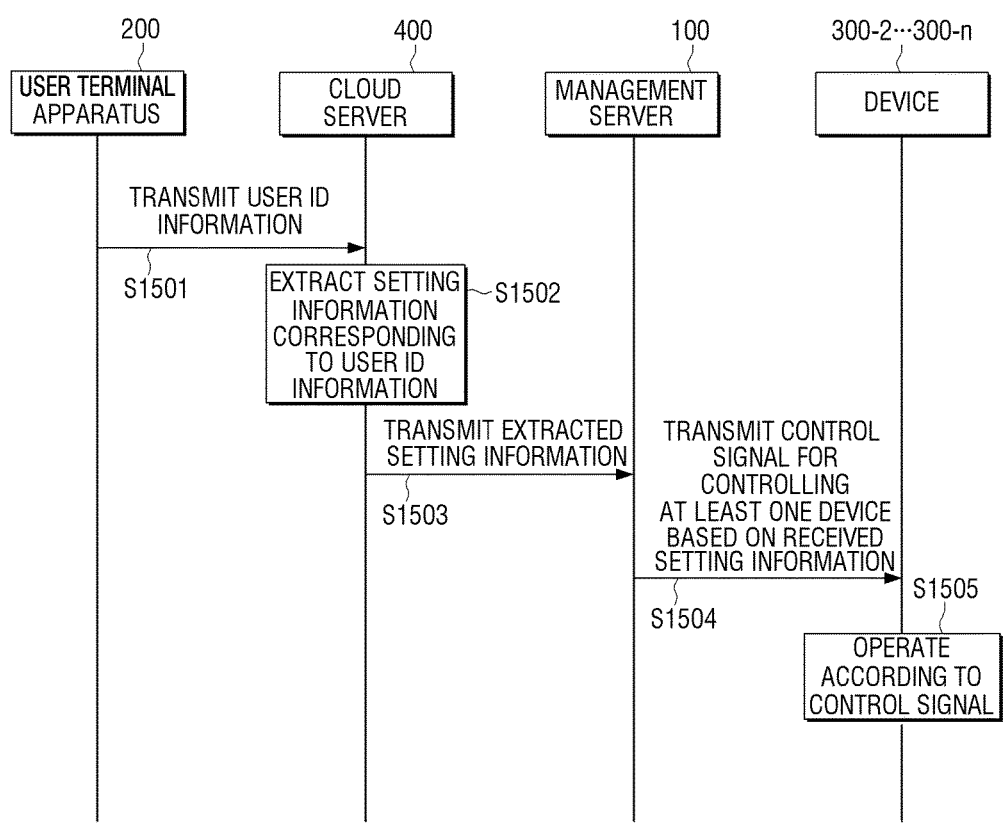
FIG. 15 is a timing diagram illustrating a method of controlling at least one device by using a cloud server consistent with another exemplary embodiment.

FIG. 15 is a timing diagram of controlling at least one device by using a cloud server 400 according to another exemplary embodiment. Referring to FIG. 15, a user terminal apparatus 200 transmits user ID information to the cloud server 400 (operation S1501). The user ID information may be transmitted to the cloud server 400 by short-distance accessing an apparatus connected to the cloud server 400. For example, an office network will be described. In the office, an apparatus capable of short-distance accessing the user terminal apparatus 200 may be installed. In this case, a user may transmit user ID information to the cloud server 400 by allowing the user terminal apparatus 200 to access this apparatus. Otherwise, the user terminal apparatus 200 may transmit the user ID information to the cloud server 400 via a 3-generation (3G) or 4-generation (4G) mobile telecommunication network or WiFi. Then, the cloud server 400 extracts setting information corresponding to the user ID information (operation S1502). Then, the cloud server 400 transmits the extracted setting information to the management server 100 (operation S1503).

Then, the management server 100 transmits a control signal for controlling at least one device (e.g., devices 300-2, 300-3, 300-4, ..., 300-n), based on the received setting information (operation S1504). Then, the devices 300-2, 300-3, 300-4, ..., 300-n operate according to the control signal received from the management server 100 (operation S1505).

Although the devices 300-2, 300-3, 300-4, ..., 300-n are described above as receiving the control signal from the management server 100 with reference to FIG. 15, the cloud server 400 may directly transmit the setting information to the devices 300-2, 300-3, 300-4, ..., 300-n.

Although FIG. 15 illustrates a case in which the user terminal apparatus 200 transmits the user ID information to the cloud server 400, the exemplary embodiment is not limited thereto. When the user terminal apparatus 200 short-distance accesses the management server 100, the management server 100 may transmit the user ID information received from the user terminal apparatus 200 to the cloud server 400. Otherwise, when the user terminal apparatus 200 short-distance accesses the locking apparatus 300-1, the locking apparatus 300-1 may transmit the user ID information received from the user terminal apparatus 200 to the cloud server 400. Otherwise, when the user terminal apparatus 200 short-distance accesses the devices 300-2, 300-3, 300-4, ..., 300-n, the devices 300-2, 300-3, 300-4, ..., 300-n may transmit the user ID information received from the user terminal apparatus 200 to the cloud server 400.

Figure 16:
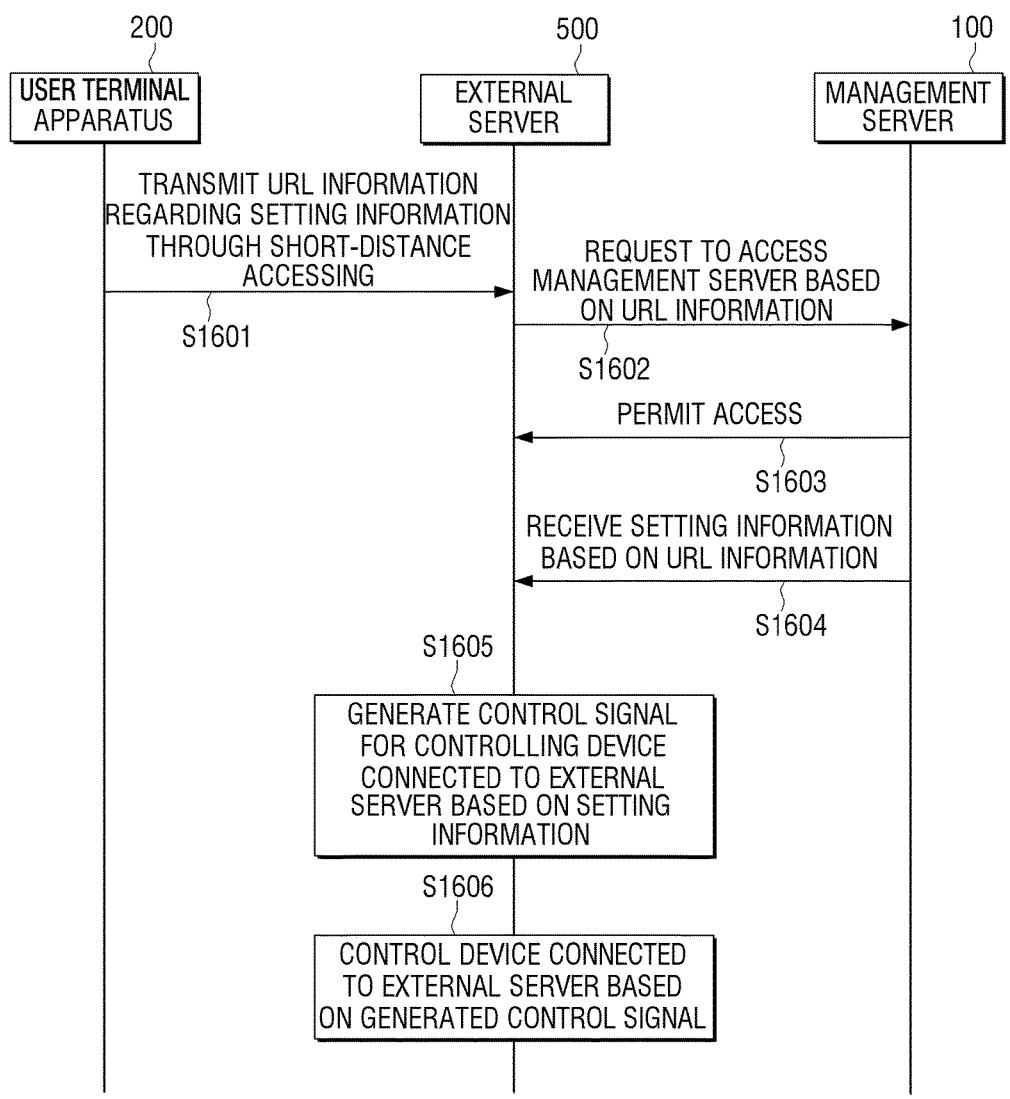
FIG. 16 is a timing diagram of a method of controlling at least one device connected to an external server based on universal resource locator (URL) information related to setting information consistent with another exemplary embodiment.

FIG. 16 is a timing diagram of a method of controlling at least one device (e.g., devices 300-2, 300-3, 300-4, ..., 300-n) connected to an external server 500 based on universal resource locator (URL) information related to setting information according to another exemplary embodiment. The external server 500 is an object server installed outside a domain managed by a management server 100, separately from the management server 100 that is located within a user domain and that controls devices in the user domain. The external server 500 may be connected to the devices 300-2, 300-3, 300-4, ..., 300-n, and may manage of the devices 300-2, 300-3, 300-4, ..., 300-n, similar to the management server 100.

Referring to FIG. 16, a user terminal apparatus 200 transmits URL information regarding an address of setting information stored in the management server 100 to the external server 500 by short-distance accessing the external server 500 (operation S1601).

Then, the external server 500 requests access to the management server 100 based on the URL information (operation S1602).

Then, the management server 100 determines whether the external server 500 is to be permitted to access the management server 100, and provides the external server 500 with the permission when accessing of the external server 500 is permitted (operation S1603). Then, the external server 500 receives the setting information stored in the management server 100, based on the URL information (operation S1604). Then, the external server 100 generates a control signal for controlling the devices 300-2, 300-3, 300-4, ..., 300-n connected to the external server 500 based on the setting information (operation S1605). Then, the external server 500 controls the devices 300-2, 300-3, 300-4, ..., 300-n connected thereto by using the control signal (operation S1606).

Accordingly, setting information regarding a device included in a user domain may be applied to a device included in an external domain.

Figure 17:
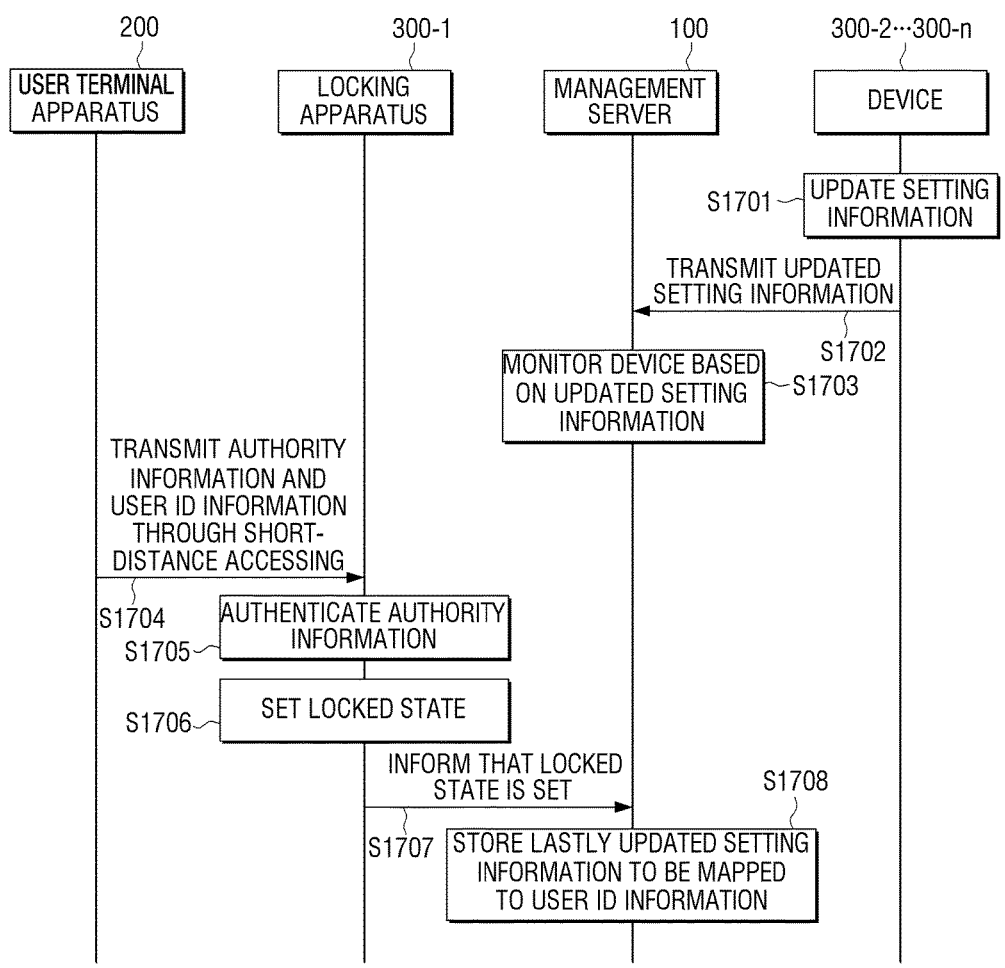
FIGS. 17 to 19 are timing diagrams illustrating methods of storing setting information updated when at least one device is used, in a management server consistent with exemplary embodiments.
Figure 18:
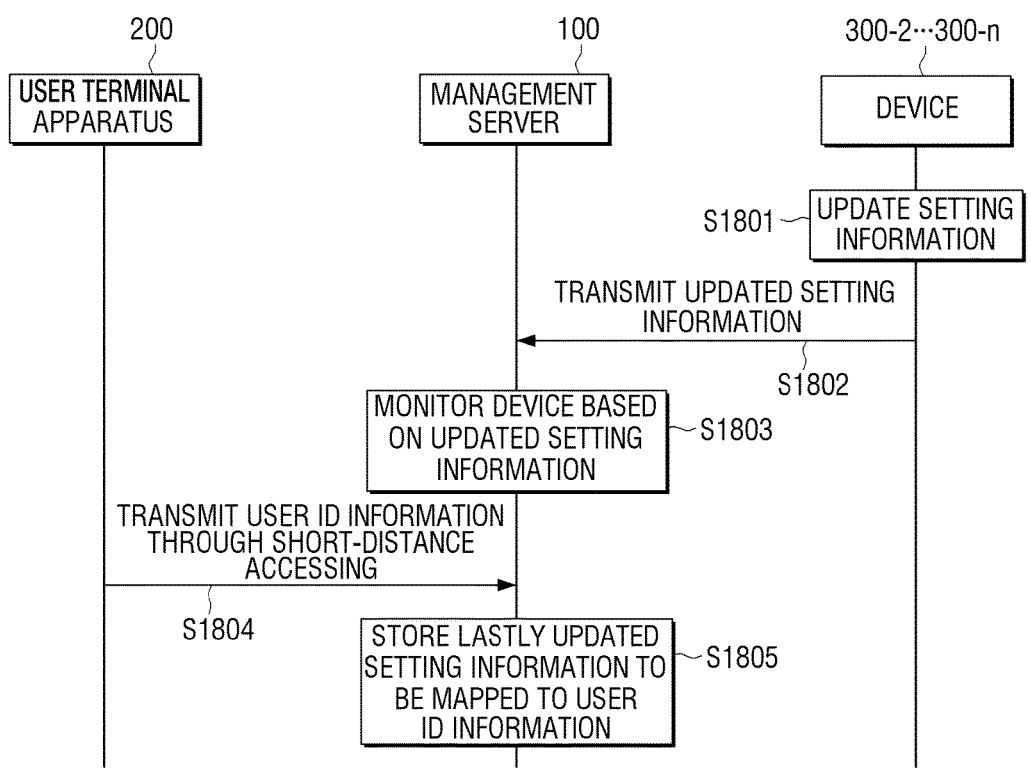
Figure 19:
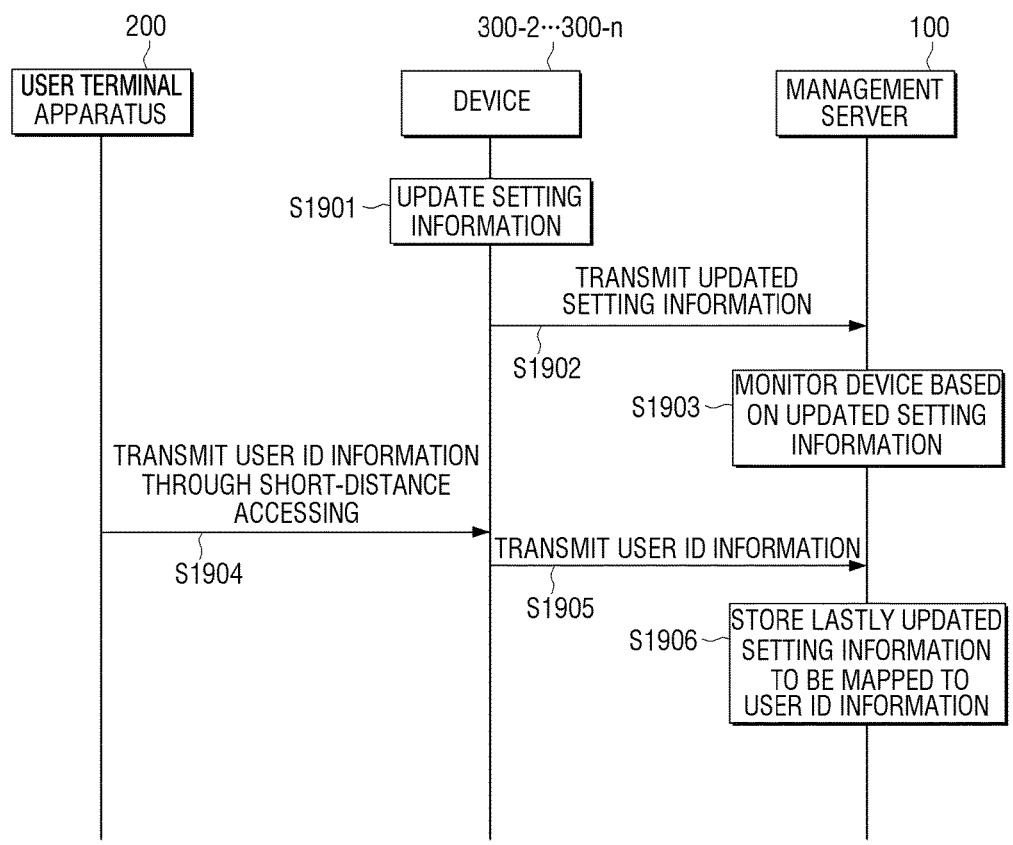

FIGS. 17 to 19 are timing diagrams illustrating methods of storing setting information updated when at least one device (e.g., devices 300-2, 300-3, 300-4, ..., 300-n) is used, in a management server 100 consistent with exemplary embodiments. In FIGS. 17 to 19, short-distance accessing may be secondary short-distance accessing performed after primary short-distance accessing is performed as described in FIGS. 5 to 16.

Referring to FIG. 17, when the devices 300-2, 300-3, 300-4, ..., 300-n are used by a user, the devices 300-2, 300-3, 300-4, ..., 300-n update setting information thereof (operation S1701). Then, the devices 300-2, 300-3, 300-4, ..., 300-n transmit the updated setting information to the management server 100 (operation S1702). Here, whenever the setting information is updated, the updated setting information may be transmitted to the management server 100.

Then, the management server 100 monitors the devices 300-2, 300-3, 300-4, ..., 300-n, based on the updated setting information (operation S1703).

Then, a user terminal apparatus 200 transmits authority information and user ID information to a locking apparatus 300-1 by short-distance accessing the locking apparatus 300-1 (operation S1704).

Then, the locking apparatus 300-1 authenticates whether the authority information of the user terminal apparatus 200 received from the user terminal apparatus 200 is authority information that enables the user terminal apparatus 200 to access a domain managed by the management server 100 (operation S1705)

Then, when it is authenticated that the authority information enables the user terminal apparatus 200 to access the domain managed by the management server 100, the locking apparatus 300-1 sets a locked state thereof (operation S1706). Then, the locking apparatus 300-1 informs the management server 100 that the locked state is set (operation S1707).

Then, the management server 100 stores updated setting information to be mapped to the user ID information (operation S1708). Accordingly, updated setting information of the devices 300-2, 300-3, 300-4, . . . , 300-n may be associated with the user ID.

Although the locking apparatus 300-1 is described above as authenticating the authority information with reference to FIG. 17, the locking apparatus 300-1 may be used only as a medium via which the authority information and the setting information are transmitted to the management server 100. In this case, the management server 100 may authenticate the authority information, and control the locking apparatus 300-1 to set the locked state thereof when the authority information is authenticated.

Referring to FIG. 18, when the devices 300-2, 300-3, 300-4, . . . , 300-n are used by a user, the devices 300-2, 300-3, 300-4, . . . , 300-n update setting information thereof (operation S1801). Then, the devices 300-2, 300-3, 300-4, . . . , 300-n transmit the updated setting information to the management server 100 (operation S1802). In this case, whenever the setting information is updated, the updated setting information may be transmitted to the management server 100.

Then, the management server 100 monitors the devices 300-2, 300-3, 300-4, . . . , 300-n based on the updated setting information (operation S1803).

Then, a user terminal apparatus 200 transmits user ID information to the management server 100 by short-distance accessing the management server 100 (operation S1804).

Then, the management server 100 stores updated setting information to be mapped to the user ID information (operation S1805). Accordingly, updated setting information of the devices 300-2, 300-3, 300-4, . . . , 300-n may be associated with the user ID.

Referring to FIG. 19, when the devices 300-2, 300-3, 300-4, . . . , 300-n are used by a user, the devices 300-2, 300-3, 300-4, . . . , 300-n update setting information thereof (operation S1901). Then, the devices 300-2, 300-3, 300-4, . . . , 300-n transmit the updated setting information to the management server 100 (operation S1902). Whenever the setting information is updated, the updated setting information may be transmitted to the management server 100.

Then, the management server 100 monitors the devices 300-2, 300-3, 300-4, . . . , 300-n based on the updated setting information (operation S1903).

Then, a user terminal apparatus 200 transmits user ID information to the devices 300-2, 300-3, 300-4, . . . , 300-n by short-distance accessing the devices 300-2, 300-3, 300-4, . . . , 300-n (operation S1904). Then, the devices 300-2, 300-3, 300-4, . . . , 300-n transmit the user ID information to the management server 100 (operation S1905).

Then, the management server 100 stores lastly updated setting information to be mapped to the user ID information (operation S1906). Accordingly, updated setting information of the devices 300-2, 300-3, 300-4, . . . , 300-n may be associated with the user ID.

Figure 20:
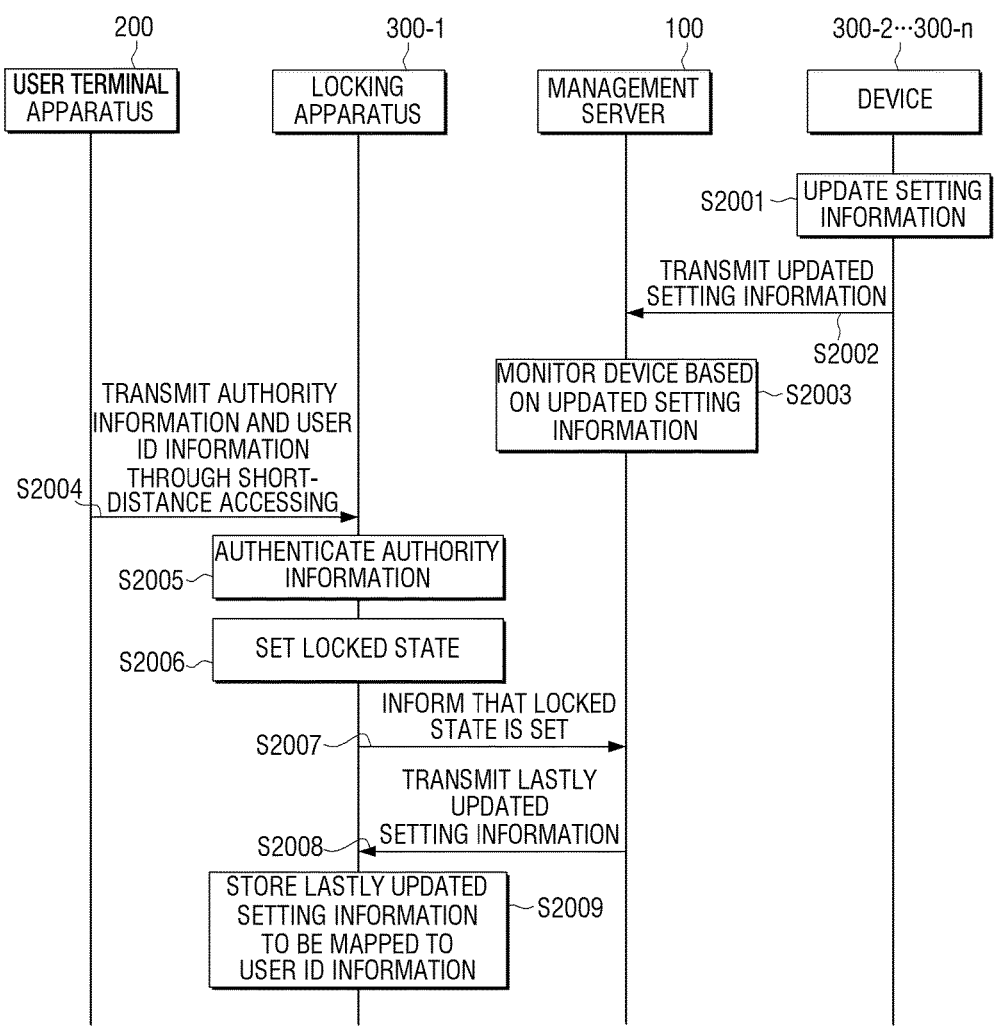
FIGS. 20 to 22 are timing diagrams illustrating methods of storing setting information updated when at least one device is used, in various apparatuses consistent with exemplary embodiments.
Figure 21:
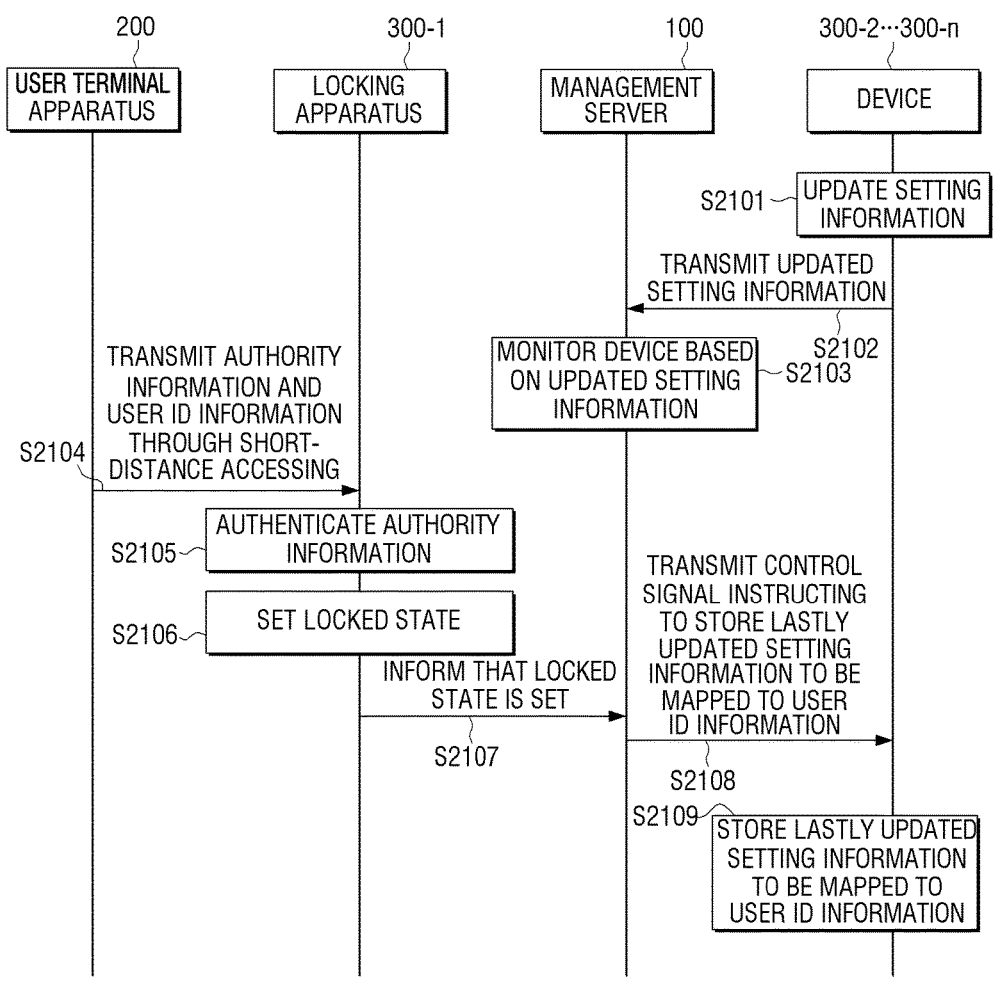
Figure 22:
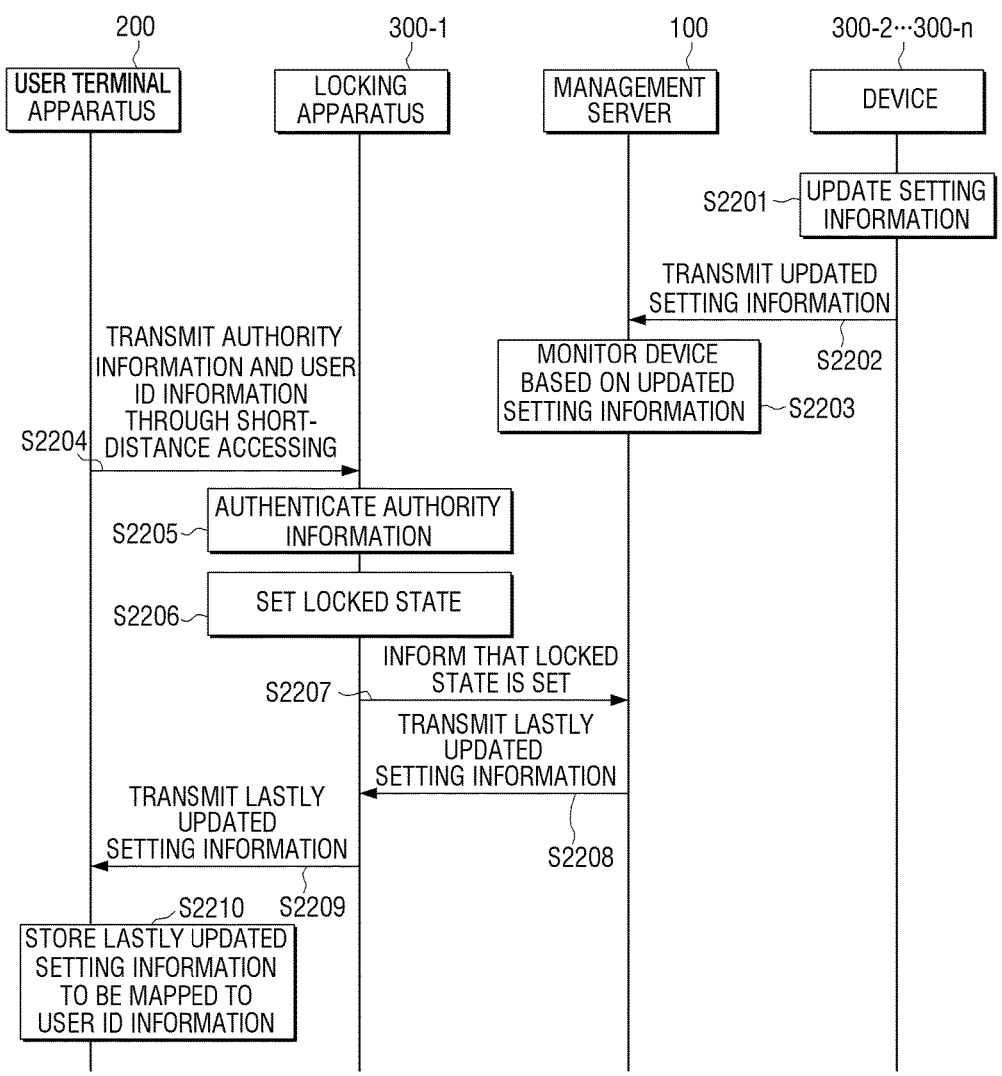

FIGS. 20 to 22 are timing diagrams illustrating methods of storing setting information updated when at least one device (e.g., 300-2, 300-3, 300-4, . . . , 300-n) is used, in various apparatuses consistent with exemplary embodiments. In FIGS. 20 to 22, short-distance accessing may be secondary short-distance accessing performed after primary short-distance accessing is performed as described in FIGS. 5 to 16.

Referring to FIG. 20, when the devices 300-2, 300-3, 300-4, . . . , 300-n are used by a user, the devices 300-2, 300-3, 300-4, . . . , 300-n update setting information thereof (operation S2001). Then, the devices 300-2, 300-3, 300-4, . . . , 300-n transmit the updated setting information to the management server 100 (operation S2002). Whenever the setting information is updated, the updated setting information may be transmitted to the management server 100.

Then, the management server 100 monitors the devices 300-2, 300-3, 300-4, . . . , 300-n based on the updated setting information (operation S2003).

Then, a user terminal apparatus 200 transmits authority information and user ID information to a locking apparatus 300-1 by short-distance accessing the locking apparatus 300-1 (operation S2004).

Then, the locking apparatus 300-1 authenticates whether the authority information of the user terminal apparatus 200 received from the user terminal apparatus 200 is authority information that enables the user terminal apparatus 200 to access a domain managed by the management server 100 (operation S2005).

Then, when it is authenticated that the authority information enables the user terminal apparatus 200 to access the domain managed by the management server 100, the locking apparatus 300-1 sets a locked state thereof (operation S2006). Then, the locking apparatus 300-1 informs the management server 100 that the locked state is set (operation S2007).

Then, the management server 100 transmits updated setting information to the locking apparatus 300-1 (operation S2008). Then, the locking apparatus 300-1 stores the updated setting information to be mapped to the user ID information (operation S2009). Accordingly, updated setting information of the devices 300-2, 300-3, 300-4, . . . , 300-n may be associated with the user ID.

Referring to FIG. 21, when the devices 300-2, 300-3, 300-4, . . . , 300-n are used by a user, the devices 300-2, 300-3, 300-4, . . . , 300-n update setting information thereof (operation S2101). Then, the devices 300-2, 300-3, 300-4, . . . , 300-n transmit the updated setting information to the management server 100 (operation S2102). Whenever the setting information is updated, the updated setting information may be transmitted to the management server 100.

Then, the management server 100 monitors the devices 300-2, 300-3, 300-4, . . . , 300-n based on the updated setting information (operation S2103).

Then, the user terminal apparatus 200 transmits authority information and user ID information to a locking apparatus 300-1 by short-distance accessing the locking apparatus 300-1 (operation S2104).

Then, the locking apparatus 300-1 authenticates whether the authority information of the user terminal apparatus 200 received from the user terminal apparatus 200 is authority information that enables the user terminal apparatus 200 to access a domain managed by the management server 100 (operation S2105).

Then, when it is authenticated that the authority information enables the user terminal apparatus 200 to access the domain managed by the management server 100, the locking apparatus 300-1 sets a locked state thereof (operation S2106). Then, the locking apparatus 300-1 informs the management server 100 that the locked state is set (operation S2107).

Then, the management server 100 transmits a control signal instructing the devices 300-2, 300-3, 300-4, . . . , 300-n to store updated setting information to be mapped to the user ID information, to the devices 300-2, 300-3, 300-4, . . . , 300-n (operation S2108).

Then, the devices 300-2, 300-3, 300-4, . . . , 300-n store the updated setting information to be mapped to the user ID information (operation S2109). Accordingly, updated setting information of the devices 300-2, 300-3, 300-4, . . . , 300-n may be associated with the user ID.

Referring to FIG. 22, when the devices 300-2, 300-3, 300-4, . . . , 300-n are used by a user, the devices 300-2, 300-3, 300-4, . . . , 300-n update setting information thereof (operation S2201). Then, the devices 300-2, 300-3, 300-4, . . . , 300-n transmit the updated setting information to the management server 100 (operation S2202). Whenever the setting information is updated, the updated setting information may be transmitted to the management server 100.

Then, the management server 100 monitors the devices 300-2, 300-3, 300-4, . . . , 300-n based on the updated setting information (operation S2203).

Then, the user terminal apparatus 200 transmits authority information and user ID information to a locking apparatus 300-1 by short-distance accessing the locking apparatus 300-1 (operation S2204).

Then, the locking apparatus 300-1 authenticates whether the authority information of the user terminal apparatus 200 received from the user terminal apparatus 200 is authority information that enables the user terminal apparatus 200 to access a domain managed by the management server 100 (operation S2205).

Then, when it is authenticated that the authority information enables the user terminal apparatus 200 to access the domain managed by the management server 100 the management server 100, the locking apparatus 300-1 sets a locked state thereof (operation S2206). Then, the locking apparatus 300-1 informs the management server 100 that the locked state is set (operation S2207).

Then, the management server 100 transmits updated setting information to the locking apparatus 300-1 (operation S2208). Then, the locking apparatus 300-1 transmits the updated setting information to the user terminal apparatus 200 (operation S2209).

Then, the user terminal apparatus 200 stores the updated setting information to be mapped to the user ID information (operation S2210). Accordingly, updated setting information of the devices 300-2, 300-3, 300-4, . . . , 300-n may be associated with the user ID.

The method of storing setting information, which is updated when the devices 300-2, 300-3, 300-4, . . . , 300-n is used, in various apparatuses may also be applied to the cases described above with reference to FIGS. 18 and 19.

The updated setting information may be stored in the user terminal apparatus 200. In this case, the user terminal apparatus 200 may receive the updated setting information by short-distance accessing the locking apparatus 300-1, the management server 100, or the devices 300-2, 300-3, 300-4, . . . 300-n.

FIGS. 23 to 25 are diagrams illustrating methods of controlling a home domain management system according to exemplary embodiments. Referring to FIG. 23(a), in order to enter a home, a user may perform short-distance accessing between a user terminal apparatus 200 and a locking apparatus 300-1. In this case, the user terminal apparatus 200 may transmit authority information to the locking apparatus 300-1 to release a locked state of the locking apparatus 300-1, and the locking apparatus 300-1 may thus release the locked state thereof.

Also, the user terminal apparatus 200 transmits user ID information for operating at least one device in the home, e.g., devices 300-2, 300-3, 300-4, based on setting information, through short-distance accessing.

In this case, the locking apparatus 300-1 may transmit the user ID information to the management server 100. Then, the management server 100 may extract setting information corresponding to the user ID information. Also, the management server 100 may transmit a control signal for controlling the devices 300-2, 300-3, 300-4 in the home to the devices 300-2, 300-3, 300-4, based on the extracted setting information.

However, when the user terminal apparatus 200 stores setting information about the devices 300-2, 300-3, 300-4 in the home, the user terminal apparatus 200 may transmit the authority information and the setting information about the devices 300-2, 300-3, 300-4 through short-distance accessing.

In this case, the locking apparatus 300-1 may transmit the setting information to the management server 100. Then, the management server 100 transmits a control signal for controlling the devices 300-2, 300-3, 300-4 to the devices 300-2, 300-3, 300-4, based on the setting information.

When the control signal is transmitted as describe above, the devices 300-2, 300-3, 300-4 in the home may operate based on the extracted setting information as illustrated in FIG. 23(b). For example, in the case of a TV, the setting information may be configuration information for configuring the TV: the TV may be 'ON', a TV channel may be turned to 'CH11', and volume may be controlled. In the case of a washing machine, the setting information may be configuration information for configuring the washing machine: the washing machine may be 'ON' and washing may be started. In the case of an air conditioner, the setting information may be configuration information for configuring the air conditioner: the air conditioner may 'ON' and temperature and airflow may be adjusted.

Although the locking apparatus 300-1 is described above as authenticating the authority information with reference to FIG. 23, the locking apparatus 300-1 may be used only as a medium via which the authority information and the user ID information are transmitted to the management server 100. In this case, the management server 100 may authenticate the authority information, and control the locking apparatus 300-1 to set the locked state thereof when the authority information is authenticated. If the locking apparatus 300-1 acts as a server, the management server 100 may be omitted.

Referring to FIG. 24(a), a user enters the user's home, and may provide short-distance accessing between a user terminal apparatus 200 and at least one device 300-2, 300-3, 300-4 in a home. In this case, the user terminal apparatus 200 may transmit user ID information for operating the at least one device 300-2, 300-3, 300-4 in the home based on setting information to a device 300-2, 300-3, 300-4 that is short-distance accessed among the at least one device 300-2, 300-3, 300-4.

In this case, the device that is short-distance accessed may transmit the user ID information to the management server 100. Then, the management server 100 may extract setting information corresponding to the user ID information. Also, the management server 100 transmits a control signal to the device that is short-distance accessed, based on the extracted setting information.

However, when the user terminal apparatus 200 stores setting information regarding the at least one device 300-2, 300-3, 300-4 in the home, the user terminal apparatus 200 may transmit the setting information regarding the at least one device 300-2, 300-3, 300-4 to the device 300-2, 300-3, 300-4 that is short-distance accessed, through short-distance accessing.

In this case, the device 300-2, 300-3, 300-4 that is short-distance accessed may transmit the setting information to the management server 100. Then, the management server 100 extracts setting information corresponding to the device 300-2, 300-3, 300-4 from the setting information, and transmits a control signal for operating the device 300-2, 300-3, 300-4 based on the setting information, to the device 300-2, 300-3, 300-4. However, in some cases, a piece of setting information required may be detected from the setting information received from the device 300-2, 300-3, 300-4 that is short-distance accessed. In this case, the device 300-2, 300-3, 300-4 that is short-distance accessed may operate based on the detected setting information, not under control of the management server 100.

When the control signal is transmitted as described above, the device 300-2, 300-3, 300-4 that is short-distance accessed may operate based on the extracted setting information, as illustrated in FIG. 24(b). For example, in the case of a TV, the TV is 'ON', and a TV channel is tuned in to CH11, and volume may be controlled.

Referring to FIG. 25(a), a user may enter the user's home, and perform short-distance accessing between a user terminal apparatus 200 and a management server 100. In this case, the user terminal apparatus 200 may transmit user ID information for controlling at least one device 300-2, 300-3, 300-4 in the home based on setting information, to the management server 100.

In this case, the management server 100 may extract setting information corresponding to the user ID information. Also, the management server 100 may transmit a control signal to a device 300-2, 300-3, 300-4 that is short-distance accessed, based on the extracted setting information.

However, when the user terminal apparatus 200 stores setting information regarding the at least one device 300-2, 300-3, 300-4 in the home, the user terminal apparatus 200 may transmit the setting information regarding the at least one device 300-2, 300-3, 300-4 in the home to the management server 100 through short-distance accessing.

In this case, the management server 100 may transmit a control signal for controlling devices 300-2, 300-3, 300-4 to the at least one device, e.g., devices 300-2, 300-3, 300-4, based on the setting information.

When the control signal is transmitted as described above, the devices 300-2, 300-3, 300-4 in the home may operate based on the extracted setting information as illustrated in FIG. 24(b). For example, in the case of a TV, the TV may be 'ON', a TV channel may be turned to 'CH11', and volume may be controlled. In the case of a washing machine, the washing machine may be 'ON' and washing may be started. In the case of an air conditioner, the air conditioner is 'ON' and temperature and airflow may be adjusted.

FIGS. 26 to 28 are diagrams illustrating automobile domain management systems according to exemplary embodiments. Referring to FIG. 26(a), in order to enter an automobile, a user may perform short-distance accessing between a user terminal apparatus 200 and a locking apparatus 300-1. In this case, the user terminal apparatus 200 may transmit authority information for releasing a locked state of the locking apparatus 300-1 to the locking apparatus 300-1, and the locking apparatus 300-1 may thus release the locked state thereof.

Also, the user terminal apparatus 200 may perform short-distance accessing to transmit user ID information for operating at least one device installed in the automobile based on setting information to the locking apparatus 300-1.

In this case, the locking apparatus 300-1 may transmit the user ID information to the management server 100. Then, the management server 100 may extract setting information corresponding to the user ID information. Also, the management server 100 may transmit a control signal for controlling the at least one device installed in the automobile to the at least one device, based on the extracted setting information.

However, when the user terminal apparatus 200 stores setting information regarding the at least one device installed in the automobile, the user terminal apparatus 200 may perform short-distance accessing to transmit authority information and the setting information regarding the at least one device installed in the automobile, to the locking apparatus 300-1.

Then, the locking apparatus 300-1 may transmit the setting information to the management server 100. Then, the management server 100 may transmit a control signal for controlling devices to the at least one device, based on the setting information.

When the control signal is transmitted as described above, the at least one device installed in the automobile may operate based on the extracted setting information as illustrated in FIG. 26(b). For example, the setting information may include a configuration of the steering wheel or a driver's seat, and the control signal may control the height of a steering wheel, the inclination of the back of a seat, the height and position of the seat may be adjusted.

Although the locking apparatus 300-1 is described above as authenticating the authority information with reference to FIG. 26, the locking apparatus 300-1 may be used only as a medium via which the authority information and the user ID information are transmitted to the management server 100 in some cases. In this case, the management server 100 may authenticate the authority information, and control the locking apparatus 300-1 to set the locked state thereof when the authority information is authenticated. If the locking apparatus 300-1 acts as a server, the management server 100 may be omitted.

Referring to FIG. 27(a), a user may enter an automobile and may perform short-distance accessing between a user terminal apparatus 200 and at least one device 300-2, 300-3, 300-4 . . . 300-n installed in the automobile. In this case, the user terminal apparatus 200 may transmit user ID information for operating the at least one device 300-2, 300-3, 300-4 . . . 300-n installed in the automobile based on setting information, to a device 300-2, 300-3, 300-4 . . . 300-n that is short-distance accessed.

In this case, the device 300-2, 300-3, 300-4 . . . 300-n that is short-distance accessed may transmit the user ID information to a management server 100. Then, the management server 100 may extract setting information corresponding to the user ID information. Also, the management server 100 may transmit a control signal to the device 300-2, 300-3, 300-4 . . . 300-n that is short-distance accessed, based on the extracted setting information.

However, when the user terminal apparatus 200 stores setting information regarding the at least one device 300-2, 300-3, 300-4 . . . 300-n installed in the automobile, the user terminal apparatus 200 may perform short-distance accessing to transmit the setting information regarding the at least one device 300-2, 300-3, 300-4 . . . 300-n installed in the automobile to the device 300-2, 300-3, 300-4 . . . 300-n that is short-distance accessed.

In this case, the short-distance accessed device 300-2, 300-3, 300-4 . . . 300-n may transmit the setting information to the management server 100. Then, the management server 100 may extract setting information corresponding to the device 300-2, 300-3, 300-4 . . . 300-n that is short-distance accessed from the received setting information, and may transmit a control signal to the device 300-2, 300-3, 300-4 . . . 300-n that is short-distance accessed device 300-2, 300-3, 300-4 . . . 300-n so that the device 300-2, 300-3, 300-4 . . . 300-n may operate based on the extracted setting information. However, a piece of setting information required may be detected from the setting information received from the device 300-2, 300-3, 300-4 . . . 300-n that is short-distance accessed. In this case, the device 300-2, 300-3, 300-4 . . . 300-n that is short-distance accessed may operate based on the detected setting information, not under control of the management server 100.

When the control signal is transmitted as described above, the device 300-2, 300-3, 300-4 . . . 300-n that is short-distance accessed may operate based on the extracted setting information as illustrated in FIG. 27(*b*). For example, the position and height of a steering wheel 300-3 that is short-distance accessed may be adjusted. Alternatively, a position of a seat 300-2, settings on a radio 300-4, or settings on a navigation system 300-5 may be set.

Referring to FIG. 28(*a*), a user may enter an automobile and may perform short-distance accessing between a user terminal apparatus 200 and a management server 100. In this case, the user terminal apparatus 200 may transmit user ID information for operating at least one device 300-2, 300-3, 300-4 . . . 300-n installed in the automobile based on setting information, to the management server 100.

In this case, the management server 100 may extract setting information corresponding to the user ID information. Also, the management server 100 may transmit a control signal to at least one device 300-2, 300-3, 300-4 . . . 300-n based on the extracted setting information.

However, when the user terminal apparatus 200 stores setting information regarding the at least one device 300-2, 300-3, 300-4 . . . 300-n installed in the automobile, the user terminal apparatus 200 may perform short-distance accessing to transmit the setting information regarding the at least one device 300-2, 300-3, 300-4 . . . 300-n to the management server 100.

In this case, the management server 100 may transmit a control signal for controlling devices to the at least one device, e.g., devices 300-2, 300-3, 300-4 . . . 300-n, based on the setting information.

When the control signal is transmitted as described above, the at least one device 300-2, 300-3, 300-4 . . . 300-n in the automobile may operate based on the extracted setting information as illustrated in FIG. 28(*b*). For example, the height of a steering wheel 300-3, the inclination of the back of a seat 300-2, the height and position of the seat 300-2 may be adjusted. Furthermore, in the case of a navigation system 300-5, the navigation 300-5 system may be 'ON', a screen having a graphic user interface (GUI) and brightness corresponding to the extracted setting information may be displayed, and an audio system 300-4 may provide volume, a radio channel, a song corresponding to the extracted setting information.

FIG. 29 is a diagram illustrating a method of ordering a product consistent with an exemplary embodiment. Referring to FIG. 29(*a*), a user may enter a coffee shop and order 'Americano'. Then, the user may perform short-distance accessing between a user terminal apparatus 200 and a counter in which a short-distance wireless communication reader and tag are installed to receive order information. In this case, the user terminal apparatus 200 may display user order information thereon as illustrated in FIG. 29(*b*).

Also, when short-distance accessing is performed between the user terminal apparatus 200 and the counter in which the short-distance wireless communication reader and tag are installed, user ID information may be transmitted from the counter to a management server. The management server 100 may classify the user order information according to a day of the week, weather, and a recently ordered menu, and then store a result of classifying the user order information such that this result is mapped to the user ID information.

Thereafter, as illustrated in FIG. 29(*c*), the user may enter a different coffee shop, and may order a product by performing short-distance accessing between the user terminal apparatus 200 and a counter in which a short-distance wireless communication reader and tag are installed. In this case, user ID information may be transmitted from the counter to the management server 100. Then, the management server 100 may extract user order information corresponding to the user ID information, based on a preset classification condition.

For example, if the preset classification condition is a day of the week and the user ordered coffee on Monday, then the management server 100 may extract the name of coffee that the user has most often drank on Mondays, as the user order information corresponding to the user ID information. If the preset classification condition is weather and the user ordered coffee in a rainy day, then the management server 100 may extract the name of coffee that the user has most often drank on rainy days, as the user order information corresponding to the user ID information. If the preset classification condition is coffee that the user has most recently ordered, then the management server 100 may extract the name of coffee that the user has most recently ordered, as the user order information corresponding to the user ID information.

Thereafter, as illustrated in FIG. 29(*d*), the extracted user order information may be displayed on the counter. Thus, the user may easily order a desired menu. However, the exemplary embodiment is not limited thereto, and when an automatic system is installed in a store, a coffee machine may automatically make and provide 'Americano', under control of a server.

The exemplary embodiment is not limited to the above example, and the method of ordering a product may be performed in various places in which products may be ordered, e.g., a restaurant, a department store, etc. Also, the type of an object in which the short-distance wireless communication reader and tag may be installed is not limited.

Figure 30:
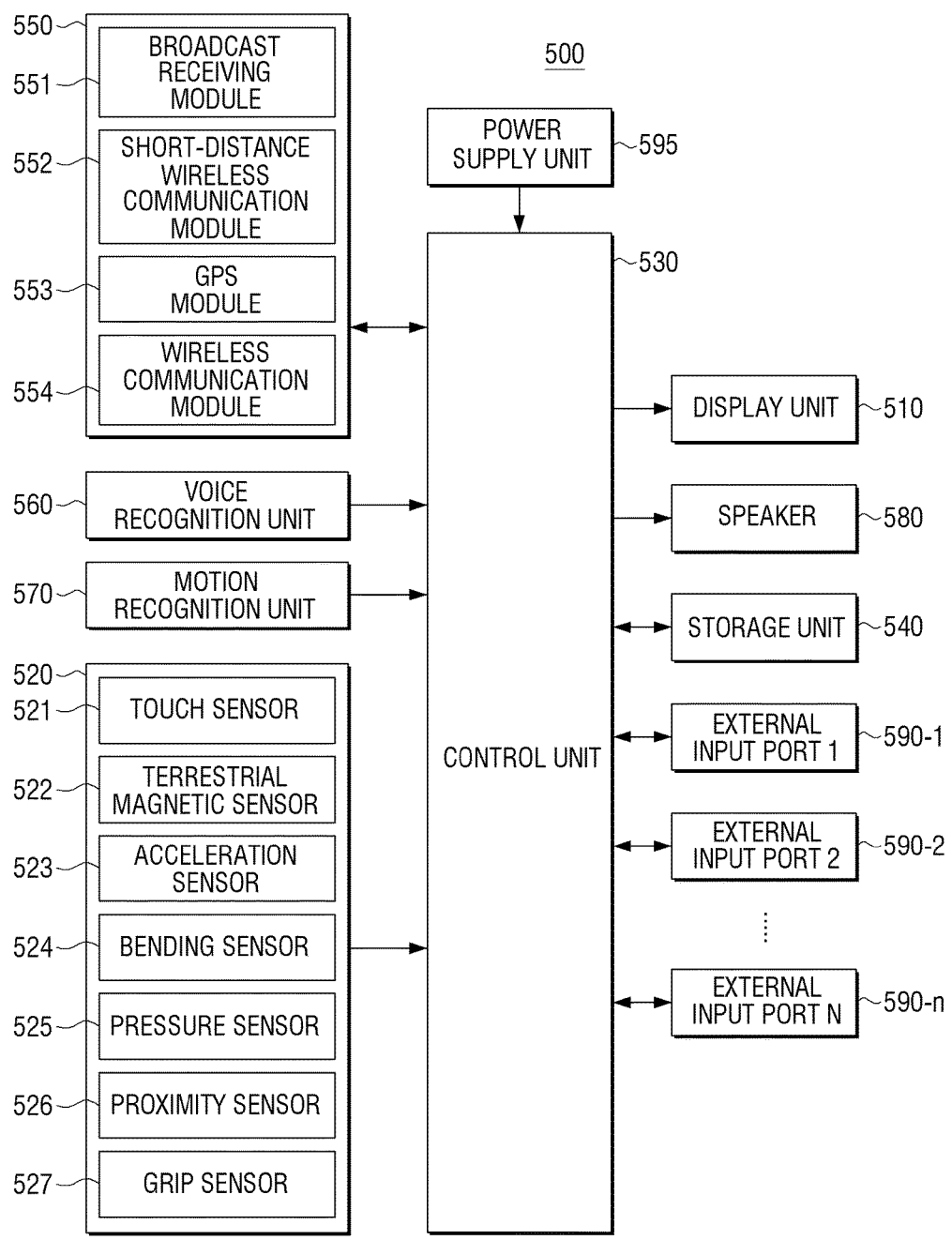
FIG. 30 is a block diagram of a user terminal apparatus consistent with another exemplary embodiment.

FIG. 30 is a block diagram of a user terminal apparatus 500 according to another exemplary embodiment. The user terminal apparatus 500 of FIG. 30 is another exemplary embodiment of the user terminal apparatus 200 of FIG. 4. Referring to FIG. 30, the user terminal apparatus 500 includes a display unit 510, a sensor unit 520, a control unit 530, a storage unit 540, a communication unit 550, a voice recognition unit 560, a motion recognition unit 570, a speaker 580, external input ports 590-1 to 590-n, and a power supply unit 595. The communication unit 550, storage unit 540, and the control unit 530 may perform the function of the communication unit 210 of FIG. 4, the function of the storage unit 220 of FIG. 4, and the function of control unit 230 of FIG. 4, respectively. Thus, the structure and operations of the user terminal apparatus 500 of FIG. 30 that are the same as those of the user terminal apparatus 200 of FIG. 4 will not be described in detail here.

The sensor unit 520 senses various states required to operate the user terminal apparatus 500. Referring to FIG. 30, the sensor unit 520 may include at least some of various sensors, e.g., a touch sensor 521, a terrestrial magnetic sensor 522, an acceleration sensor 523, a bending sensor 524, a pressure sensor 525, a proximity sensor 526, and a grip sensor 527.

The touch sensor 521 may be an electrostatic type or pressure-sensitive type sensor. The electrostatic type sensor uses a dielectric substance coated on a surface of the display unit 510, and senses micro-current corresponding to a body of a user and then calculates touched coordinates when the surface of the display unit 510 is touched by a portion of the body of the user. The pressure-sensitive type sensor includes two upper and lower electrode plates, and senses current flowing when portions of the upper and lower electrode plates corresponding to a touched location on a screen contact each other and then calculates touched coordinates, when a user touches the screen. As described above, the touch sensor 521 may be embodied as any of various type sensors.

The terrestrial magnetic sensor 522 senses a rotated state of the user terminal apparatus 500 and a direction in which the user terminal apparatus 500 is moved. The acceleration sensor 523 senses a degree to which the user terminal apparatus 500 is inclined. The terrestrial magnetic sensor 522 and the acceleration sensor 523 may be used to sense a direction in which the user terminal apparatus 500 is bent or a bent portion of the user terminal apparatus 500. In addition, the terrestrial magnetic sensor 522 and the acceleration sensor 523 may be used to sense a rotated state of or an inclined state of the user terminal apparatus 500.

The bending sensor 524 may sense a bending state of the user terminal apparatus 500 when the user terminal apparatus 500 is embodied as a flexible display apparatus.

The pressure sensor 525 senses a pressure applied onto the user terminal apparatus 500 and provides a result of sensing the pressure to the control unit 530, when a user touches or bends the user terminal apparatus 500. The pressure sensor 525 may include a piezo film that is included in the display unit 510 and that outputs an electrical signal corresponding to a pressure applied onto the user terminal apparatus 500. Although FIG. 30 illustrates that the pressure sensor 525 and the touch sensor 521 as different sensors, when he touch sensor 521 is a pressure-sensitive touch sensor, the pressure-sensitive touch sensor may also act as the function of the pressure sensor 550.

The proximity sensor 526 senses a motion of an object near the display unit 510 where the object does not directly contact a surface of the display unit 510. The proximity sensor 526 may be embodied as any of various sensors, e.g., a high-frequency oscillation type sensor that forms a high-frequency magnetic field and senses current induced due to magnetic field characteristics changing when an object approaches the display unit 510, a magnetic type sensor that uses a magnet, and an electrostatic type sensor that senses an electrostatic capacitance changing when an object approaches the display unit 510.

The grip sensor 527 is placed at an edge or handle of the user terminal apparatus 500, separately from the pressure sensor 525, and senses gripping of the user. The grip sensor 527 may be embodied as a pressure sensor or a touch sensor.

The control unit 530 interprets a user input by analyzing each of various sensing signals sensed by the sense unit 520, and performs an operation corresponding to the user input.

For example, the control unit 530 may process data obtained through communication with an external device or data stored in the storage unit 540, and output a result of processing the data via the display unit 510, the speaker 580, or the like. In this case, the control unit 530 may communicate with the external device via the communication unit 550.

The communication unit 550 is configured to establish communication with various types of external devices according to any of various communication methods. The communication unit 550 may include at least some of various communication modules, such as a broadcast receiving module 551, a short-distance wireless communication module 552, a global positioning system (GPS) module 553, and a wireless communication module 554. The broadcast receiving module 551 may include a terrestrial broadcast receiving module (not shown) including an antenna for receiving a terrestrial broadcast signal, a demodulator, and an equalizer; a digital multimedia broadcasting (DMB) module that receives and processes a DMB broadcast signal; and the like. The short-distance wireless communication module 552 is a module that establishes communication with an external device located within a short range, according to a short-distance wireless communication method, such as an NFC, Bluetooth, and ZigBee. The GPS module 553 is a sensor that detects current location of the user terminal apparatus 500 by receiving a GPS signal from a GPS satellite. The wireless communication module 554 is a module that is connected to an external network to establish communication according to a wireless communication protocol, such as WiFi and IEEE. In addition, the communication module 552 may include a mobile communication module that establishes communication by accessing a mobile telecommunication network according to any of various mobile telecommunication standards, e.g., a 3G mobile telecommunication network, 3rd generation partnership project (3GPP), or long term evolution (LTE).

The control unit 530 may activate some of the elements of the communication unit 550 that are needed to perform an operation that a user desires to perform, and perform the desired operation.

In addition to a bending operation or a touch operation, the control unit 530 may recognize a voice input or a motion input and perform an operation corresponding to this input. In this case, the voice recognition unit 560 or the motion recognition unit 570 may be activated.

The voice recognition unit 560 may collect a user's voice or external sound by using a voice acquiring unit, e.g., a microphone (not shown), and delivers the user's voice or the external sound to the control unit 530. When the control unit 530 operates in a voice-controlled mode and the user's voice matches a preset voice command, the control unit 530 may perform a task corresponding the user's voice. Examples of task that may be controlled using voice may include volume control, channel selection, channel zapping, display attribute control, replay, temporal pause, rewinding, fast winding, running an application, menu selection, turning on an apparatus, turning off an apparatus, etc.

The motion recognition unit 570 captures an image of a user by using an imaging unit (not shown), e.g., a camera, and provides the image of the user to the control unit 530. When the control unit 530 operates in a motion-controlled mode, the control unit 530 analyzes the image of the user. When it is determined that the user made a motion gesture corresponding to a preset motion command, the control unit 530 performs an operation corresponding to the motion gesture. For example, various tasks, e.g., channel zapping, turning on an apparatus, turning off an apparatus, temporal pause, reproduction, replay, pause, rewinding, fast winding, and voice muting, may be controlled by a user's motion. The tasks that may be controlled by voice and the tasks that may be controlled by a motion are just examples and the present invention is thus not limited thereto.

In addition, each of the external input ports 590-1 to 590-n may be connected to any of various external devices to receive various data, programs, and control commands. Specifically, the external input ports 590-1 to 590-n may include a USB port, a headset port, a mouse port, a LAN port, etc.

The power supply unit 595 supplies power to the elements of the user terminal apparatus 500.

The control unit 530 may control the display unit 510 to provide a UI screen displaying current setting information regarding the devices 300-2, 300-3, 300-3, . . . , 300-n in the domain, a UI screen displaying changed setting information when the current setting information regarding the devices 300-2, 300-3, 300-3, . . . , 300-n is changed through short-distance accessing, and a UI screen for manually changing the setting information regarding the devices 300-2, 300-3, 300-3, . . . , 300-n.

Here, the UI screen may be provided such that the setting information regarding the devices 300-2, 300-3, 300-3, . . . , 300-n received from the management server 200 or the cloud server 400 via the communication unit 550 is reflected in an UI stored in the storage unit 540 of the user terminal apparatus 500.

Otherwise, the UI screen may be provided by receiving an UI reflecting the setting information regarding the devices 300-2, 300-3, 300-3, . . . , 300-n received from the management server 200 or the cloud server 400 via the communication unit 550. In this case, the communication unit 550 may also receive a control command, which is received from the user terminal apparatus 500 and corresponds to UI specifications (GUI) and a UI, from the management server 100 or the cloud server 400. Also, communication connection information for communicating with the management server 100 and the cloud server 400 may be received. In this case, the communication connection may include a password and communication protocol information for accessing the management server 100 or the cloud server 400 via specific communication means, e.g., WiFi. Such a UI screen will be described in detail with reference to FIGS. 31 to 47 below.

The control unit 530 may change a communication manner of the user terminal apparatus 500. For example, when the user terminal apparatus 500 employing WiFi communication accesses the domain, communication manner of the user terminal apparatus 500 may be changed from the WiFi communication to a 3G communication manner.

FIGS. 31 to 47 illustrate UI screens for controlling a user terminal apparatus consistent with exemplary embodiments. In FIGS. 31 to 47, solid line arrows each denote a change in a screen, caused by a user input, and dotted line arrows each denote an automatic change in the screen.

FIGS. 31 to 38 illustrate UI screens that may be displayed on a user terminal apparatus in a home domain or a hotel domain.

Figure 31:
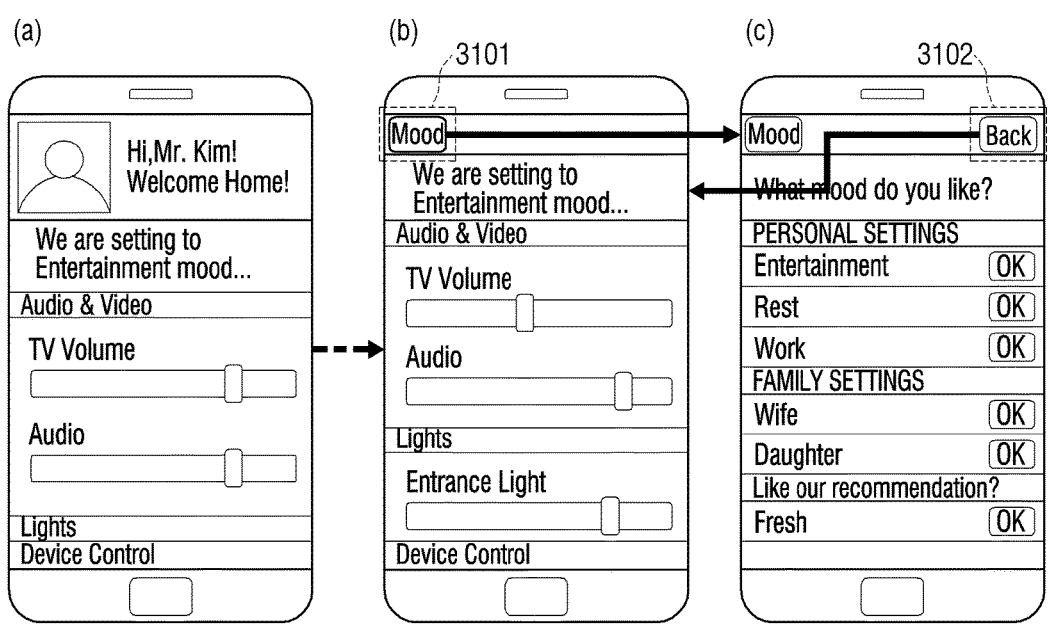
FIGS. 31 to 47 illustrate user interface (UI) screens for controlling a user terminal apparatus consistent with exemplary embodiments.

When a user accesses a domain managed by the management server 100 based on authority information for accessing the domain, a UI screen containing current setting information regarding at least one device in the domain may be displayed as illustrated in FIG. 31(*a*).

Also, when at least one device in a domain is controlled based on setting information corresponding to transmitted user ID information, a UI screen representing a controlled state of the at least one device may be displayed as illustrated in FIG. 31(*b*). In this screen, 'TV Volume' and 'Audio' may be automatically changed based on setting information corresponding to the user ID information.

When a user selects 'Mood 3101' to manually set setting information regarding the at least one device, a manual setting screen may be displayed as illustrated in FIG. 31(*c*). If in the manual setting screen, the user changes setting information regarding the at least one device, the changed setting information may be applied to the at least one device. In this case, the changed setting information may be displayed in the UI screen. Here, the manual setting screen may be displayed in any of various ways, in consideration of the user's taste. When 'Back 3102' is selected in the UI screen of FIG. 31(*c*), the UI screen of FIG. 31(*b*), which is a previous screen, may be displayed.

Although in FIG. 31, the UI screens are categorized according to 'Audio & Video', 'Lights', 'Device Control', and are then displayed in the form of a category list, the UI screens are not limited thereto.

Figure 32:
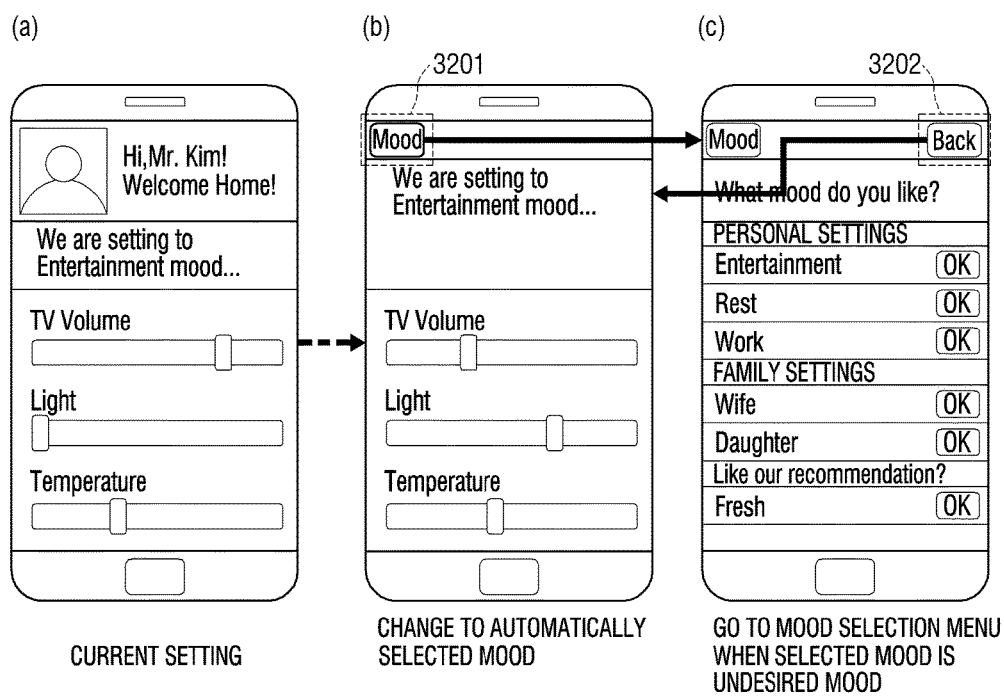

For example, UI screens may not be categorized and may be simply displayed in the form of a list, as illustrated in FIG. 32. If UI screens are displayed as illustrated in FIG. 32 and 'Mood 3201' and 'Back 3202' are selected, then the operations described above with reference to FIG. 31 may be performed.

Figure 33:
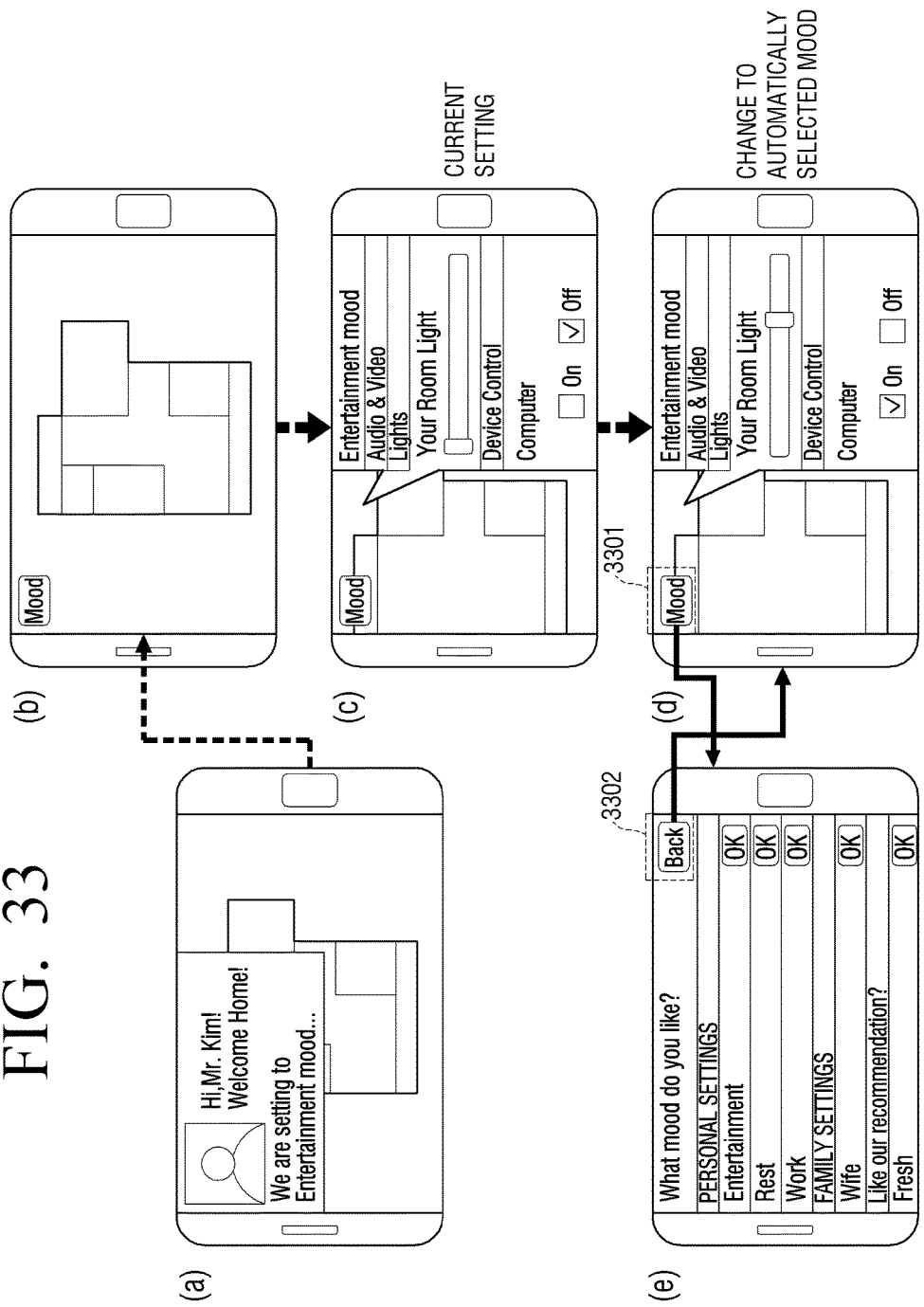
Figure 34:
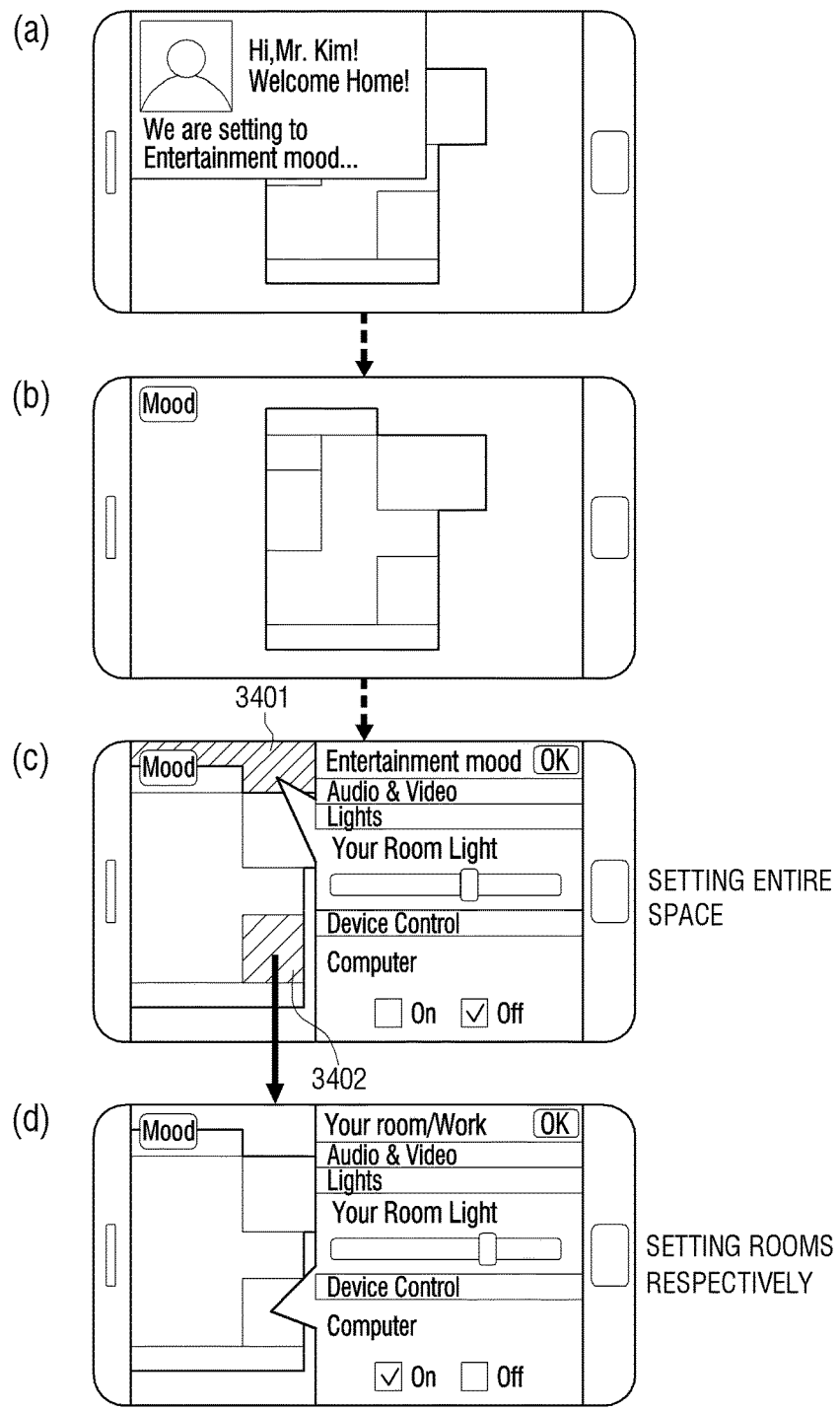

Also, UI screens may be displayed in the form of an image as illustrated in FIG. 33 or 34.

In other words, as illustrated in FIG. 33 or 34, images of a user's home may be displayed according to the rooms in the user's home. In this case, as illustrated in FIG. 33(*c*), a UI screen may display 'Room Light' that is current setting information for lighting the entire home. Also, as illustrated in FIG. 33(*d*), a UI screen may display a result of automatically changing 'Room Light' based on setting information corresponding to user ID information. If 'Mood 3301' is selected in the UI screen of FIG. 33(*d*), a manual setting screen may be displayed as illustrated in FIG. 33(*e*).

If a region 3401 is selected in a UI screen of FIG. 34(*b*), a UI screen for setting information regarding the home including at least one room may be displayed as illustrated in FIG. 34(*c*). When each room 3402 is selected in the UI screen of FIG. 34(*c*), a UI screen for changing setting information regarding the selected room may be displayed as illustrated in FIG. 34(*d*).

Figure 35:
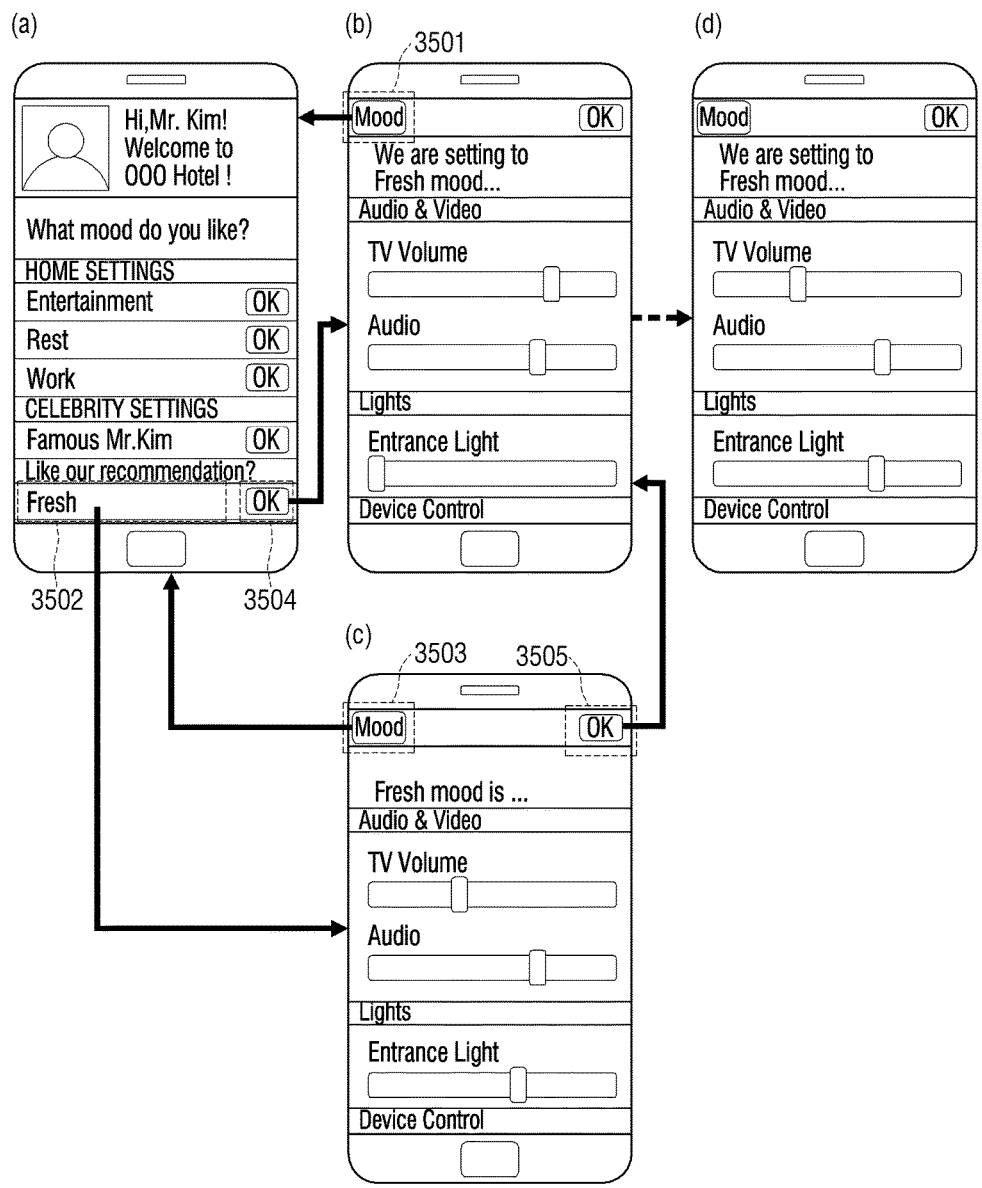

FIG. 35 illustrates UI screens for manually setting information regarding at least one device. When a user selects 'Mood 3501' as illustrated in FIG. 35(*b*) while the current setting information, e.g., 'TV Volume' and 'Audio', is displayed, a manual setting screen may be displayed as illustrated in FIG. 35(*a*). In this case, when the user selects 'Fresh 3502', a UI screen for manually changing setting information regarding a 'Fresh' mode may be displayed as illustrated FIG. 35(*c*). If the user selects 'OK' 3505 in the UI screen of FIG. 35(*c*), the UI screen of FIG. 35(*b*) may be changed to a UI screen of FIG. 35(*d*) displaying changed setting information regarding, for example, 'TV Volume' and 'Audio', based on setting information corresponding to the 'Fresh' mode.

If the user selects 'Mood' 3503 in the UI screen of FIG. 35(*c*), the UI screen of FIG. 35(*a*) may be displayed. In this case, when the user selects 'OK' 3504 in the UI screen of FIG. 35(a), the UI screen of FIG. 35(b) may be changed to the UI screen of FIG. 35(d) displaying changed setting information regarding, for example, 'TV Volume' and 'Audio', based on the setting information corresponding to the 'Fresh' mode.

Also, setting information that is to be recommended to a user may be displayed. For example, as illustrated in FIG. 35(b), setting information ("Celebrity Settings") recommended for a user to change current setting information to setting information regarding 'Mr. Kim' who stayed OOO Hotel may be displayed, or home setting information ("Home Settings") may be recommended to the user. In this case, the user terminal apparatus 500 may transmit the recommended setting information to another user terminal apparatus via a social networking service (SNS).

Although FIG. 35 illustrates that the UI screens are displayed in the form of a category list, the UI screens are not limited thereto.

Figure 36:
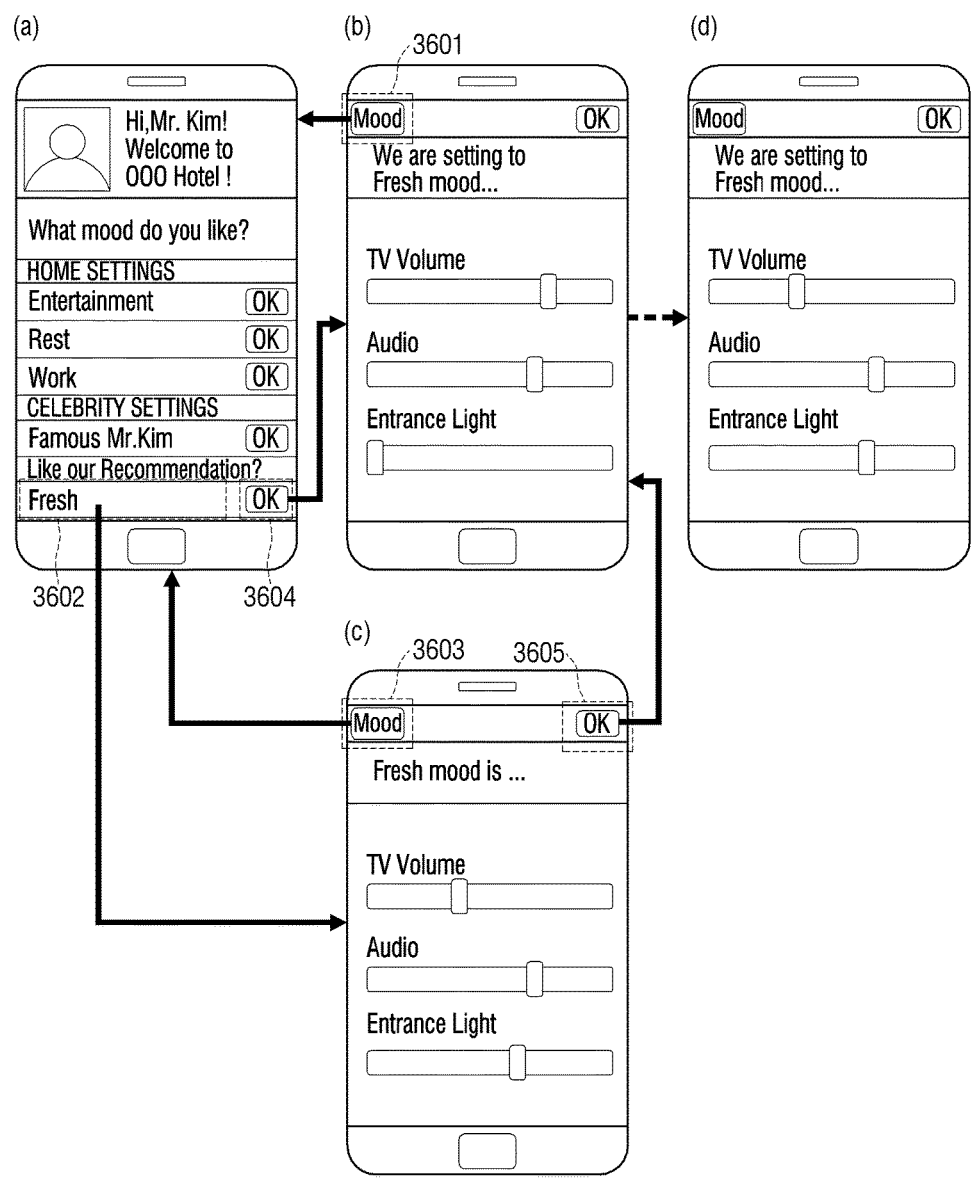

For example, UI screens may be simply displayed in the form of a list as illustrated in FIG. 36. In this case, when 3601, 3602, 3603, 3604, and 3605 illustrated in FIG. 36 are selected, the operations described above with reference to FIG. 35 may be performed.

Figure 37:
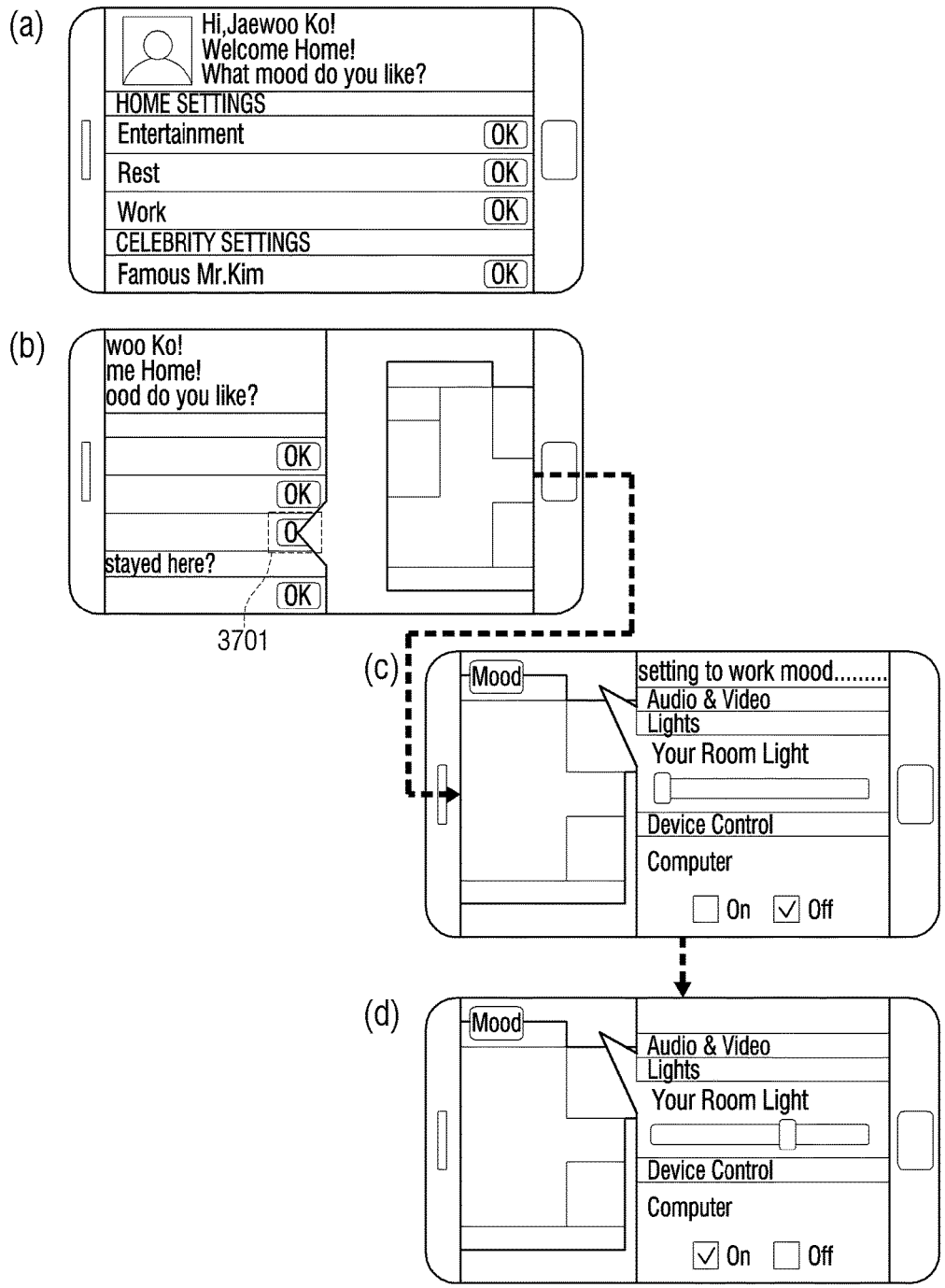
Figure 38:
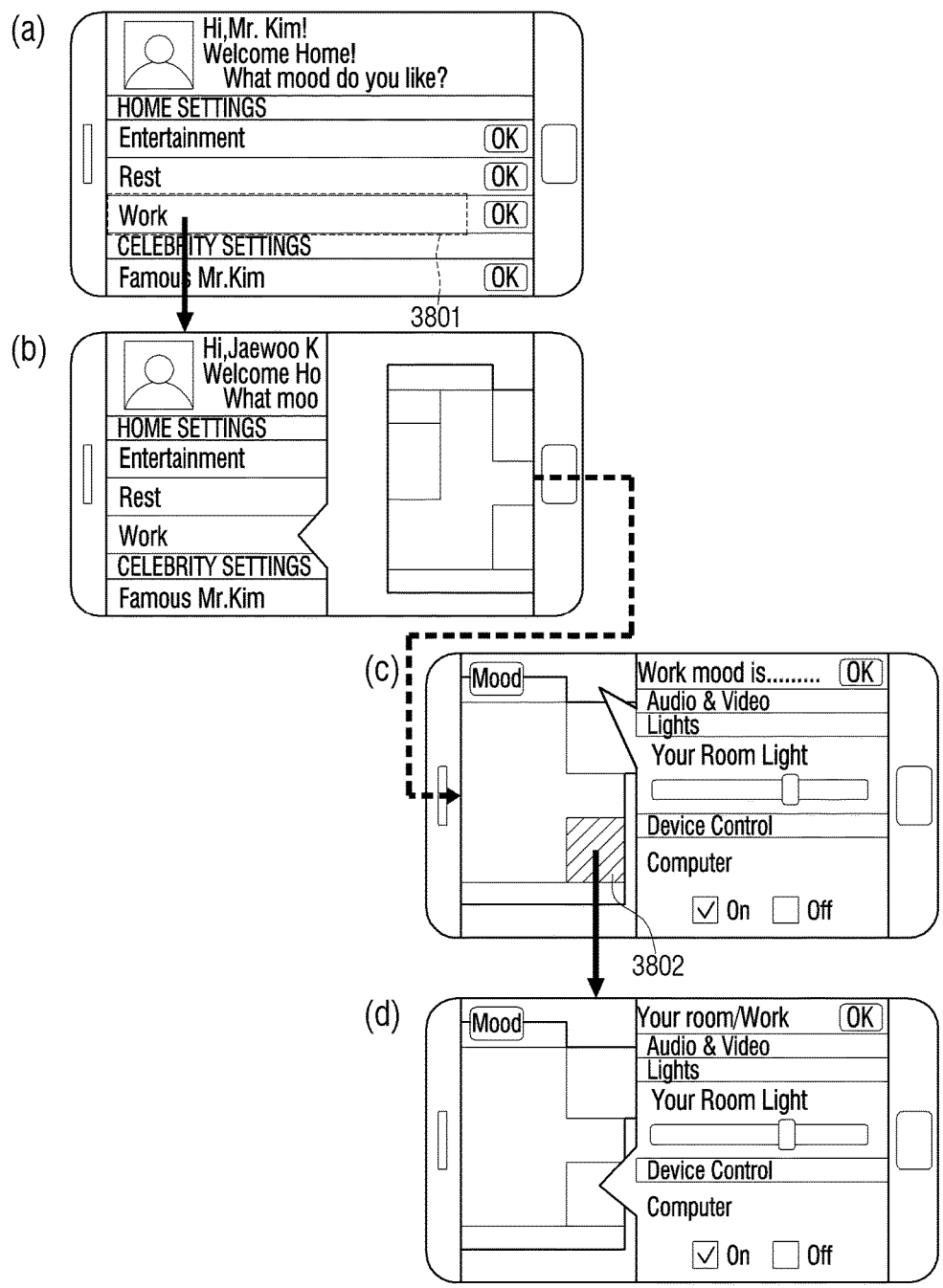

Otherwise, UI screens may be displayed in the form of an image, as illustrated in FIG. 37 or 38. In this case, when 'OK' 3701 corresponding to a 'Work' mode is selected while a manual setting screen is displayed as illustrated in FIGS. 37(a) and (b), a UI screen of FIG. 37(c) displaying current setting information may be changed to a UI screen of FIG. 37(d) displaying changed setting information regarding, for example, 'Lights' and 'Device Control', based on setting information corresponding to the 'Work' mode.

Also, when 'OK' 3801 corresponding to a 'Work' mode is selected while a manual setting screen is displayed as illustrated in FIGS. 38(a) and (b), current setting information regarding all of rooms may be changed to setting information corresponding to the 'Work' mode, thereby displaying a UI screen of FIG. 38(c) in which changed setting information regarding, for example, 'Lights' and 'Device Control' are displayed. When a specific room 3802 is selected in the UI screen of FIG. 38(c), setting information regarding the selected room is changed to the setting information corresponding to the 'Work' mode, thereby displaying a UI screen of FIG. 38(d) in which changed setting information regarding, for example, 'Lights' and 'Device Control' are displayed.

FIGS. 39 to 46 illustrate UI screens that may be displayed on a user terminal apparatus in an automobile domain according to exemplary embodiments.

When a user accesses a domain managed by a management server 100 based on authority information for accessing the domain, a UI screen containing current setting information regarding at least one device in the automobile domain may be displayed as illustrated in FIG. 39(a).

When the at least one device in the automobile domain is controlled based on setting information corresponding to transmitted user ID information, a UI screen indicating a controlled state of the at least one device may be displayed as illustrated in FIG. 39(b). That is, a UI screen in which 'TV Volume', 'Woofer', and 'Courtesy Light' are automatically changed based on the setting information corresponding to the user ID information may be displayed.

When a user selects 'Mood 3901' to manually set setting information regarding at least one device, a manual setting screen may be displayed as illustrated in FIG. 39(c). If the user changes the setting information regarding the at least one device in the manual setting screen, the setting information may be applied to the at least one device. In this case, the UI screen may display the changed setting information. Here, the manual setting screen may be displayed in any of various ways, in consideration of the user's taste. When 'Back 3902' is selected in the UI screen of FIG. 39(c), the UI screen of FIG. 39(b), which is a previous screen, may be displayed.

Figure 39:
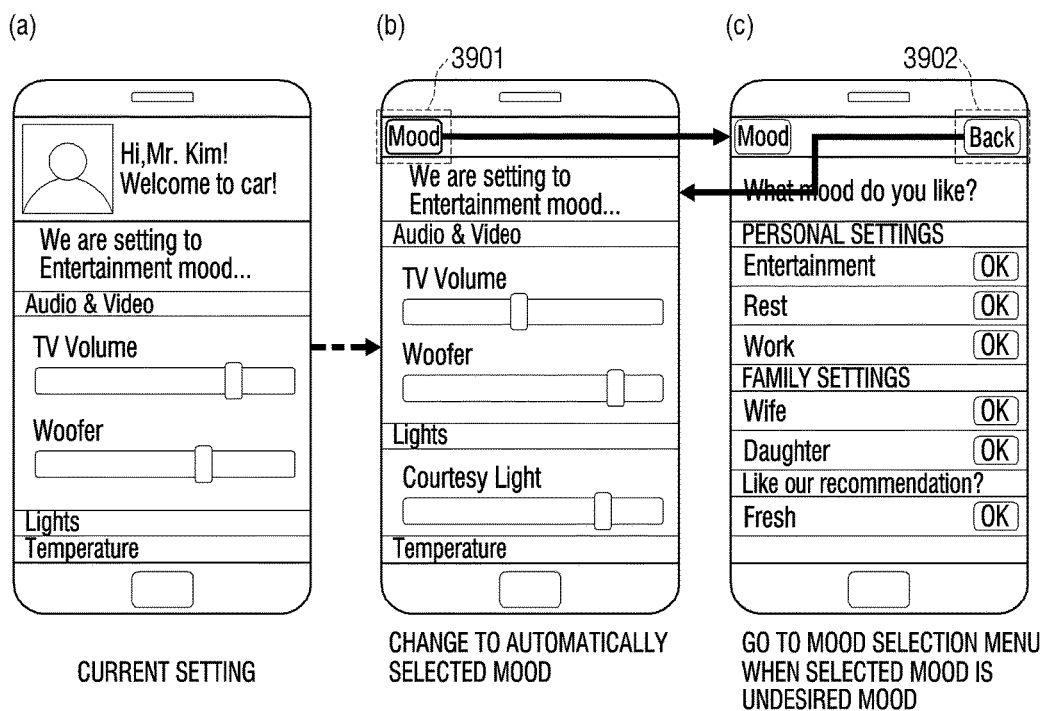
Figure 40:
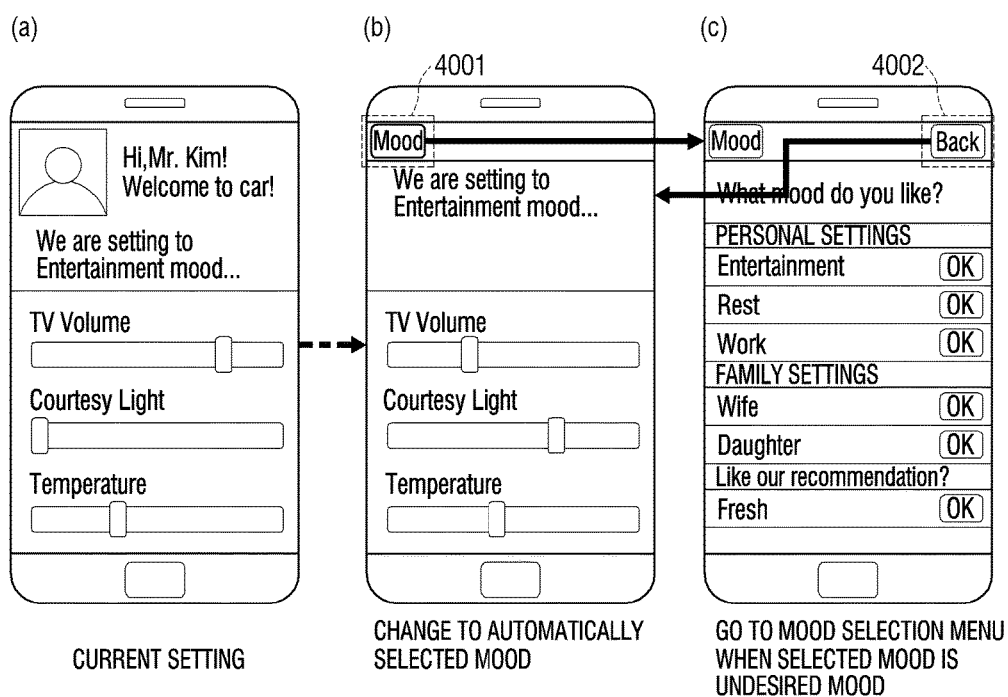

Although FIG. 39 illustrates that the UI screens are categorized according to 'Audio & Video', 'Lights', 'Temperature', and the like, and are displayed in the form of a category list, the exemplary embodiment is not limited thereto. For example, UI screens may not be categorized and may be simply displayed in the form of a list as illustrated in FIG. 40. If UI screens are displayed as illustrated in FIG. 40 and 'Mood 4001' and 'Back 4002' are selected, then the operations described above with reference to FIG. 39 may be performed.

Figure 41:
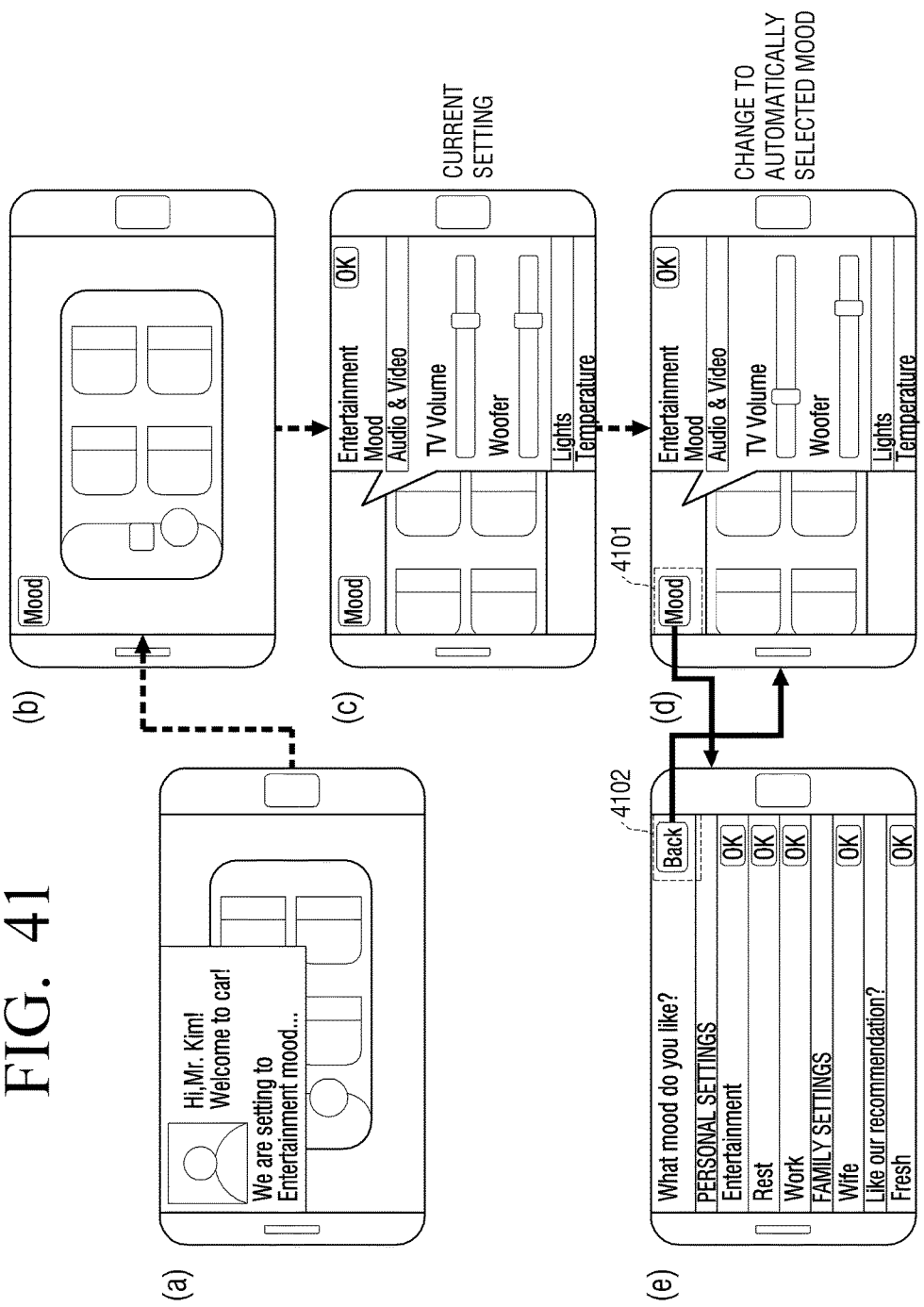
Figure 42:
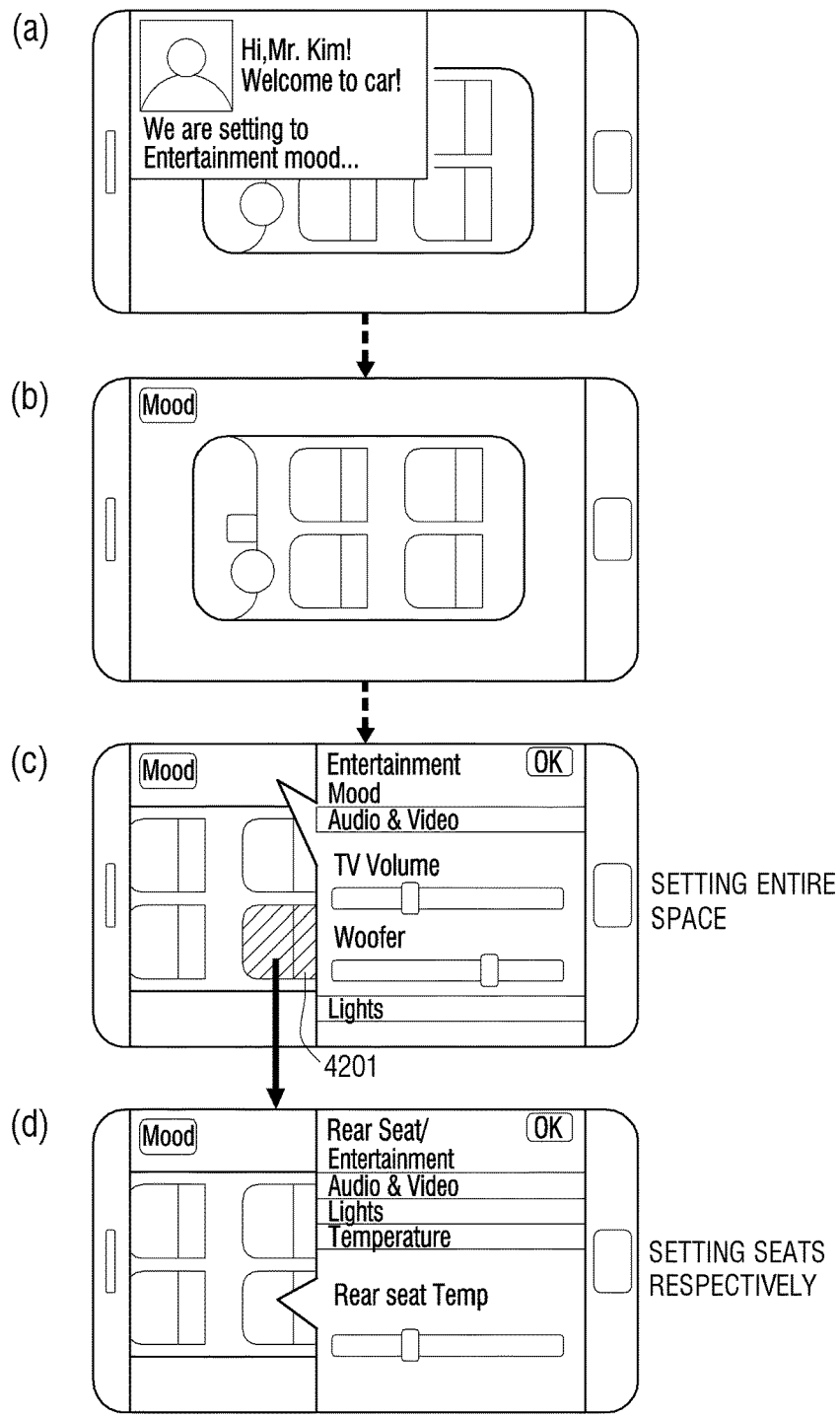

Otherwise, UI screens may be displayed in the form of an image, as illustrated in FIG. 41 or 42.

In other words, as illustrated in FIG. 41 or 42, images of an automobile may be displayed according to a seating arrangement of the automobile. In this case, as illustrated in FIG. 41(c), a UI screen displaying 'TV Volume' and 'Woofer' that are current setting information of the entire automobile may be displayed. Also, as illustrated in FIG. 41(d), a UI screen displaying a result of automatically changing 'TV Volume' and 'Woofer' based on setting information corresponding to user ID information may be displayed. Also, when 'Mood 4101' is selected in the UI screen of FIG. 41(d), a manual setting screen as illustrated in FIG. 41(e) may be displayed.

The UI screen of FIG. 42(b) may be for setting information regarding all of devices in the automobile domain. Also, when each of the seats is selected in the UI screen of FIG. 42(c) (4201), a UI screen for changing setting information regarding the selected seat may be displayed as illustrated in FIG. 42(d).

Figure 43:
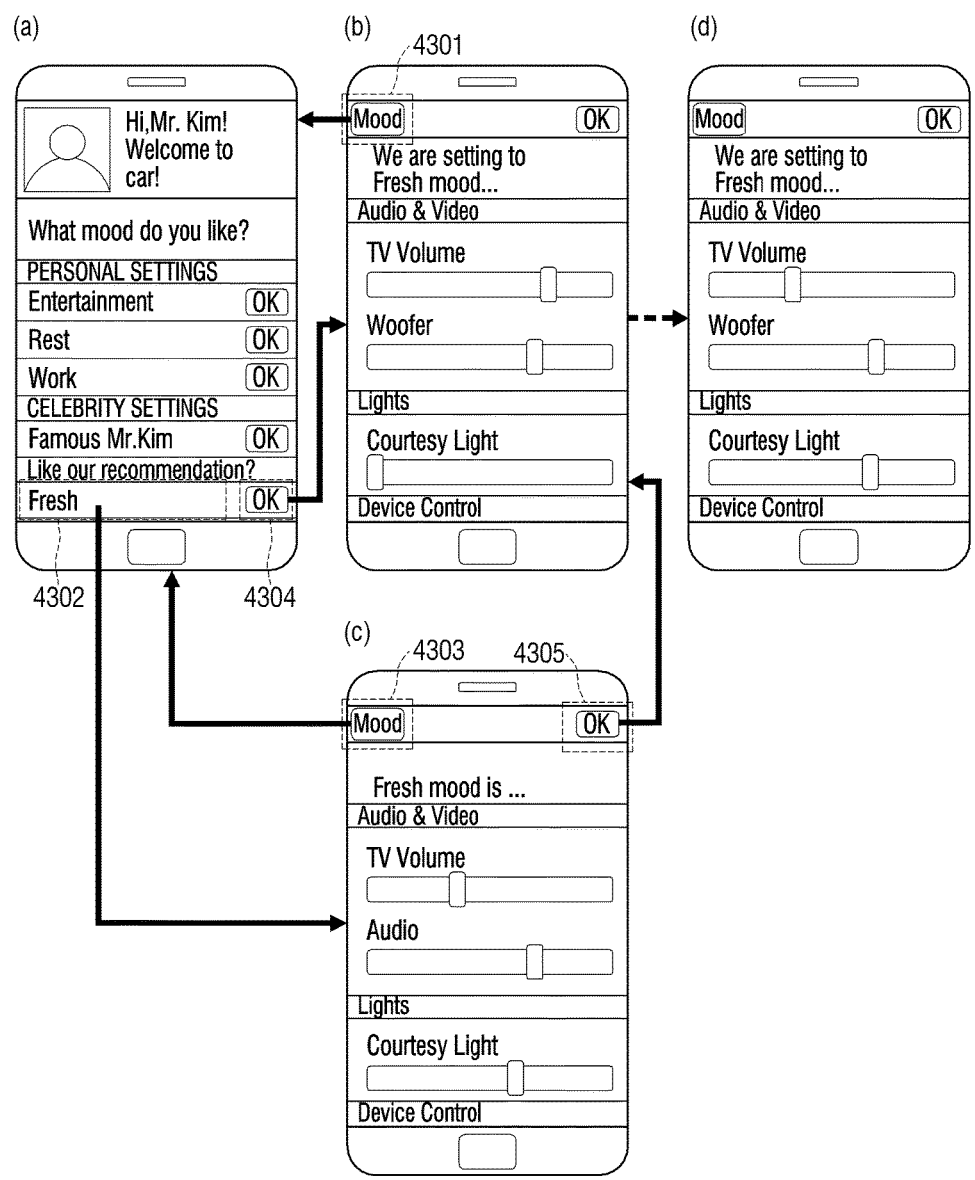

FIG. 43 illustrates UI screens for manually setting information regarding at least one device. When a user selects 'Mood 4301' while current setting information, e.g., 'TV Volume' and 'Woofer', is displayed as illustrated in FIG. 43(b), a manual setting screen may be displayed as illustrated in FIG. 43(a). Here, when the user selects 'Fresh 4302', a UI screen for manually changing setting information regarding a 'Fresh' mode may be displayed as illustrated in FIG. 43(c). If the user selects 'OK' 4305 in the UI screen of FIG. 43(c), the UI screen of FIG. 43(b) may be changed to a UI screen of FIG. 43(d) displaying changed setting information regarding 'TV Volume' and 'Woofer', based on the setting information corresponding to the 'Fresh' mode.

When the user selects 'Mood 4303' in the UI screen of FIG. 43(c), the UI screen of FIG. 43(a) may be displayed. In this case, when the user selects 'OK' 4304 in the UI screen of FIG. 43(a), the UI screen of FIG. 43(b) is changed to the UI screen of FIG. 43(d) displaying changed setting information regarding, for example, 'TV Volume' and 'Woofer', based on the setting information corresponding to the 'Fresh' mode.

Although FIG. 43 illustrates that the UI screens are displayed in the form of a category list, the UI screens are not limited thereto.

Figure 44:
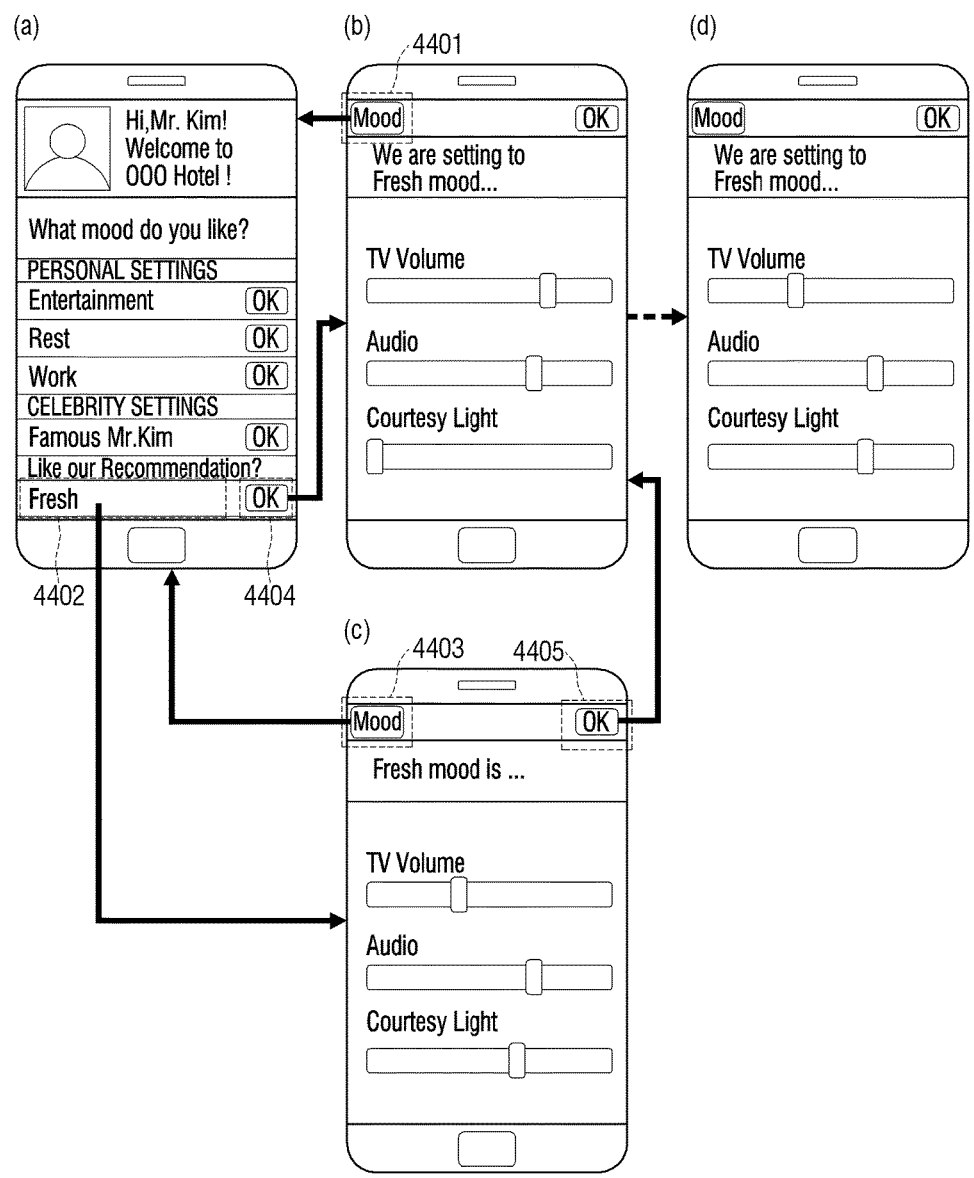

For example, UI screens may be simply displayed in the form of a list, as illustrated in FIG. 44. In this case, buttons 4401, 4402, 4403, 4404, or 4405 illustrated in FIG. 44 may be selected, and the operations described above with reference to FIG. 43 may be performed.

Figure 45:
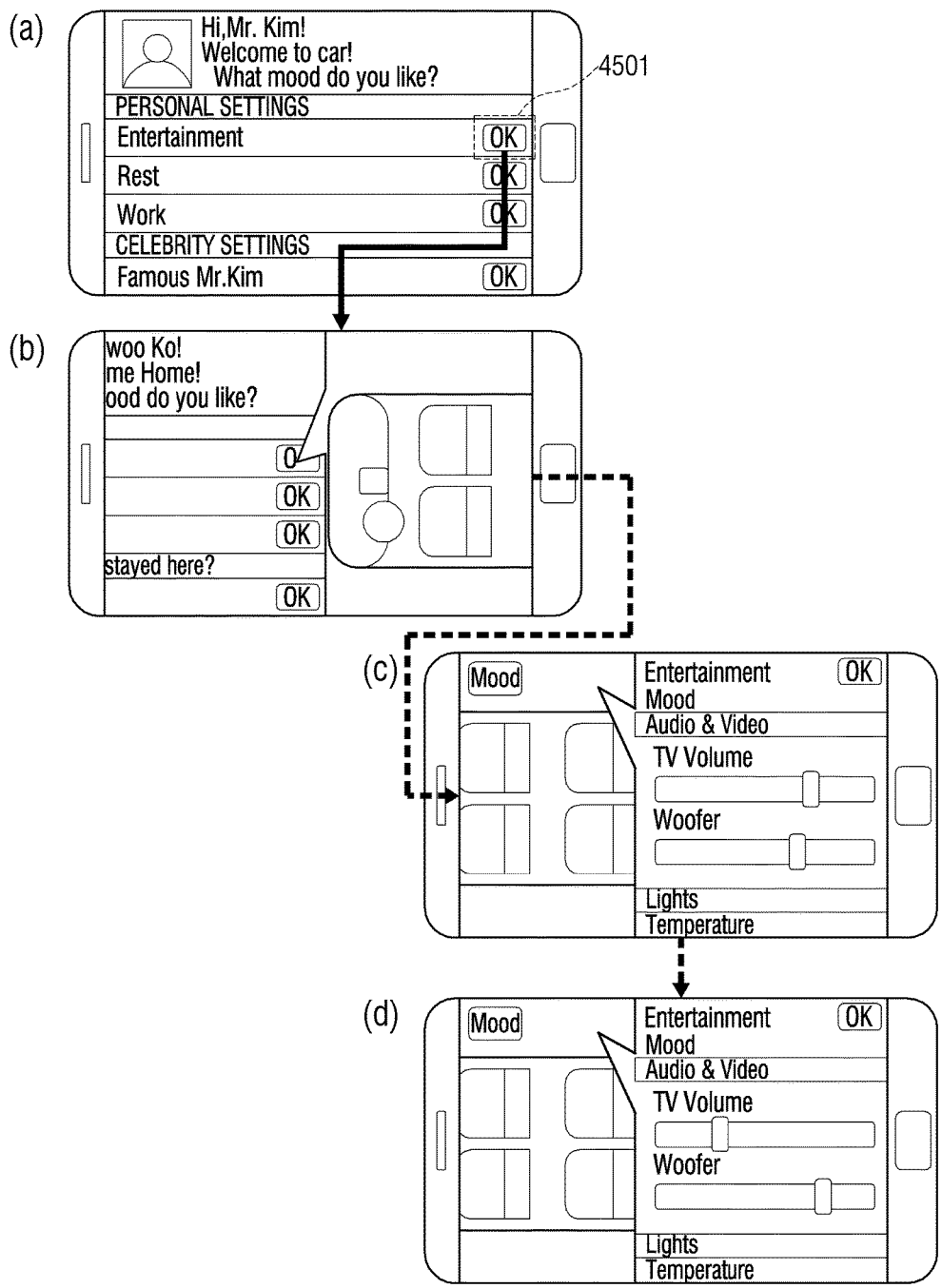
Figure 46:
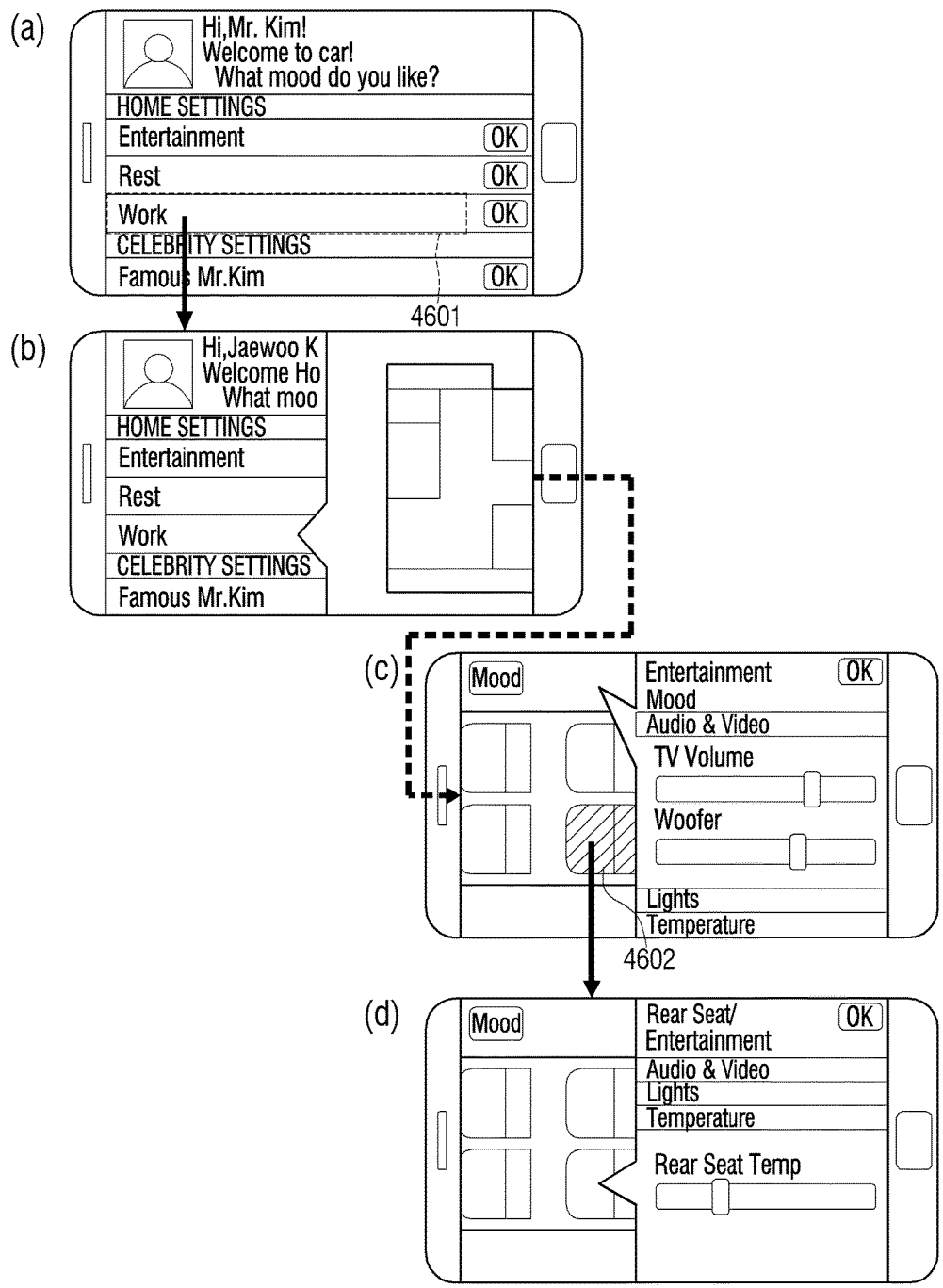

Also, UI screens may be displayed as illustrated in FIG. 45 or 46.

In this case, when 'OK' 4501 corresponding to an 'Entertainment' mode is selected while a manual setting screen is displayed as illustrated in FIGS. 45(a) and (b), the manual setting screen displaying current setting information may be changed to a UI screen of FIG. 45(d) displaying changed setting information regarding, for example, 'TV Volume' and 'Woofer' as illustrated in FIG. 45(c), based on setting information corresponding to the 'Entertainment' mode.

Also, when 'OK' 4601 corresponding to a 'Work' mode is selected while a manual setting screen is displayed as illustrated in FIGS. 46(a) and (b), current setting information regarding the inside of the automobile is changed to setting information corresponding to the 'Work' mode, thereby displaying a UI screen of FIG. 46(c) in which changed setting information regarding, for example, 'TV Volume' and 'Woofer' is shown. When a seat 4602 is selected in the UI screen of FIG. 46(c), setting information regarding the selected seat 4602 is changed to the setting information corresponding to the 'Work' mode, thereby displaying a UI screen of FIG. 46(d) displaying changed setting information regarding, for example, 'Rear Seat Temp' and the like.

Figure 47:
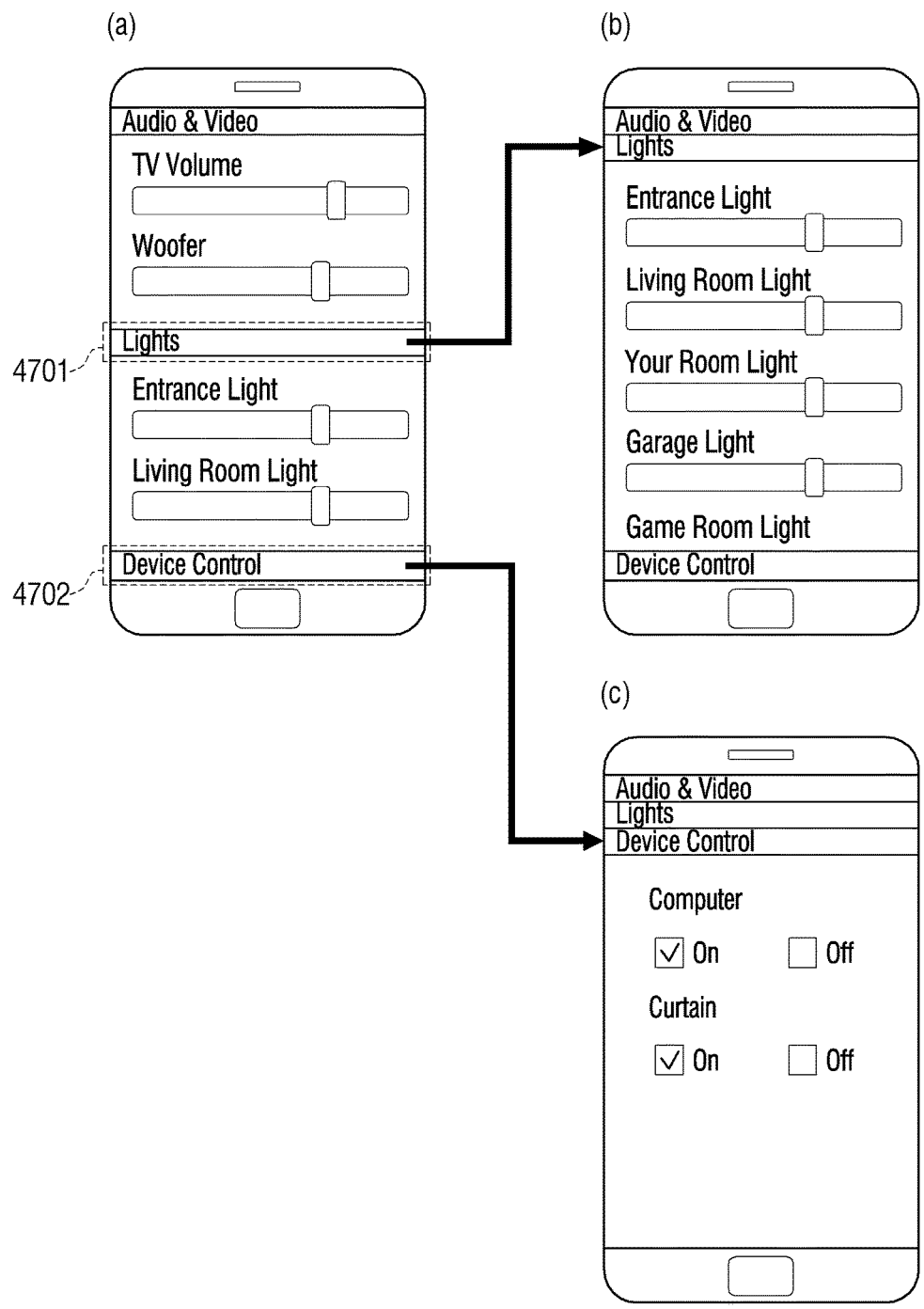

FIG. 47 illustrates UI screens for setting information on a basis of the type of at least one device according to another exemplary embodiment. Referring to FIG. 47(a), the UI screen may include setting information regarding 'Audio & Video', setting information regarding 'Lights', and setting information regarding 'Device Control" (setting information regarding a device that is to be controlled). In this case, a user may allow details of the setting information regarding 'Lights' to be displayed as illustrated in FIG. 47(b) by selecting 'Lights 4701', and may allow details of the setting information regarding 'Device Control' to be displayed as illustrated in FIG. 47(c) by selecting 'Device Control 4702'.

Figure 48:
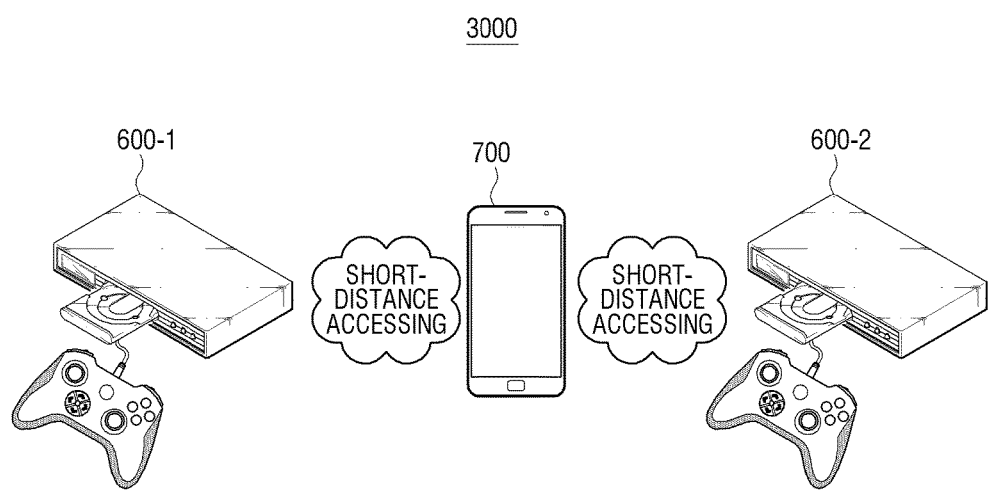
FIG. 48 is a diagram illustrating a game environment setting system consistent with an exemplary embodiment.

FIG. 48 is a diagram illustrating a game environment setting system 3000 according to an exemplary embodiment. Referring to FIG. 48, the game environment setting system 3000 includes a first game console 600-1, a second game console 600-2, and a user terminal apparatus 700.

The first game console 600-1, the second game console 600-2, and the user terminal apparatus 700 may each include a short-distance wireless communication module for establishing short-distance wireless communication when short-distance accessing is performed. Here, the short-distance accessing may be performed based on NFC.

Hereinafter, for convenience of explanation, the first game console 600-1 and second game console 600-2 will be referred to as a transmitting-side game console and a receiving-side game console, respectively.

When short-distance accessing is performed between the first game console 600-1 and the user terminal apparatus 700, the first game console 600-1 may transmit ID information and game environment information thereof to the user terminal apparatus 700.

When the user terminal apparatus 700 receives the ID information and game environment information regarding the first game console 600-1 from the first game console 600-1, the user terminal apparatus 700 may store the received game environment information to be mapped to the ID information of the first game console 600-1.

When short-distance accessing is performed between the user terminal apparatus 700 and second game console 600-2, the user terminal apparatus 700 may transmit ID information and game environment information stored therein to the second game console 600-2. In this case, the second game console 600-2 may detect game environment information that matches ID information matching ID information thereof from the ID information received from the user terminal apparatus 700.

Also, when short-distance accessing is performed between the user terminal apparatus 700 and second game console 600-2, the user terminal apparatus 700 may receive ID information regarding the second game console 600-2 from the second game console 600-2. In this case, the user terminal apparatus 700 may detect game environment information corresponding to the ID information regarding the second game console 600-2 from game environment information stored therein, and transmit the detected game environment information to the second game console 600-2.

The second game console 600-2 may set game environment information thereof, based on either the game environment information detected by and received from the user terminal apparatus 700 or game environment information detected from the second game console 600-2.

Here, the ID information means information identifying any of various game consoles, e.g., the first or second game consoles 600-1 or 600-2, or games played in the first or second game console 600-1 or 600-2. In detail, the information identifying any of various game consoles, e.g., the first or second game consoles 600-1 or 600-2, may include game console type information (e.g., information identifying the manufacturer of the game console or the game console type), and game console serial number information. Also, the information identifying games played in any of various game consoles, e.g., the first or second game console 600-1 and 600-2, may include game type information (e.g., information identifying a game title).

Here, the game environment information means all of information needed to play each game. For example, the game environment information may include external game environment information, such as game volume information and game resolution information; and internal game environment information, such as avatar setting information, avatar location information in a game, avatar level information in a game, and a progress of a game that is being played.

Figure 49:
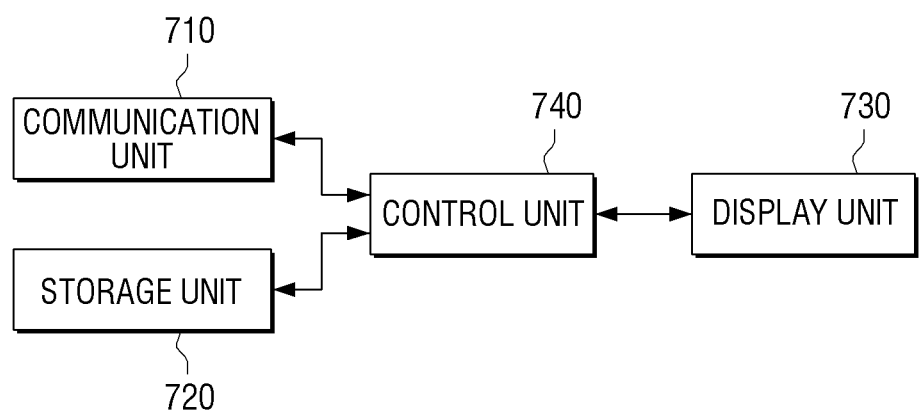
FIG. 49 is a block diagram of a user terminal apparatus included in a game environment setting system consistent with an exemplary embodiment.

FIG. 49 is a block diagram of a user terminal apparatus 700 included in a game environment setting system according to an exemplary embodiment. Referring to FIG. 49, the user terminal apparatus 700 includes a communication unit 710, a storage unit 720, a display unit 730, and a control unit 740.

The communication unit 710 connects the user terminal apparatus 700 to an external device. In particular, when short-distance accessing is performed between the first game console 600-1 and the communication unit 710, the communication unit 710 may receive ID information and game environment information regarding the first game console 600-1.

When short-distance accessing is performed between the second game console 600-2 and the communication unit 710, the communication unit 710 may receive ID information regarding the second game console 600-2 from the second game console 600-2. In this case, the control unit 740 may detect game environment information corresponding to the ID information regarding the second game console 600-2 from game environment information stored in the storage unit 720. Then, the communication unit 710 may transmit the detected game environment information to the second game console 600-2. In this case, the second game console 600-2 may set the received game environment information as game environment information thereof.

Otherwise, when short-distance accessing is performed between the second game console 600-2 and the communication unit 710, the communication unit 710 may transmit ID information and game environment information stored in the storage unit 720 to the second game console 600-2. Then, the second game console 600-2 may detect game environment information matching ID information, which is the same as the ID information regarding the second game console 600-2, from the ID information received from the user terminal apparatus 700. Then, the second game console 600-2 may set the detected game environment information as game environment information thereof.

Here, the communication unit 710 may exchange information with the first and second game consoles 600-1 and 600-2 according to any of various short-distance wireless communication methods. The short-distance wireless communication method may be NFC.

In addition to the short-distance wireless communication method, the communication unit 710 may receive or transmit information by being connected to an external device in a wired/wireless manner via a LAN, the Internet, a USB port, or a 3G or 4G mobile telecommunication network.

The storage unit 720 stores various programs and data required to drive the user terminal apparatus 700. In particular, the storage unit 720 may store environment information received from the first game console 600-1 such that the environment information is mapped to ID information regarding the first game console 600-1. For example, the storage unit 720 may store the environment information as shown in Table 2.

TABLE 2

| Game Console Type Information | Game Type Information | External Game Information | Internal Game Information |
|---|---|---|---|
| Game Console 1 | Game 1 | Game Volume: 60% Resolution: HD | Internal Game Information 1 |
| Game Console 1 | Game 2 | Game Volume: 5% Resolution: SD | Internal Game Information 2 |
| Game Console 2 | Game 1 | Game Volume: 40% Resolution: HD | Internal Game Information 3 |
| Game Console 2 | Game 2 | Game Volume: 70% Resolution: HD | Internal Game Information 4 |

The storage unit 720 may be embodied as a built-in storage device, e.g., a RAM, a flash memory, a ROM, EPROM, an EEPROM, a register, a hard disc, a removable disc, and a memory card; or an attachable/detachable storage device, e.g., a USB memory and a CD-ROM.

The display unit 730 displays a screen image. Specifically, when short-distance accessing is performed on the first game console 600-1, the display unit 730 may display ID information and game environment information regarding the first game console 600-1 that is received via the communication unit 710.

In this case, if short-distance accessing is performed while a game is being played in the first game console 600-1, the received game environment information may be game environment information regarding the game that is being played in the first game console 600-1. In this case, the display unit 720 may display the game environment information regarding the game that is being played in the first game console 600-1 and the ID information regarding the first game console 600-1.

If short-distance accessing is performed while no game is being played in the first game console 600-1, the received game environment information may be either all of game environment information stored in the first game console 600-1 or game environment information that is selected from the first game console 600-1 by a user via a UI window on the first game console 600-1. In this case, the display unit 720 may display either all of the game environment information stored in the first game console 600-1 or the game environment information selected from the first game console 600-1, and the ID information regarding the first game console 600-1.

When the ID information regarding the first game console 600-1 and the game environment information are displayed on the display unit 730, a user may select game environment information, which is to be stored in the user terminal apparatus 700, from the game environment information displayed on the display unit 730 via any of various UIs.

When short-distance accessing is performed on second game console 600-2, the display unit 730 may display ID information and game environment information, which have been stored in the storage unit 720 and are to be transmitted to the second game console 600-2. In this case, the ID information and game environment information may be sequentially displayed. For example, only the ID information may be displayed on the display unit 730, and when particular ID information is selected from the ID information, game environment information corresponding to the selected ID information may be displayed.

In this case, a user may select ID information and game environment information, which are to be transmitted to the second game console 600-2, from the ID information and game environment information displayed on the display unit 730 via any of various UIs.

The ID information and game environment information that are to be transmitted to the second game console 600-2 may be ID information and game environment information selected from the second game console 600-2 by a user, via a UI provided by the second game console 600-2. In this case, the second game console 600-2 may generate a control signal for receiving the selected ID information and game environment information, and may transmit the control signal to the user terminal apparatus 700. Then, the user terminal apparatus 700 may transmit the ID information and game environment information corresponding to the control signal to the second game console 600-2.

Also, when short-distance accessing is performed on the second game console 600-2 and ID information regarding the second game console 600-2 is received from the second game console 600-2 via the communication unit 710, the display unit 730 may display game environment information corresponding to the received ID information regarding the second game console 600-2.

In this case, a user may select game environment information, which is to be transmitted to the second game console 600-2, from the game environment information displayed on the display unit 730 via any of various UIs.

The various UIs may be embodied using various user input sensing apparatuses, such as a touch sensor that senses a user's touched manipulation, a proximity sensor that senses a proximity motion of a user, and a microphone that senses a user's voice command.

The display unit 730 may be embodied as at least one among a liquid crystal display, a TFT-LCD, an OLED, a flexible display, a 3D display, and a transparent display.

The control unit 740 controls overall operations of the user terminal apparatus 700. Specifically, the control unit 740 may control at least some of the communication unit 710, the storage unit 720, and the display unit 730.

In particular, when ID information and game environment information regarding the first game console 600-1 are received by short-distance accessing the first game console 600-1, the control unit 740 may control the display unit 730 to display the ID information and game environment information regarding the first game console 600-1. Here, when short-distance accessing is performed while a game is being played in the first game console 600-1, the game environment information may be game environment information regarding the game that is being played. When short-distance accessing is performed while no game is being played in the first game console 600-1, the game environment information may be either all of game environment information stored in the first game console 600-1 or game environment information selected from the first game console 600-1 by a user.

Also, the control unit 740 may control the storage unit 720 to store game environment information selected according to a UI from the game environment information displayed on the display unit 730 such that the selected game environment information matches the received ID information regarding the first game console 600-1. For example, the control unit 740 may control the storage unit 720 to store game environment information as shown in Table 2.

When short-distance accessing is performed on the second game console 600-2 and ID information regarding the second game console 600-2 is received from the second game console 600-2 via the communication unit 710, the control unit 740 may detect game environment information corresponding to the received ID information regarding the second game console 600-2 from game environment information stored in the storage unit 720. In this case, the control unit 740 may control the communication unit 710 to directly transmit the detected game environment information to the second game console 600-2, or may control the display unit 730 to display the detected game environment information. If the detected game environment information is displayed on the display unit 730, the control unit 740 may control the communication unit 710 to transmit game environment information selected by a user from the displayed game environment information to the second game console 600-2.

For convenience of explanation, a case in which ID information received from the second game console 600-2 includes as game console type information, e.g., game console 1, and game type information, e.g., game 1, will now be described. Here, ID information received when a game is played in the second game console 600-2 at a point of time when short-distance accessing is performed between the user terminal apparatus 700 and the second game console 600-2 may include game type information. ID information received when no game is played in the second game console 600-2 at this point of time may not include game type information.

When ID information is received from the second game console 600-2, the control unit 740 may detect game environment information matching at least one of the game console 1 and game 1. Then, the control unit 740 may control the communication unit 710 to transmit the matching game environment information to the second game console 600-2 or control the display unit 730 to display the detected game environment information.

Also, when short-distance accessing is performed on the second game console 600-2, the control unit 740 may control the communication unit 710 to transmit all of ID information and all of game environment information that are stored in the storage unit 720 to the second game console 600-2, or may control the display unit 730 to display all of the ID information and all of the game environment information stored in the storage unit 720. If all of the ID information and all of the game environment information are displayed on the display unit 730, a user may select ID information and game environment information, which are to be transmitted to the second game console 600-2, from the displayed ID information and game environment information via any of various UIs. In this case, the second game console 600-2 may detect game environment information that matches ID information, which is the same as the ID information of the second game console 600-2, from the ID information received from the user terminal apparatus 700.

For convenience of explanation, it will be hereinafter assumed that the ID information and game environment information transmitted from the user terminal apparatus 700 to the second game console 600-2 are as shown in Table 2.

If game console type information regarding the second game console 600-2 is 'game console 1' and 'game 1' is being performed in the second game console 600-2 at a point of time when short-distance accessing is performed between the user terminal apparatus 700 and the second game console 600-2, then the second game console 600-2 may detect external game information (game volume: 60%, resolution: HD) that matches 'game console 1' and 'game 1' and internal game information 1.

If the game console type information regarding the second game console 600-2 is 'game console 1' and no game is being performed in the second game console 600-2 at the point of time when short-distance accessing is performed between the user terminal apparatus 700 and the second game console 600-2, then the second game console 600-2 may classify and detect all of external game information matching 'game console 1' and internal game information, according to games.

The ID information and game environment information that are to be transmitted to the second game console 600-2 may be ID information and game environment information selected from the second game console 600-2 by a user via a UI provided by the second game console 600-2. In this case, the second game console 600-2 may generate a control signal for receiving the selected ID information and game environment information, and transmit the control signal to the user terminal apparatus 700. The control unit 740 may detect ID information and game environment information corresponding to the control signal, and transmit the ID information and the game environment information to the second game console 600-2.

Also, the control unit 740 may change a format of game environment information stored in the user terminal apparatus 700. In other words, if in the ID information regarding the second game console 600-2, game console type information is different from game console type information stored in the storage unit 720 but game type information is the same as game type information stored in stored in the storage unit 720, then the control unit 740 may change a format of the stored game environment information to a format available in the second game console 600-2.

For convenience of explanation, a case in which the game console type information and game type information included in ID information stored in the user terminal apparatus 700 are 'game console 1' and 'game 1', respectively, and the game console type information included in the ID information regarding the second game console 600-2 is 'game console 2' will be described.

In this case, a format of the game environment information that is to be applied to the second game console 600-2 may not be available in the second game console 600-2, since the game console type information included in the ID information regarding the second game console 600-2 is different from the format of the game console type information included in ID information stored in the user terminal apparatus 700. Thus, the control unit 740 may change the format of the game environment information that is to be applied to the second game console 600-2 to a format available in the second game console 600-2.

The second game console 600-2 may set game environment information thereof, based on the received game environment information.

The control unit 740 may include a CPU, a ROM storing a control program, and a RAM configured to memorize input data or to be used as a work-related memory region. The CPU, the ROM, and the RAM may be connected via an internal bus.

Figure 50:
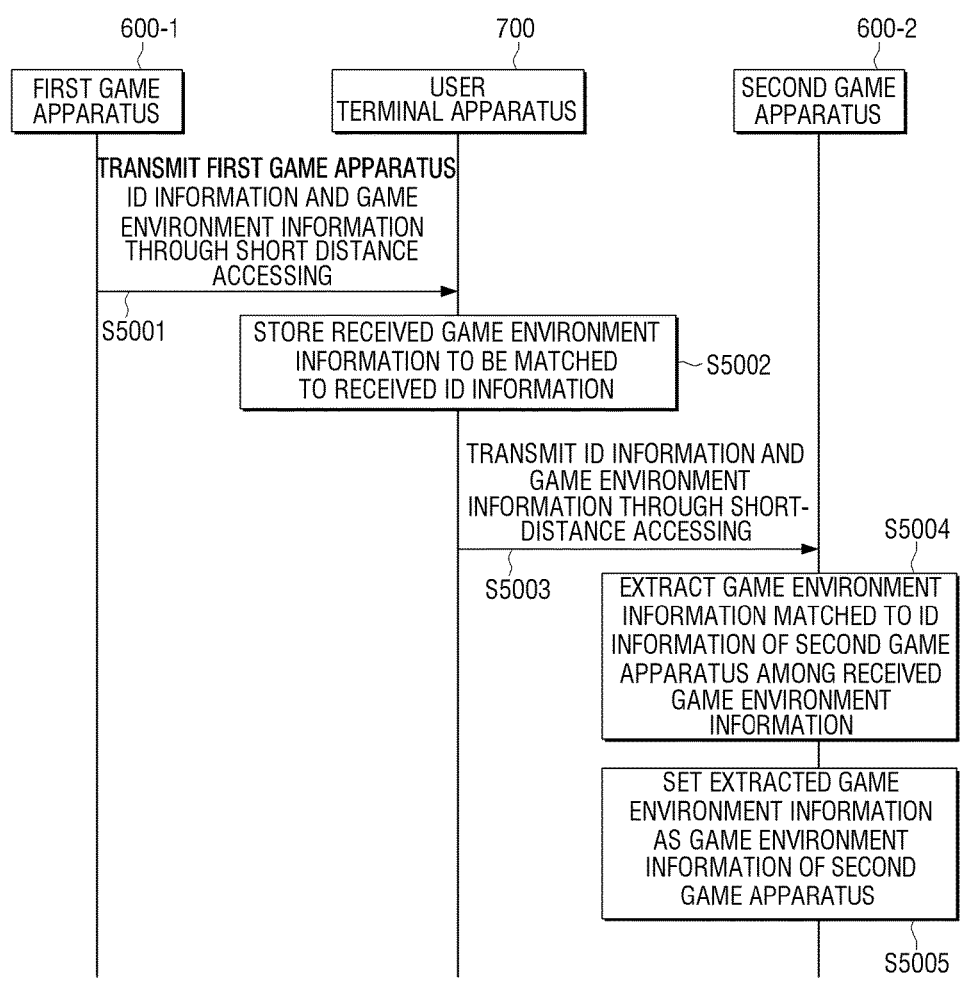
FIGS. 50 and 51 are timing diagrams illustrating methods of setting game environment information consistent with an exemplary embodiment.
Figure 51:
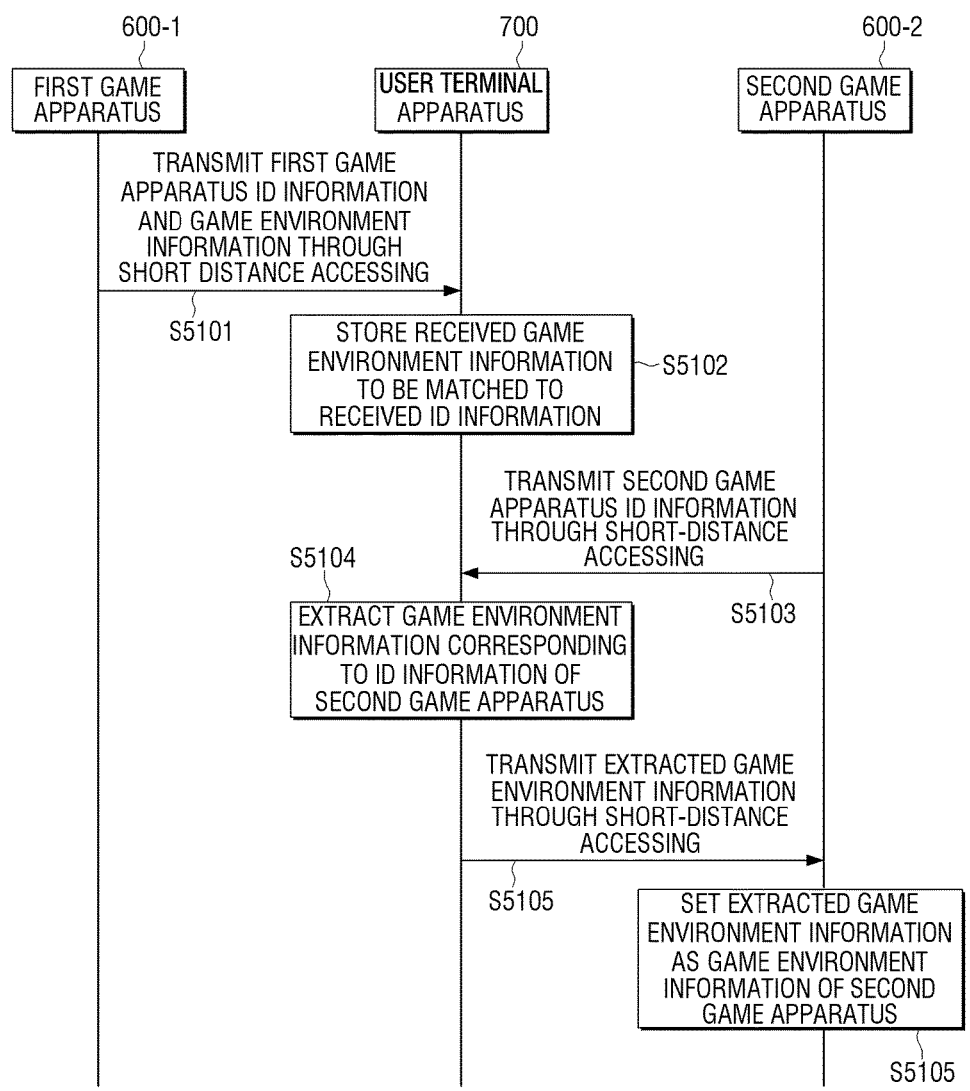

FIGS. 50 and 51 are timing diagrams illustrating methods of setting game environment information according to an embodiment of the present invention.

Referring to FIG. 50, when short-distance accessing is performed between a first game console 600-1 and a user terminal apparatus 700, the first game console 600-1 transmits ID information and game environment information thereof to the user terminal apparatus 700 (operation S5001).

Then, when the user terminal apparatus 700 receives the ID information and game environment information regarding the first game console 600-1 from the first game console 600-1, the user terminal apparatus 700 stores the received game environment information such that the game environment information matches the ID information regarding the first game console 600-1 (operation S5002).

Then, when short-distance accessing is performed between the user terminal apparatus 700 and a second game console 600-2, the user terminal apparatus 700 transmits ID information and game environment information stored therein to the second game console 600-2 (operation S5003). In this case, the user terminal apparatus 700 may transmit all of ID information and game environment information stored therein to the second game console 600-2, transmit ID information and game environment information selected via a UI provided by the user terminal apparatus 700 to the second game console 600-2, or transmit ID information and game environment information selected via a UI provided by the second game console 600-2 to the second game console 600-2.

In this case, the second game console 600-2 detects game environment information mapped to ID information regarding the second game console 600-2 from the game environment information received from the user terminal apparatus 700 (operation S5004).

Then, the second game console 600-2 sets the detected game environment information as game environment information thereof (operation S5005).

Game environment information of the second game console 600-2 may be set using the game environment information received from the user terminal apparatus 700 or detected by the second game console 600-2.

Referring to FIG. 51, when short-distance accessing is performed between a first game console 600-1 and a user terminal apparatus 700, the first game console 600-1 transmits ID information and game environment information thereof to the user terminal apparatus 700 (operation S5101).

Then, when the user terminal apparatus 700 receives the ID information and game environment information regarding the first game console 600-1 from the first game console 600-1, the user terminal apparatus 700 stores the received game environment information regarding the first game console 600-1 such that the game environment information matches the ID information regarding the first game console 600-1 (operation S5102).

Then, when short-distance accessing is performed between the user terminal apparatus 700 and a second game console 600-2, the second game console 600-2 transmits ID information thereof to the user terminal apparatus 700 (operation S5103).

Then, the user terminal apparatus 700 detects game environment information that matches the ID information regarding the second game console 600-2 (operation S5104).

Then, the user terminal apparatus 700 transmits the detected game environment information to the second game console 600-2 through short-distance accessing (operation S5105).

Then, the second game console 600-2 sets the received game environment information as game environment information thereof (operation S5106)

Figure 52:
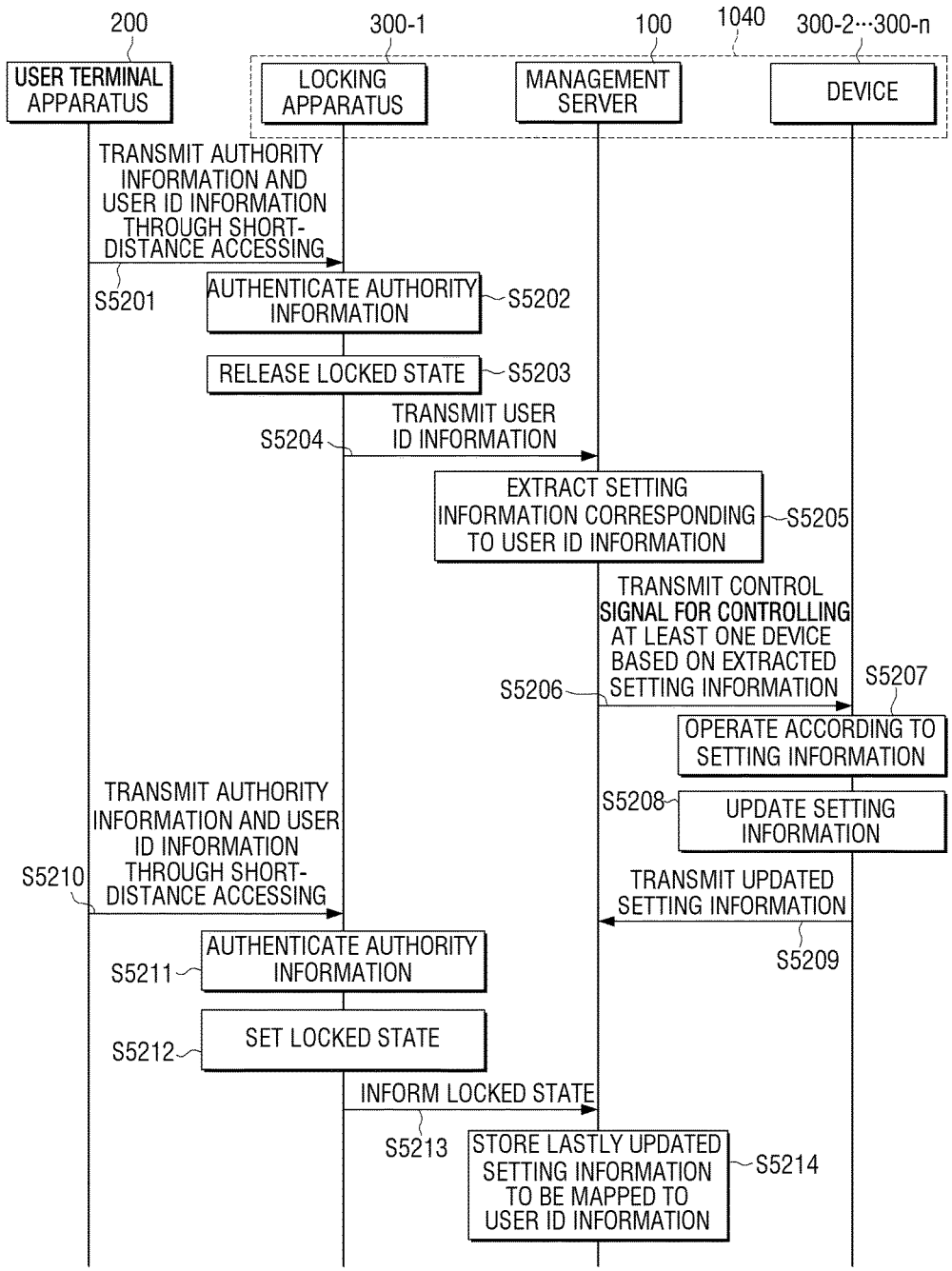
FIG. 52 is a timing diagram illustrating a method of operating an automobile domain management system consistent with an exemplary embodiment.

FIG. 52 is a timing diagram illustrating a method of operating an automobile domain management system 1040 according to an exemplary embodiment.

Referring to FIG. 52, a user terminal apparatus 200 transmits authority information and user ID information to a locking apparatus 300-1 by short-distance accessing the locking apparatus 300-1 (operation S5201).

Then, the locking apparatus 300-1 authenticates the authority information regarding the user terminal apparatus 200 received from the user terminal apparatus 200 is authority information that enables the user terminal apparatus 200 to access a domain managed by the management server 100 (operation S5202).

If it is authenticated that the authority information enables the user terminal apparatus 200 to access the domain managed by the management server 100, the locking apparatus 300-1 releases a locked state thereof (operation S5203). Then, the locking apparatus 300-1 transmits the user ID information to the management server 100 (operation S5204).

Then, the management server 100 extracts setting information corresponding to the user ID information (operation S5205). Then, the management server 100 transmits a control signal for controlling at least one device, e.g., the devices 300-2, 300-3, 300-4, . . . , 300-n to the devices 300-2, 300-3, 300-4, . . . , 300-n, based on the extracted setting information (operation S5206).

Then, the devices 300-2, 300-3, 300-4, . . . , 300-n operate based on the setting information (operation S5207).

Then, when the devices 300-2, 300-3, 300-4, . . . , 300-n are used by a user, the devices 300-2, 300-3, 300-4, . . . , 300-n update setting information thereof (operation S5208). Then, the devices 300-2, 300-3, 300-4, . . . , 300-n transmit the updated setting information to the management server 100 (operation S5209).

Then, the user terminal apparatus 200 transmits authority information and user ID information thereof to the locking apparatus 300-1 by short-distance accessing the locking apparatus 300-1 (operation S5210).

Then, the locking apparatus 300-1 authenticates the authority information regarding the user terminal apparatus 200 received from the user terminal apparatus 200 is authority information that enables the user terminal apparatus 200 to access a domain managed by the management server 100 (operation S5211).

If it is authenticated that the authority information enables the user terminal apparatus 200 to access the domain managed by the management server 100, the locking apparatus 300-1 sets a locked state thereof (operation S5212). Then, the locking apparatus 300-1 informs the management server 100 that the locked state is set (operation S5213).

Then, the management server 100 stores updated setting information to be mapped to the user ID information (operation S5214).

Controlling methods according to the exemplary embodiments above can be embodied as program code, stored in any of various non-transitory computer readable media, and provided to servers or devices via any of the various non-transitory computer readable media.

The non-transitory computer readable media is media capable of semi-permanently storing data, unlike a medium capable of storing data only for a short time, such as a register, a cache, and a memory, and from which the data can be read by a device. In detail, various applications or programs as described above may be stored in and provided via a non-transitory computer readable medium, e.g., a CD, a digital versatile disc (DVD), a hard disk, a Blue ray disc, a USB, a memory card, or a ROM.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A universal access method performed by a mobile device, comprising:
   receiving, from an access point, a signal for requesting authentication information from the mobile device through near field communication (NFC);
   selecting authentication information corresponding to the access point from among a plurality of authentication information comprising first authentication information corresponding to a first domain and second authentication information corresponding to a second domain;
   transferring the selected authentication information to the access point through the NFC;
   obtaining setting information of a plurality of controlled devices corresponding to a domain associated with the access point and a user of the mobile device; and
   displaying a graphical user interface(GUI) for controlling the plurality of controlled devices based on the setting information associated with the user of the mobile device.

2. The method as claimed in claim 1, wherein the access point comprises one of a first access point that is associated with the first domain including a first plurality of controlled devices and a second access point that is associated with the second domain including a second plurality of controlled devices,
   wherein the selecting comprises:
   identifying whether the access point corresponds to the first access point associated with the first domain or the second access point associated with the second domain;
   selecting the first authentication information if it is identified the access point corresponds to the first access point associated with the first domain; and
   selecting the second authentication information if it is identified the access point corresponds to the second access point that is associated with the second domain.

3. The method as claimed in claim 2, further comprising:
   selecting first device setting information of the first plurality of controlled devices if the access point corresponds to the first access point associated with the first domain; and
   selecting second device setting information of the second plurality of controlled devices if the access point corresponds to the second access point that is associated with the second domain,
   wherein the displaying comprises displaying the graphical user interface for controlling the first plurality of controlled devices based on the first device setting information if the access point corresponds to the first access point associated with the first domain and for controlling the second plurality of controlled devices based on the second device setting information if the access point corresponds to the second access point that is associated with the second domain.

4. The method as claimed in claim 3, wherein the first device setting information comprises first configurations of operational settings of the first plurality of controlled devices, and
   wherein the second device setting information comprises second configurations of operational settings of the second plurality of controlled devices.

5. The method as claimed in claim 4, wherein the controlling comprises:
   controlling at least one of the first plurality of controlled devices if the access point corresponds to the first access point associated with the first domain; and
   controlling at least one of the second plurality of controlled devices if the access point corresponds to the second access point that is associated with the second domain.

6. The method as claimed in claim 5, further comprising:
   receiving updated first device setting information of updated configurations of operational settings of the first plurality of controlled devices if the access point corresponds to the first access point associated with the first domain;
   receiving updated second device setting information of updated configurations of operational settings of the second plurality of controlled devices if the access point corresponds to the second access point associated with the second domain;
   updating the first device setting information if the access point corresponds to the first access point associated with the first domain; and
   updating the second device setting information if the access point corresponds to the second access point associated with the second domain.

7. The method as claimed in claim 2, wherein the first authentication information comprises a first security key associated with the first domain and,
   wherein the second authentication information comprises a second security key associated with the second domain.

8. The method as claimed in claim 7, wherein the first authentication information further comprises a first user identification associated with the first domain, and
   wherein the second authentication information further comprises a second user identification associated with the second domain.

9. The method as claimed in claim 8, wherein the first domain is located at a first location, and
   wherein the second domain is located at a second location.

10. The method as claimed in claim 8, wherein the first domain is a first network including the first plurality of controlled devices, and wherein the second domain is a second network including the second plurality of controlled devices.

11. A mobile device comprising:

a display;

a memory configured to store first authentication information corresponding to a first domain and second authentication information corresponding to a second domain;

a communication interface; and a processor configured to:

control the communication interface to receive, from an access point, a signal for requesting authentication information from the mobile device through near field communication (NFC), select authentication information corresponding to the access from among the first authentication information and the second authentication information, control the communication interface to transfer the selected authentication information to the access point through the NFC, obtain setting information of a plurality of controlled devices corresponding to a domain associated with the access point and a user of the mobile device, control the display to display a graphical user interface for controlling the plurality of controlled devices based on the setting information associated with the user of the mobile device.

12. The mobile device as claimed in claim 11, wherein the access point comprises one of a first access point that is associated with the first domain including a first plurality of controlled devices and a second access point that is associated with the second domain including a second plurality of controlled devices, wherein the processor is further configured to select the one of the first authentication information and the second authentication information corresponding to the access point by identifying whether the access point corresponds to the first access point associated with the first domain or the second access point associated with the second domain, selecting the first authentication information if it is identified the access point corresponds to the first access point associated with the first domain and selecting the second authentication information if it is identified the access point corresponds to the second access point that is associated with the second domain.

13. The mobile device as claimed in claim 12, wherein the processor is further configured to select first device setting information of the first plurality of controlled devices if the access point corresponds to the first access point associated with the first domain, and select second device setting information of the second plurality of controlled devices if the access point corresponds to the second access point that is associated with the second domain, and control the display to display the graphical user interface for controlling the first plurality of controlled devices based on the first device setting information if the access point corresponds to the first access point associated with the first domain and for controlling the second plurality of controlled devices based on the second device setting information if the access point corresponds to the second access point that is associated with the second domain.

14. The mobile device as claimed in claim 13, wherein the first device setting information comprises first configurations of operational settings of the first plurality of controlled devices, and wherein the second device setting information comprises second configurations of operational settings of the second plurality of controlled devices.

15. The mobile device as claimed in claim 14, wherein the processor is further configured to control the communication interface to transmit control commands to at least one of the first plurality of controlled devices if the access point corresponds to the first access point associated with the first domain, and control the communication interface to transmit control commands to at least one of the second plurality of controlled devices if the access point corresponds to the second access point that is associated with the second domain.

16. The mobile device as claimed in claim 15, wherein the processor is further configured to control the communication interface to receive updated first device setting information of updated configurations of operational settings of the first plurality of controlled devices if the access point corresponds to the first access point associated with the first domain, and to receive updated second device setting information of updated configurations of operational settings of the second plurality of controlled devices if the access point corresponds to the second access point associated with the second domain, and update the first device setting information if the access point corresponds to the first access point associated with the first domain, and update the second device setting information if the access point corresponds to the second access point associated with the second domain.

17. The mobile device as claimed in claim 12, wherein the first authentication information comprises a first security key associated with the first domain, and wherein the second authentication information comprises a second security key associated with the second domain.

18. The mobile device as claimed in claim 17, wherein the first authentication information further comprises a first user identification associated with the first domain, and wherein the second authentication information further comprises a second user identification associated with the second domain.

19. The mobile device as claimed in claim 18, wherein the first domain is located at a first location, and wherein the second domain is located at a second location.

20. The mobile device as claimed in claim 18, wherein the first domain is a first network including the first plurality of controlled devices, and wherein the second domain is a second network including the second plurality of controlled devices.

* * * * *